United States Patent
Lee

(10) Patent No.: US 9,128,575 B2
(45) Date of Patent: Sep. 8, 2015

(54) INTELLIGENT INPUT METHOD

(71) Applicant: APACER TECHNOLOGY INC., New Taipei (TW)

(72) Inventor: Yu-Hsuan Lee, New Taipei (TW)

(73) Assignee: APACER TECHNOLOGY INC., New Taipei (TW)

( * ) Notice: Subject to any disclaimer, the term of this patent is extended or adjusted under 35 U.S.C. 154(b) by 0 days.

(21) Appl. No.: 13/846,628

(22) Filed: Mar. 18, 2013

(65) Prior Publication Data

US 2014/0132524 A1    May 15, 2014

(30) Foreign Application Priority Data

Nov. 14, 2012  (TW) ............... 101142485 A
Nov. 14, 2012  (TW) ............... 101142487 A
Nov. 14, 2012  (TW) ............... 101142488 A
Nov. 14, 2012  (TW) ............... 101142489 A

(51) Int. Cl.
*G06F 3/044*   (2006.01)
*H04N 21/422*  (2011.01)
*G06F 3/0488*  (2013.01)

(52) U.S. Cl.
CPC .......... *G06F 3/044* (2013.01); *H04N 21/42224* (2013.01); *H04N 21/42227* (2013.01); *G06F 3/04883* (2013.01); *G06F 2203/0383* (2013.01)

(58) Field of Classification Search
CPC ... G06F 3/03547; G06F 3/044; G06F 3/0488; G06F 3/04883; G06F 3/04886; G06F 3/045; G06F 2203/0383

USPC ......... 345/173, 156, 157, 167, 661, 667, 619; 715/231, 233, 234, 719, 763, 771, 769, 715/833; 725/32, 38, 37, 139
See application file for complete search history.

(56) References Cited

U.S. PATENT DOCUMENTS

| | | | |
|---|---|---|---|
| 6,731,227 B2 | 5/2004 | Horie | |
| 2006/0007176 A1* | 1/2006 | Shen | 345/173 |
| 2006/0282791 A1 | 12/2006 | Bogomolov et al. | |
| 2007/0229465 A1* | 10/2007 | Sakai et al. | 345/173 |
| 2010/0103127 A1* | 4/2010 | Park et al. | 345/173 |
| 2010/0171700 A1* | 7/2010 | Sharan et al. | 345/161 |
| 2010/0251152 A1* | 9/2010 | Cho et al. | 715/765 |

(Continued)

FOREIGN PATENT DOCUMENTS

| | | |
|---|---|---|
| TW | 201117053 | 5/2011 |
| TW | 201218021 | 5/2012 |
| TW | 201222347 | 6/2012 |

*Primary Examiner* — Md Saiful A Siddiqui
(74) *Attorney, Agent, or Firm* — Kirton McConkie; Evan R. Witt

(57) ABSTRACT

An intelligent input method and intelligent input system are disclosed. The intelligent input system includes an electronic device and an input device. The intelligent input method comprises the following steps. Firstly, a touch input is received through an input interface of an input device. Then, plural control areas on the input interface are defined according to a touch position of the touch input on the input interface. The plural control areas are respectively correlated with plural input functions of the input device. The intelligent input method allows the user to input or select a target object or browse a web page or operate any graphical user interface containing randomly-distributed objects in an electronic device such as an intelligent TV or a digital multimedia player. Consequently, the target object can be selected and inputted in an intelligent, quick and intuitive manner.

44 Claims, 77 Drawing Sheets

(56) References Cited

U.S. PATENT DOCUMENTS

| | | | |
|---|---|---|---|
| 2010/0302190 A1* | 12/2010 | Yeh | 345/173 |
| 2011/0216011 A1* | 9/2011 | Cheng et al. | 345/169 |
| 2011/0221686 A1* | 9/2011 | Kim et al. | 345/173 |
| 2012/0030619 A1* | 2/2012 | Lee et al. | 715/810 |
| 2012/0032901 A1* | 2/2012 | Kwon | 345/173 |
| 2012/0098743 A1* | 4/2012 | Lai et al. | 345/157 |
| 2012/0179988 A1* | 7/2012 | Suh et al. | 715/767 |

\* cited by examiner

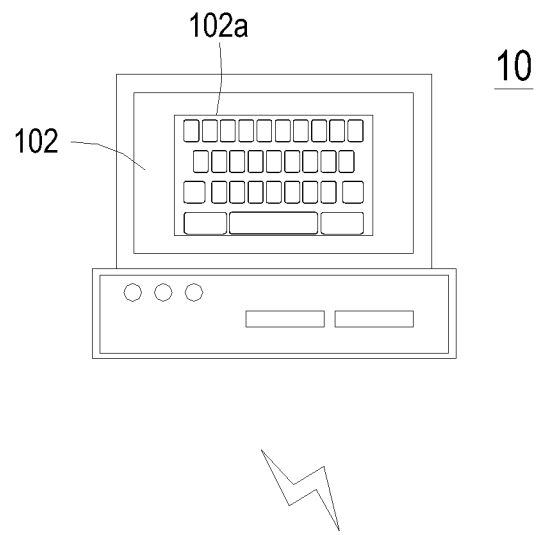
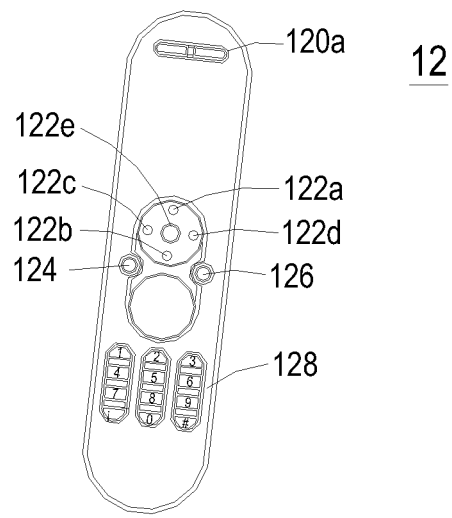
FIG. 1

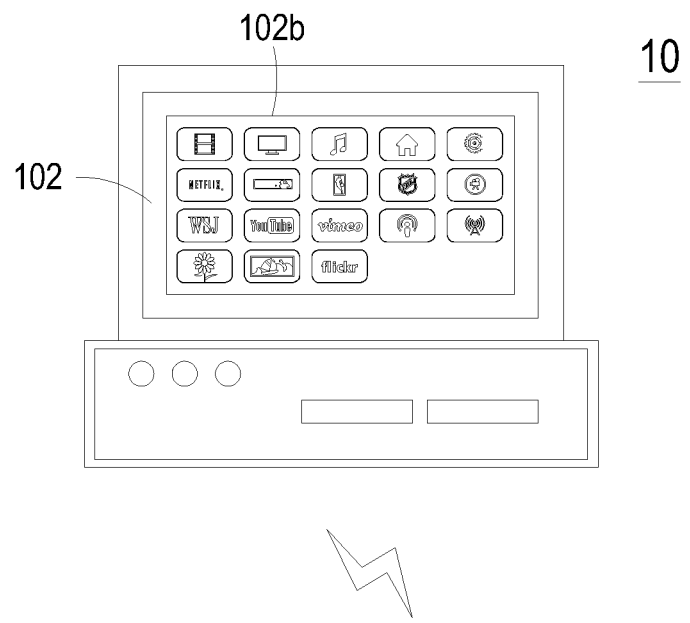
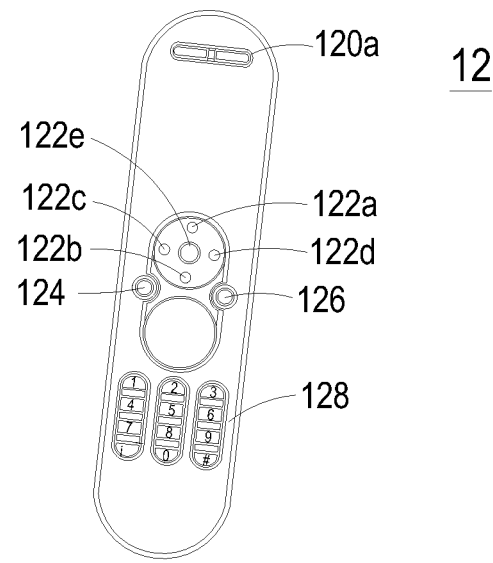
FIG. 7

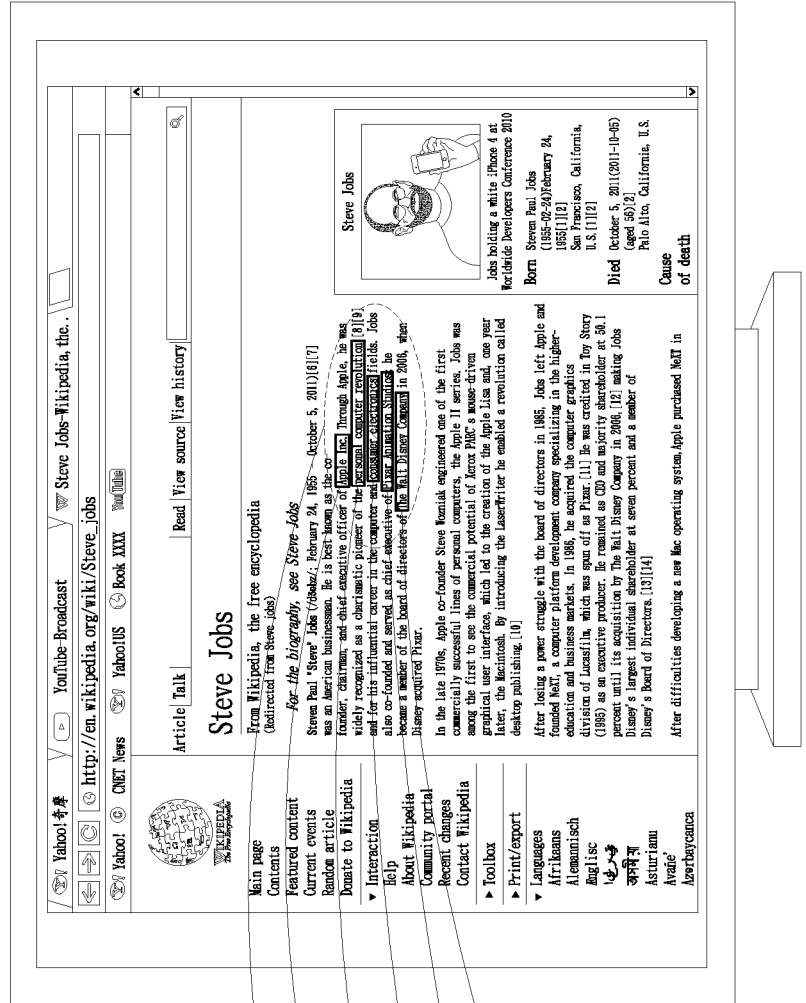
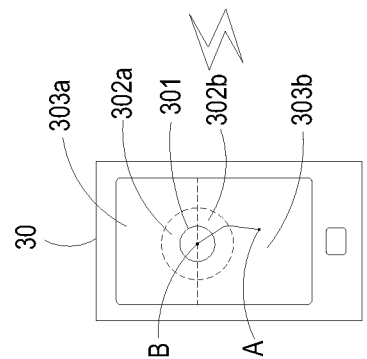
FIG. 29

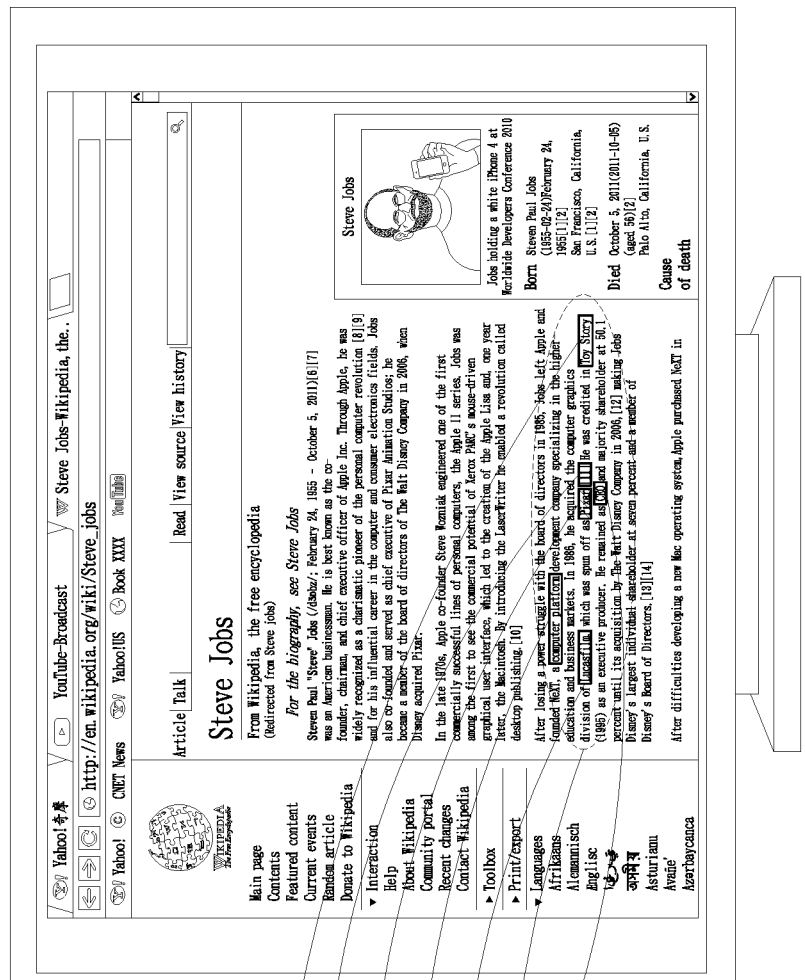
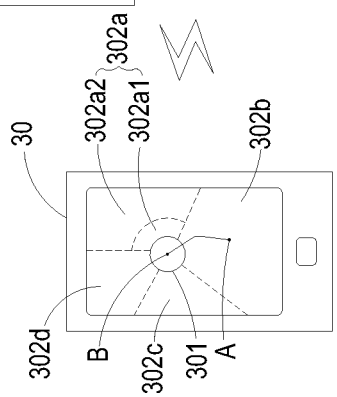
FIG. 30

INTELLIGENT INPUT METHOD

FIELD OF THE INVENTION

The present invention relates to an input system and an input method, and more particularly to an intelligent input system and an intelligent input method.

BACKGROUND OF THE INVENTION

In a personal computer environment, it is easy for users to input numbers and characters by using a keyboard and a mouse. However, in a TV environment, it is difficult to use a general keyboard or a remote controller to input selective items or input numbers and characters. Nowadays, some intelligent TVs and multimedia players (e.g. Google TVs and Apple iTVs) are introduced into the market. The man-machine interfaces of these intelligent TVs and multimedia players are not user-friendly and usually suffered from severe criticism.

Take the conventional television and the remote controller for example. The conventional remote controller is usually provided with a numerical keypad for inputting numbers. The conventional remote controller is also provided with a navigation/direction keypad (including up/down/left/right keys) for allowing the user to browse and select the selective items. In a case that the remote controller is used for selection or input, the remote controller is held by the user's hand while pressing the number key or the navigation/direction key to switch the selective item. In this control mode, the desired setting or input is usually completed by pressing the keys more than 10 times. In other words, the use of the conventional remote controller is time-consuming and inconvenient.

On the other hand, the conventional TV remote controller is not provided with a standard QWERTY keyboard. For executing the internet access function of the intelligent TV or the multimedia player, a single word is inputted by operating the navigation/direction keypad to jump between the keys and select characters. In other words, it takes a long time to input a short paragraph. The complicated input method becomes hindrance from operating the TV remote controller, particularly for the elderly users or children.

Another commercially-available remote controller has a built-in 3-D g-sensor for detecting the motion of the remote controller in a three-dimensional space. The operating principles and operating methods of this remote controller are similar to an air mouse. For browsing a web page in the intelligent TV or the multimedia player, the user may move the remote controller to control the cursor shown on a display screen to input characters or numbers or select any icon or link shown on the display screen. Since the use of this remote controller should precisely locate the cursor to the designated character, number or icon shown on the display screen, the complicated input method becomes hindrance for the non-technical-savvy (NTS) who is not familiar with or not good at the use of the TV remote controller.

Therefore, there is a need of providing an intelligent input system and an intelligent input method for allowing the user to easily input a target selective item or the character without the need of sequentially switching many selective items. Especially, the intelligent input system and the intelligent input method can be easily operated by the non-technical-savvy (NTS), the elderly user or the uneducated user in order to control the novel intelligent TV and the digital multimedia player or browse web pages.

SUMMARY OF THE INVENTION

The present invention provides an intelligent input system and an intelligent input method for allowing the user to input or select a target object or browse a web page or operate any graphical user interface containing randomly-distributed objects in an electronic device such as an intelligent TV or a digital multimedia player. Consequently, the target object can be selected and inputted in an intelligent, quick and intuitive manner.

In accordance with an aspect of the present invention, there is provided an intelligent input method. Firstly, a touch input is received through an input interface of an input device. Then, plural control areas on the input interface are defined according to a touch position of the touch input on the input interface. The plural control areas are respectively correlated with plural input functions of the input device.

In accordance with another aspect of the present invention, there is provided an intelligent input method. Firstly, plural objects are shown on a graphical user interface. Then, a pointing signal is received to simultaneously point to an object group on the graphical user interface, wherein the object group is dynamically created to contain at least two of the plural objects. Then, a selecting signal is received to select a target object from the object group.

In accordance with another aspect of the present invention, there is provided an intelligent input method. Firstly, plural selective objects are displayed on a display screen of an electronic device, wherein the plural selective objects are distributed on a displaying image of the display screen. Then, an input device is configured to contain plural select units, wherein the plural select units are distributed on an input interface of the input device. Then, a pointing function between the input device and the electronic device is provided, whereby the input device simultaneously and dynamically points to at least two of the plural selective objects on the displaying image. Then, a correspondence between the at least two of the pointed selective objects on the displaying image and at least two of the plural select units of the input device is established.

The above contents of the present invention will become more readily apparent to those ordinarily skilled in the art after reviewing the following detailed description and accompanying drawings, in which:

BRIEF DESCRIPTION OF THE DRAWINGS

FIG. 1 schematically illustrates the architecture of an intelligent input system according to an embodiment of the present invention, in which a virtual keyboard is shown on a display screen of the electronic device;

FIG. 7 schematically illustrates the architecture of an intelligent input system according to an embodiment of the present invention, in which a multimedia content is shown on a display screen of the electronic device;

FIGS. 10A~10D schematically illustrate the implementation examples of an intelligent input system and an intelligent input method according to another embodiment of the present invention;

FIG. 29 schematically illustrates an implementation example of an intelligent input system and an intelligent input method according to another embodiment of the present invention;

FIG. 30 schematically illustrates an implementation example of an intelligent input system and an intelligent input method according to another embodiment of the present invention;

DETAILED DESCRIPTION OF THE PREFERRED EMBODIMENT

Figure 2A:
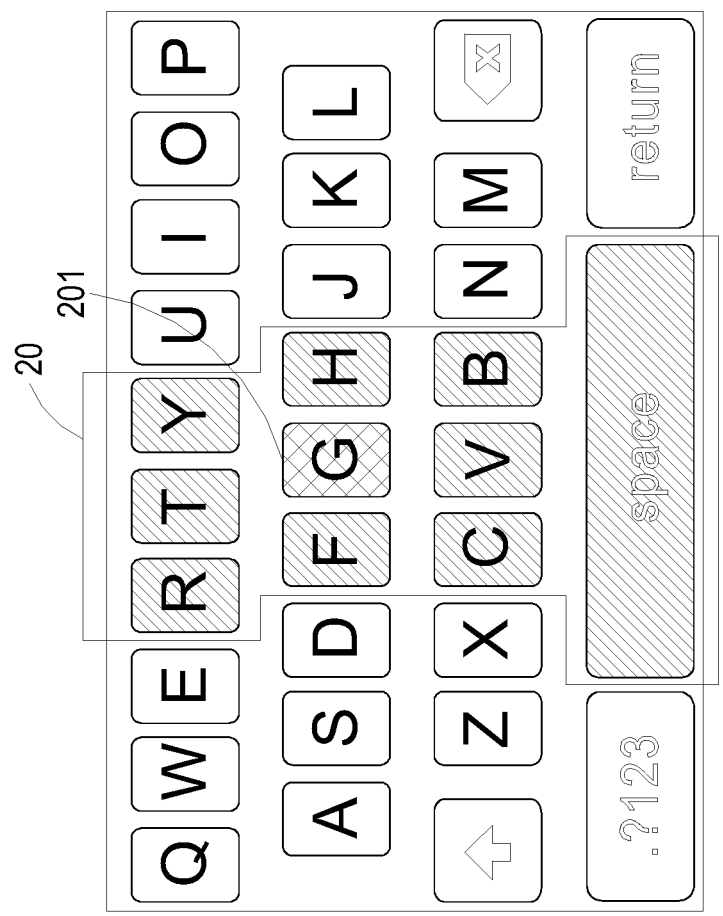
FIGS. 2A~2G schematically illustrate the implementation examples of an intelligent input system and an intelligent input method according to an embodiment of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides an intelligent input system and an intelligent input method for allowing the user to input or select a target object or browse a web page or operate any graphical user interface containing randomly-distributed objects in an electronic device such as an intelligent TV or a digital multimedia player. Consequently, the target object can be selected and inputted in an intelligent, quick and intuitive manner.

The intelligent input system includes an input device and an electronic device. The input device is operated to control the menu shown on a display screen of the electronic device and select a target object from the menu. By the intelligent input method, the input device is operated to dynamically point to a target zone including the target object in the menu shown on the display screen. In addition, the target zone is highlighted. The target zone includes a center object and plural neighboring objects around the center object, and the target object is one of the center object and the plural neighboring objects. The input device has a center control area corresponding to the center object. By performing an input action on a specified position relative to the center control area, the target object is selected according to the position of the target object relative to the center object.

The electronic device is an intelligent TV, a digital multimedia player, a computer, a satellite navigation device, or the like. The electronic device has a display screen. The menu containing plural objects is displayed on the display screen.

The input device may be in communication with the electronic device in a wireless transmission manner. For example, the input device is a remote controller with physical keys or another input device with a touch-sensitive surface (e.g. a smart phone or a tablet personal computer). The physical keys or the touch-sensitive surface may be used as an input interface of the input device. The touch-sensitive surface is a capacitive touch-sensitive surface, an optical touch-sensitive surface or a resistive touch-sensitive surface. Alternatively, the touch-sensitive surface may be a touch pad without a display screen (e.g. a touch pad of a notebook computer).

On the other hand, the input device may be a motion detector for detecting the motion or gesture of the user's body or a sound-receiving device for receiving the sound commands in order to perform the motion control input or the sound control input.

The electronic device may receive a pointing signal from the input device. In response to a pointing signal, a target zone is dynamically displayed on the display screen according to a direction and a position of the pointing device. The target zone is highlighted. In addition, a center object of the target zone is displayed in a visually distinguishable manner with respect to other objects of the target zone. The electronic device may also receive a selecting signal from the input device. In response to a selecting signal, a target object is selected by the electronic device. The selecting signal is generated in response to an input action on the input device. For example, by pressing a corresponding physical key or tapping a corresponding control area of the touch-sensitive area, the selecting signal is generated.

In this context, the term "object" can be but not limited to a virtual key or a soft key, a graphical user interface (GUI), an icon, a function tab, a photo, a video or a link of a web page (including a hyperlink).

In this context, the term "pointing" indicates an action of dynamically and continuously moving a hidden cursor or indicator of the display screen controlled by the input device. The movement of the hidden cursor or indicator is random, unpredefined, optional or non-directional. The center object corresponding to the position of a hidden cursor or indicator of the display screen can be any object of the menu. In other words, the target zone is dynamically determined according to the direction and the position to which the pointing device points. Different center object and plural neighboring objects, based on their relative locations and layout, define different target zones. Consequently, the objects of the target zone do no have a fixed combination of objects and can be flexibly determined. In this context, the term "center" and "neighboring" are relative terms for describing spatial relationship between objects. It is noted that the center object is not necessarily located at a true center position of the target zone.

FIG. 1 schematically illustrates the architecture of an intelligent input system according to an embodiment of the present invention. As shown in FIG. 1, the intelligent input system comprises an electronic device 10 and an input device 12. In this embodiment, the electronic device 10 is a digital multimedia player, and the input device 12 is a remote controller. The remote controller 12 comprises a power button 120a, a navigation/direction pad (including an up key 122a, a down key 122b, a left key 122c, a right key 122d and a center key 122e), an enter key 124, a return key 126, and a numerical keypad 128 (including number keys 1, 2, 3, 4, 5, 6, 7, 8, 9, 0, a pound key # and an asterisk key *). The numerical keypad 128 may be used as an input control keypad of the remote controller 12. The remote controller 12 is in communication with the digital multimedia player 10 in a wireless transmission manner. The digital multimedia player 10 comprises a display screen 102. A virtual keyboard 102a is shown on the display screen 102. Moreover, the remote controller 12 has at least one built-in pointing device (not shown). An example of the built-in pointing device includes but is not limited to a gyroscope, a G-sensor, an accelerometer, a track ball, a joystick, a track pad, a track screen, or the like. Hereinafter, the implementation examples of the intelligent input system and the intelligent input method of the present invention will be illustrated by referring to the use of a remote controller with physical keys to input characters/numbers.

Please refer to FIG. 1 and FIGS. 2A~2G. FIGS. 2A~2G schematically illustrate the implementation examples of an intelligent input system and an intelligent input method according to an embodiment of the present invention. In FIGS. 2A~2G, the layout of the numerical keypad 128 of the remote controller 12 is mapped onto the virtual keyboard 102a of the display screen 102. The virtual keyboard 102a is a standard QWERTY keyboard. A target zone 20 circumscribes the keys corresponding to the numerical keypad 128 of the remote controller 12. Moreover, the key corresponding to the position of a hidden cursor or indicator of the display screen is set as a center key 201. For clarification, the hidden cursor or indicator is not shown. Moreover, the circumscribed keys of the target zone 20 are highlighted to assist the user in identifying which keys of the QWERTY keyboard correspond to the keys of the numerical keypad 128 of the remote controller 12. Preferably, the center key 201 is displayed in a visually distinguishable manner. For example, the color of the center key 201 is different from the color of the neighboring keys. Alternatively, in some other embodiments, the center key 201 and the neighboring keys are displayed in a visually identical manner.

In the implementation example of FIG. 2A, the character key "G" is the center key 201 of the target zone 20 corresponding to the key "5" (e.g. a center control key) at the center position of the numerical keypad 128 of the remote controller 12. By pressing the center control key "5" of the numerical keypad 128 of the remote controller 12, the character "G" is inputted. Moreover, by intuitively pressing a specified neighboring key at a specified position relative to the center control key "5" of the numerical keypad 128 of the remote controller 12, a target character at the specified position relative to the center key 201 of the target zone 20 shown on the display screen 102 is inputted.

For example, by pressing the key "1" of the numerical keypad 128 of the remote controller 12, the character "R" is inputted. By pressing the key "2" of the numerical keypad 128 of the remote controller 12, the character "T" is inputted. By pressing the key "3" of the numerical keypad 128 of the remote controller 12, the character "Y" is inputted. By pressing the key "4" of the numerical keypad 128 of the remote controller 12, the character "F" is inputted. By pressing the key "6" of the numerical keypad 128 of the remote controller 12, the character "H" is inputted. By pressing the key "7" of the numerical keypad 128 of the remote controller 12, the character "C" is inputted. By pressing the key "8" of the numerical keypad 128 of the remote controller 12, the character "V" is inputted. By pressing the key "9" of the numerical keypad 128 of the remote controller 12, the character "B" is inputted. By pressing the key "0" of the numerical keypad 128 of the remote controller 12, a space is inputted.

Moreover, by swinging the remote controller 12 leftwards or rightwards, the target zone 20 is moved to the left part or the right part of the standard QWERTY keyboard. For example, by operating the built-in pointing device of the remote controller 12 (e.g. a gyroscope, a G-sensor, an accelerometer, a track ball, a joystick, a track pad, or a track screen), the target zone 20 is correspondingly moved to the left part or the right part of the standard QWERTY keyboard. Consequently, the target object is included in the target zone 20. Then, by pressing the key of the numerical keypad 128 or the navigation/direction pad (122a~122e), the target object can be selected.

Figure 2B:
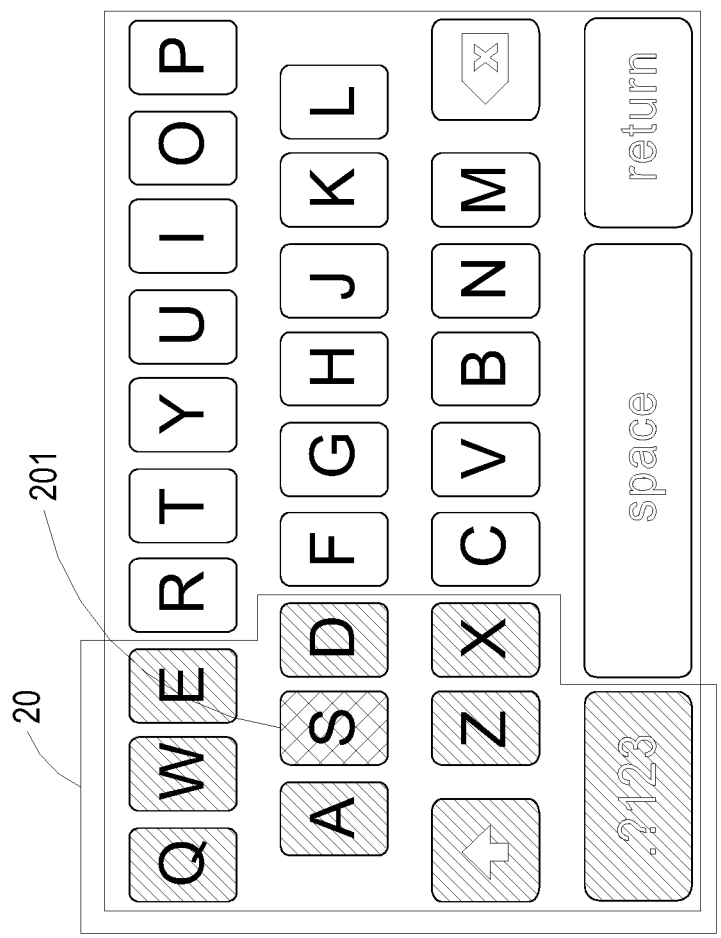

For example, by swinging the remote controller 12 leftwards, the target zone 20 is moved to the left part of the standard QWERTY keyboard, and thus the center key 201 is switched from the character key "G" to the character key "S" (see FIG. 2B). Under this circumstance, by pressing the key "1" of the numerical keypad 128 of the remote controller 12, the character "Q" is inputted. By pressing the key "2" of the numerical keypad 128 of the remote controller 12, the character "W" is inputted. By pressing the key "3" of the numerical keypad 128 of the remote controller 12, the character "E" is inputted. By pressing the key "4" of the numerical keypad 128 of the remote controller 12, the character "A" is inputted. By pressing the key "5" of the numerical keypad 128 of the remote controller 12, the character "S" is inputted. By pressing the key "6" of the numerical keypad 128 of the remote controller 12, the character "D" is inputted. By pressing the key "8" of the numerical keypad 128 of the remote controller 12, the character "Z" is inputted. By pressing the key "9" of the numerical keypad 128 of the remote controller 12, the character "X" is inputted. By pressing the key "7" of the numerical keypad 128 of the remote controller 12, the control character "↑" is inputted. By pressing the key "0" of the numerical keypad 128 of the remote controller 12, the control character ".?123" is inputted.

Figure 2C:
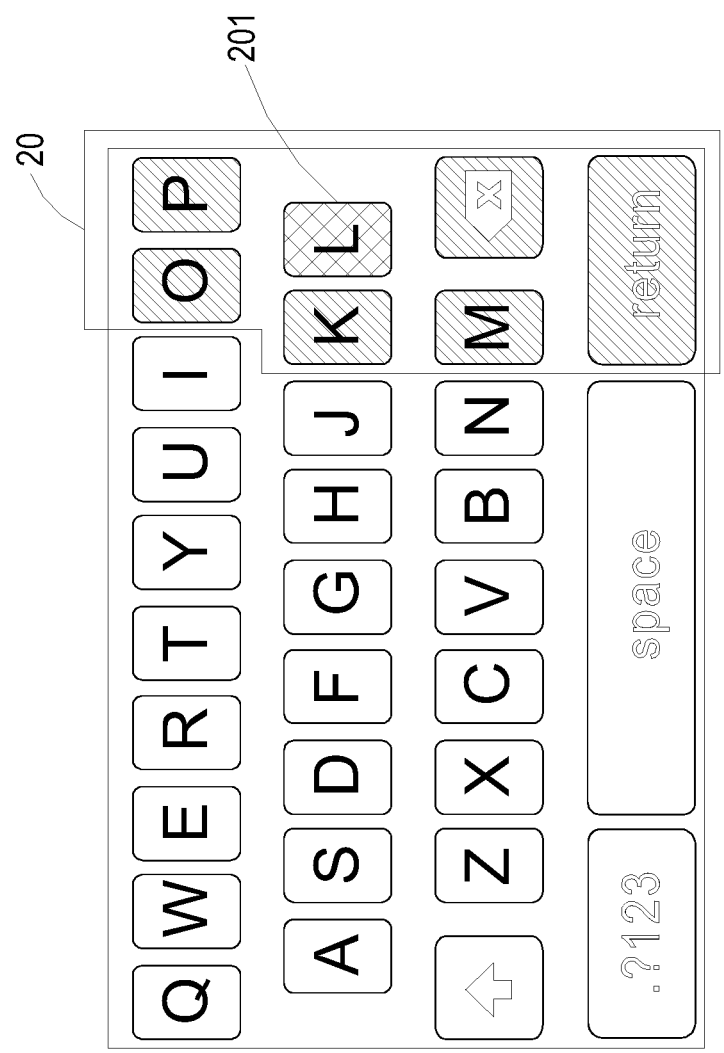

On the other hand, by swinging the remote controller 12 rightwards, the target zone 20 is moved to the right part of the standard QWERTY keyboard, and thus the center key 201 is switched to the character key "L" (see FIG. 2C). Under this circumstance, by pressing the key "1" of the numerical keypad 128 of the remote controller 12, the character "O" is inputted. By pressing the key "2" of the numerical keypad 128 of the remote controller 12, the character "P" is inputted. By pressing the key "4" of the numerical keypad 128 of the remote controller 12, the character "K" is inputted. By pressing the key "5" of the numerical keypad 128 of the remote controller 12, the character "L" is inputted. By pressing the key "7" of the numerical keypad 128 of the remote controller 12, the character "M" is inputted. By pressing the key "8" of the numerical keypad 128 of the remote controller 12, the control character "<x" is inputted. By pressing the key "0" of the numerical keypad 128 of the remote controller 12, the "return" key is inputted.

In accordance with a benefit of the present invention, if the target characters to be inputted are all located within the target zone 20, the user can easily input these target characters without the need of moving the cursor to the highlighted keys to input respective characters. For example, as shown in FIG. 2B, by sequentially inputting the keys "6", "3", "4" and "6" of the numerical keypad 128 of the remote controller 12, an alphabetic string "DEAD" is inputted.

Figure 2D:
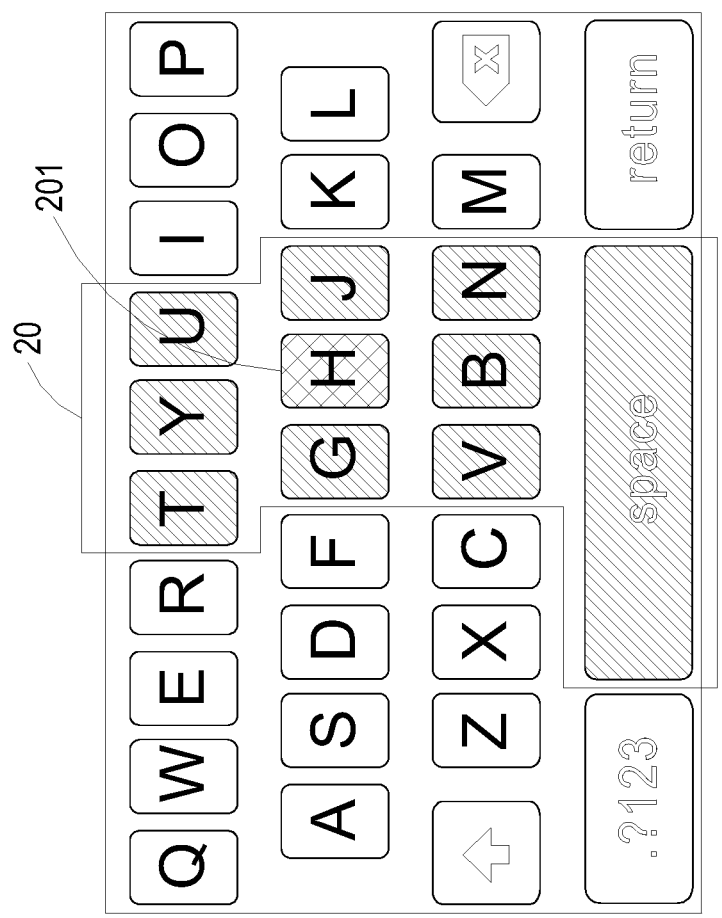
Figure 2E:
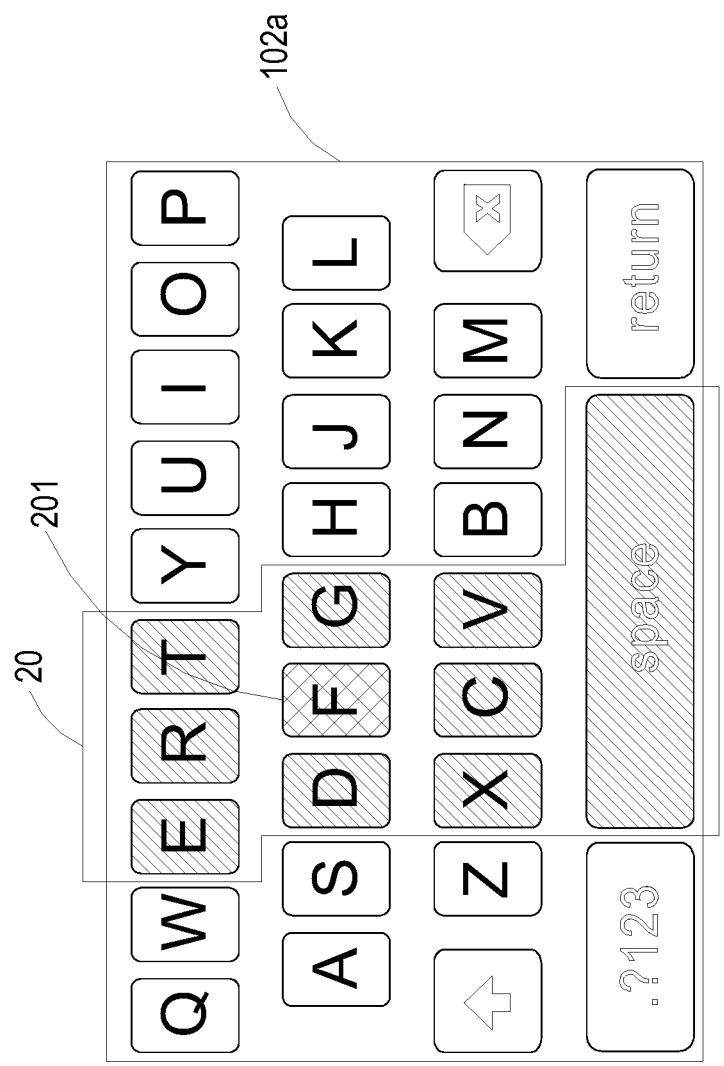

In accordance with another benefit of the present invention, an identical character may be inputted by plural ways. More especially, each inputting way is very user-friendly and intuitive. Please refer to FIGS. 2A, 2D and 2E. As shown in FIG. 2A, the center key 201 of the target zone 20 is the character key "G". As shown in FIG. 2D, the center key 201 of the target zone 20 is the character key "H". As shown in FIG. 2E, the center key 201 of the target zone 20 is the character key "F". In a case that the user wants to input the character key "T", the user may simply press the key "1" of the numerical keypad 128 of the remote controller 12 corresponding to the standard QWERTY keyboard of FIG. 2D; or the user may simply press the key "2" of the numerical keypad 128 of the remote controller 12 corresponding to the standard QWERTY keyboard of FIG. 2A; or the user may simply press the key "3" of the numerical keypad 128 of the remote controller 12 corresponding to the standard QWERTY keyboard of FIG. 2E. All of the above three ways can successfully input the character key "T". By simply swinging the remote controller 12 to move the target zone 20 to a part of the standard QWERTY keyboard including the character key "T", the user may press a corresponding key of the numerical keypad 128 of the remote controller 12 to input the character key "T".

In other words, when the target character is included in the target zone 20, the user may stop swinging remote controller 12 and then press a corresponding key of the numerical keypad 128 of the remote controller 12 to input the target character. Since the target zone 20 is dynamically selected and a corresponding key of the remote controller 12 is inputted, the intelligent input method of the present invention can quickly and intuitively input the target characters.

Figure 2F:
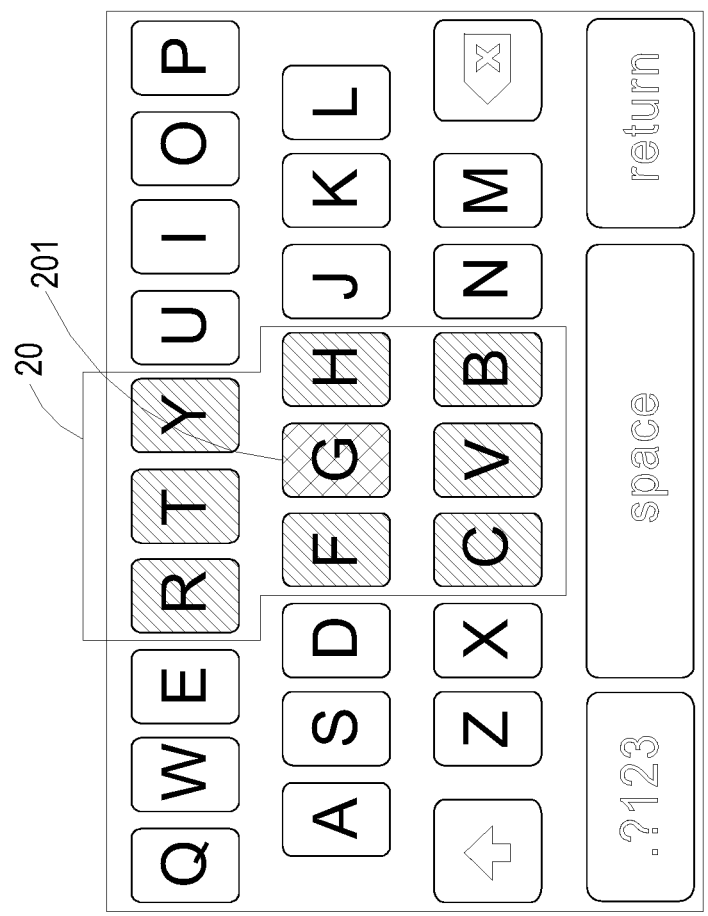

Moreover, according to the settings, the key "0" of the numerical keypad 128 of the remote controller 12 is not mapped onto the standard QWERTY keyboard. Under this circumstance, the key of the QWERTY keyboard corresponding to the key "0" of the numerical keypad 128 of the remote controller 12 is not included in the circumscribed highlighted keys of the target zone 20. That is, the "space" key of the QWERTY keyboard of FIG. 2A corresponding to the key "0" of the numerical keypad 128 of the remote controller 12 is not highlighted according to the settings. The modified layout of the QWERTY keyboard is shown in FIG. 2F.

Figure 2G:
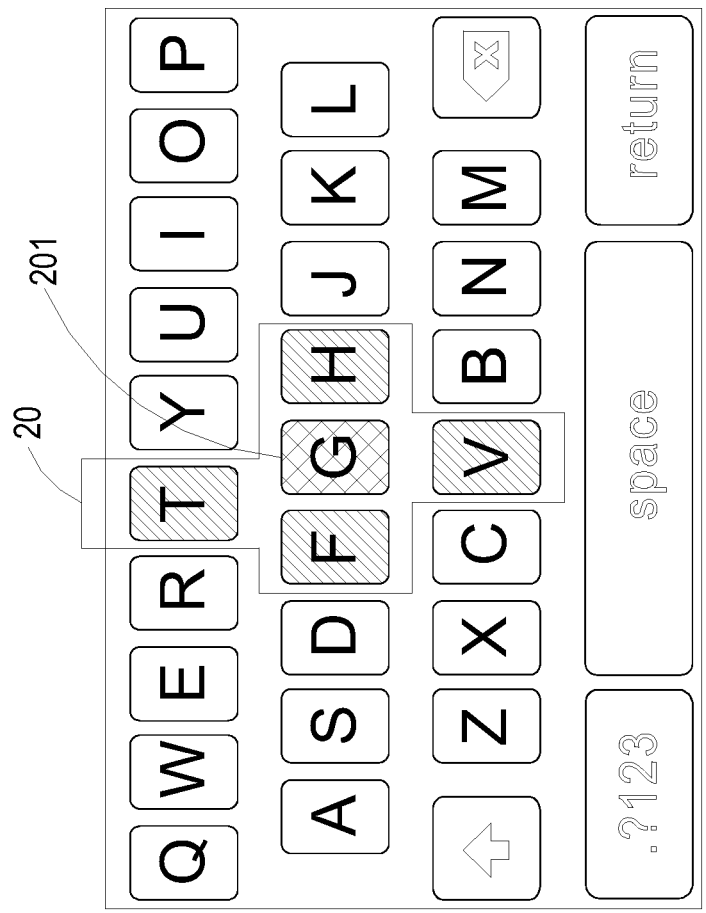

In some embodiments, the layout of the navigation/direction pad (i.e. the keys 122a~122e) is mapped onto the QWERTY keyboard according to the settings. The circumscribed highlighted keys of the target zone 20 comprise the center key 201 and the neighboring keys (i.e. at the top, bottom, left and right sides of the center key 201). As shown in FIG. 2G, the key corresponding to the position of a hidden cursor or indicator of the display screen is set as the center key 201. In the implementation example of FIG. 2G, the character key "G" is the center key 201 of the target zone 20 corresponding to the key 122e at the center position of the navigation/direction pad of the remote controller 12. The circumscribed highlighted keys of the target zone 20 comprises the character key "G", the character key "T", the key character "F", the key character "H" and the key character "V". By pressing the keys 122e, 122a, 122c, 122d and 122b, the character key "G", the character key "T", the key character "F", the key character "H" and the key character "V" are respectively inputted.

Conventionally, for entering a character by using a remote controller with the air mouse function, the user should move the remote controller to control the movement of a cursor (or a point) shown on the display screen. After the cursor is moved to the target character, the user may press the "enter" key of the remote controller. However, depending on the precision of the user's hand and sensibility of the air mouse remote controller, sometimes, it is difficult to move the cursor to the exact position where the user wants.

In contrast, according to the present invention, the remote controller is used to move the highlighted target zone 20, instead of the cursor point. The highlighted target zone 20 may have a green color or a red color. Consequently, the demands on the sensibility of the remote controller and the precision of swinging remote controller are largely reduced.

In the above embodiment, some exemplary ways of inputting characters are illustrated. Hereinafter, the uses of the intelligent input method of the present invention to input numbers will be illustrated with reference to FIG. 1 and FIGS. 3A~3L.

FIGS. 3A~3L schematically illustrate the implementation examples of an intelligent input system and an intelligent input method according to another embodiment of the present invention. In FIGS. 3A~3L, the layout of the navigation/direction pad (i.e. the keys 122a~122e) of the remote controller 12 is mapped onto the virtual keyboard 102a of the display screen 102. The virtual keyboard 102a is a numerical keyboard. The key corresponding to the position of a hidden cursor or indicator of the display screen is set as the center key 201. The circumscribed highlighted keys of the target zone 20 comprise the center key 201 and the neighboring keys (i.e. at the top, bottom, left and right sides of the center key 201). Moreover, the circumscribed highlighted keys of the target zone 20 correspond to the keys 122a~122e of the navigation/direction pad of the remote controller 12.

Figure 3A:
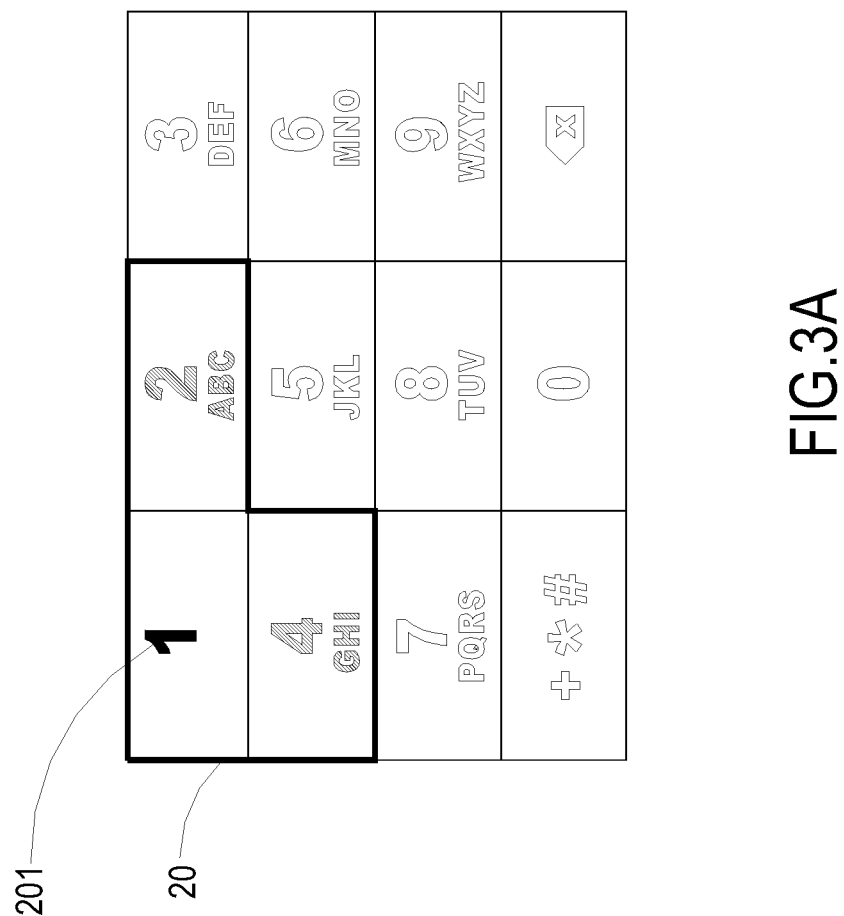
FIGS. 3A~3L schematically illustrate the implementation examples of an intelligent input system and an intelligent input method according to another embodiment of the present invention.
Figure 3B:
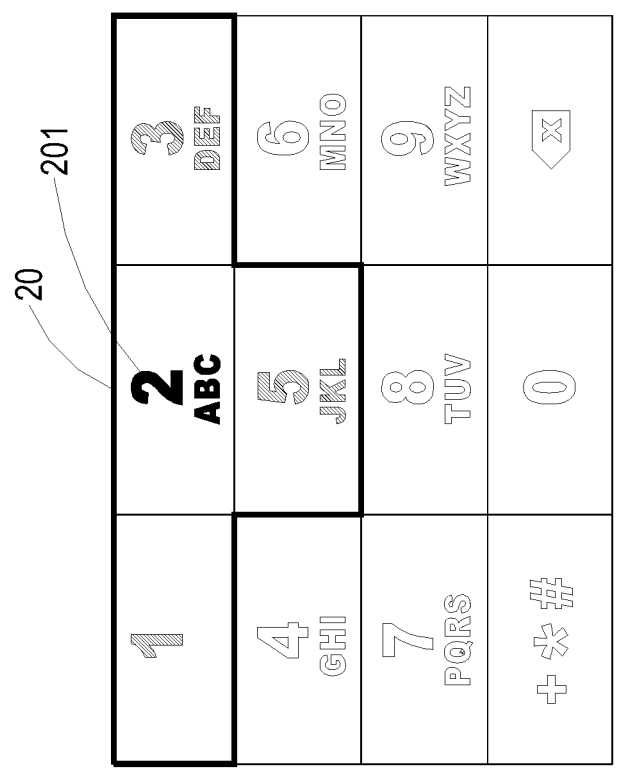

In the implementation example of FIG. 3A, the number key "1" is the center key 201 of the target zone 20 corresponding to the center key 122e of the navigation/direction pad of the remote controller 12. By pressing the center key 122e of the navigation/direction pad of the remote controller 12, the number "1" is inputted. By pressing the right key 122d of the navigation/direction pad of the remote controller 12, the number "2" is inputted. By pressing the down key 122b of the navigation/direction pad of the remote controller 12, the number "4" is inputted.

Moreover, by swinging the remote controller 12 leftwards or rightwards, the target zone 20 is moved to the left part or the right part of the numerical keyboard. For example, by swinging the remote controller 12 rightwards, the target zone 20 is moved to the right part of the numerical keyboard, and thus the center key 201 is switched from the number key "1" to the number key "2" (see FIG. 3B). By pressing the center key 122e of the navigation/direction pad of the remote controller 12, the number "1" is inputted. By pressing the left key 122c of the navigation/direction pad of the remote controller 12, the number "1" is inputted. By pressing the down key 122b of the navigation/direction pad of the remote controller 12, the number "5" is inputted. By pressing the right key 122d of the navigation/direction pad of the remote controller 12, the number "3" is inputted.

Figure 3C:
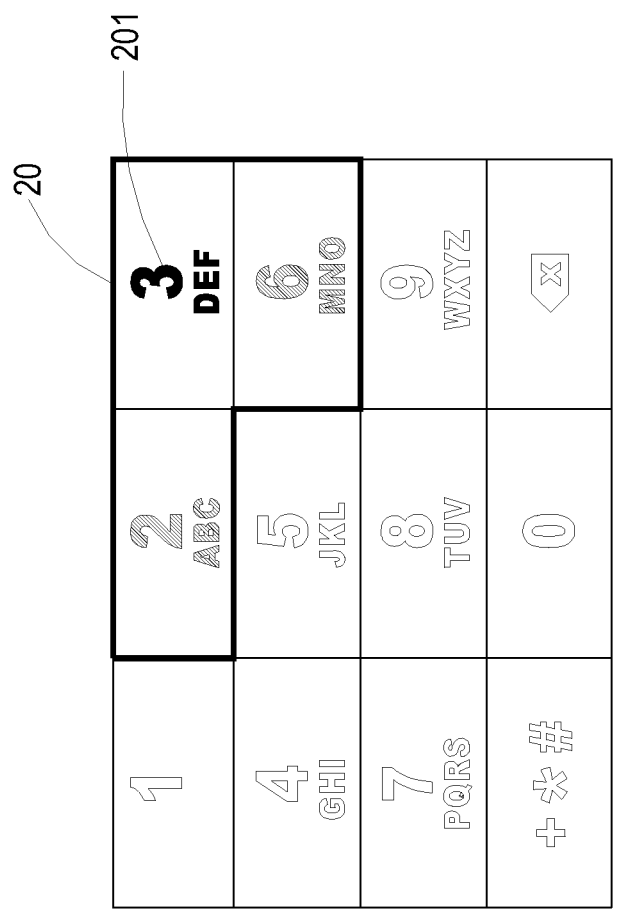

On the other hand, by continuously swinging the remote controller 12 rightwards, the center key 201 of the target zone 20 is switched to the number key "3" (see FIG. 3C). Under this circumstance, by pressing the center key 122e of the navigation/direction pad of the remote controller 12, the number "3" is inputted. By pressing the left key 122c of the navigation/direction pad of the remote controller 12, the number "2" is inputted. By pressing the down key 122b of the navigation/direction pad of the remote controller 12, the number "6" is inputted.

Figure 3D:
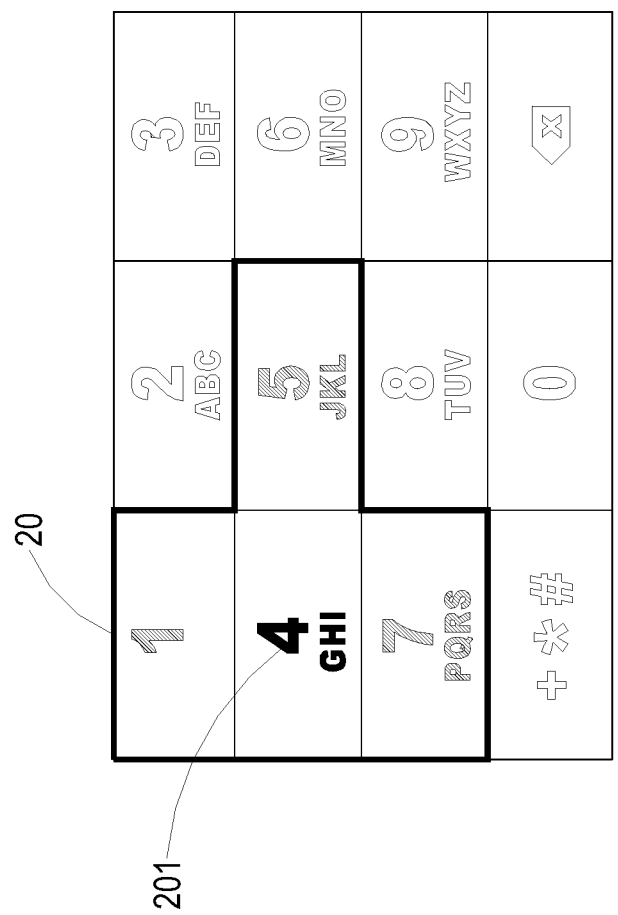

On the other hand, by swinging the remote controller 12 in the leftward direction and the downward direction, the center key 201 of the target zone 20 is switched to the number key "4" (see FIG. 3D). Under this circumstance, by pressing the center key 122e of the navigation/direction pad of the remote controller 12, the number "4" is inputted. By pressing the up key 122a of the navigation/direction pad of the remote controller 12, the number "1" is inputted. By pressing the right key 122d of the navigation/direction pad of the remote controller 12, the number "5" is inputted. By pressing the down key 122b of the navigation/direction pad of the remote controller 12, the number "7" is inputted.

Figure 3E:
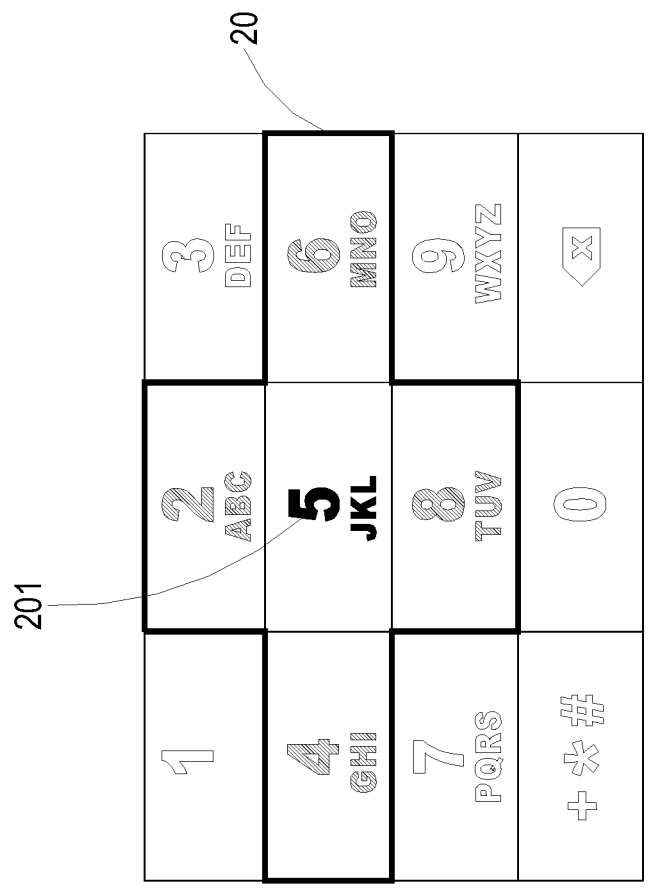

On the other hand, by continuously swinging the remote controller 12 rightwards, the center key 201 of the target zone 20 is switched to the number key "5" (see FIG. 3E). Under this circumstance, by pressing the center key 122e of the navigation/direction pad of the remote controller 12, the number key "5" is inputted. By pressing the up key 122a of the navigation/direction pad of the remote controller 12, the number "2" is inputted. By pressing the left key 122c of the navigation/direction pad of the remote controller 12, the number "4" is inputted. By pressing the right key 122d of the navigation/direction pad of the remote controller 12, the number "6" is inputted. By pressing the down key 122b of the navigation/direction pad of the remote controller 12, the number "8" is inputted.

Figure 3F:
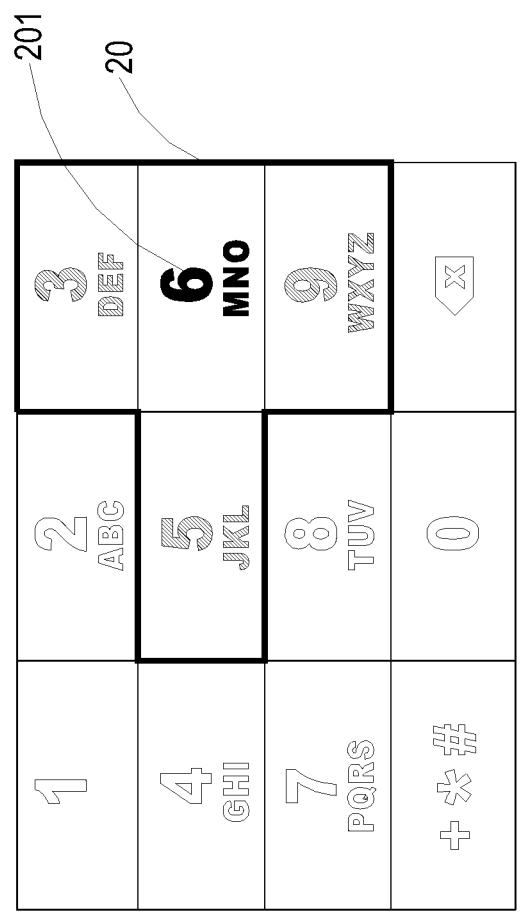

On the other hand, by continuously swinging the remote controller 12 rightwards, the center key 201 of the target zone 20 is switched to the number key "6" (see FIG. 3F). Under this circumstance, by pressing the center key 122e of the navigation/direction pad of the remote controller 12, the number "6" is inputted. By pressing the up key 122a of the navigation/direction pad of the remote controller 12, the number "3" is inputted. By pressing the left key 122c of the navigation/direction pad of the remote controller 12, the number "5" is inputted. By pressing the down key 122b of the navigation/direction pad of the remote controller 12, the number "9" is inputted.

Figure 3G:
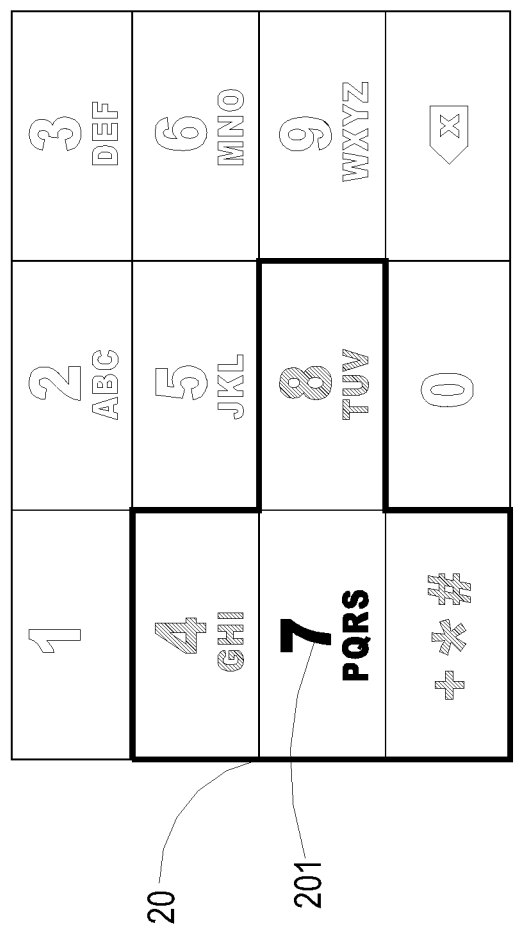

On the other hand, by swinging the remote controller 12 in the leftward direction and the downward direction, the center key 201 of the target zone 20 is switched to the number key "7" (see FIG. 3G). Under this circumstance, by pressing the center key 122e of the navigation/direction pad of the remote controller 12, the number "7" is inputted. By pressing the up key 122a of the navigation/direction pad of the remote controller 12, the number "4" is inputted. By pressing the right key 122d of the navigation/direction pad of the remote controller 12, the number "8" is inputted. By pressing the down key 122b of the navigation/direction pad of the remote controller 12, the special character "+*#" is inputted.

Figure 3H:
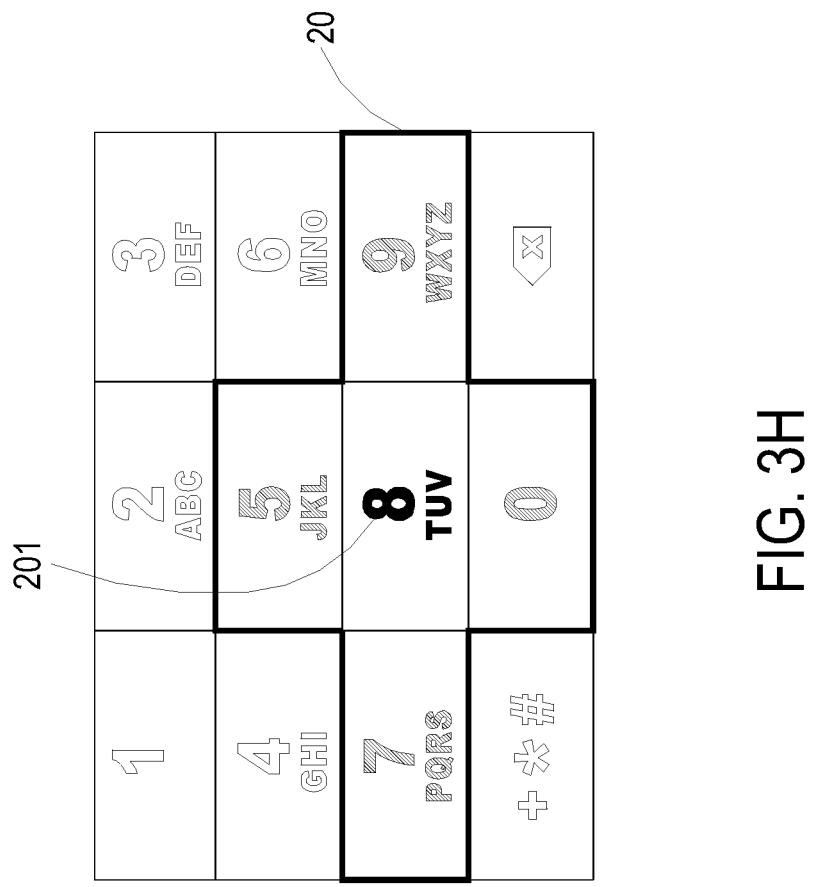

On the other hand, by continuously swinging the remote controller 12 rightwards, the center key 201 of the target zone 20 is switched to the number key "8" (see FIG. 3H). Under this circumstance, by pressing the center key 122e of the navigation/direction pad of the remote controller 12, the number "8" is inputted. By pressing the up key 122a of the navigation/direction pad of the remote controller 12, the number "5" is inputted. By pressing the left key 122c of the navigation/direction pad of the remote controller 12, the number "7" is inputted. By pressing the right key 122d of the navigation/direction pad of the remote controller 12, the number "9" is inputted. By pressing the down key 122b of the navigation/direction pad of the remote controller 12, the number "0" is inputted.

Figure 3I:
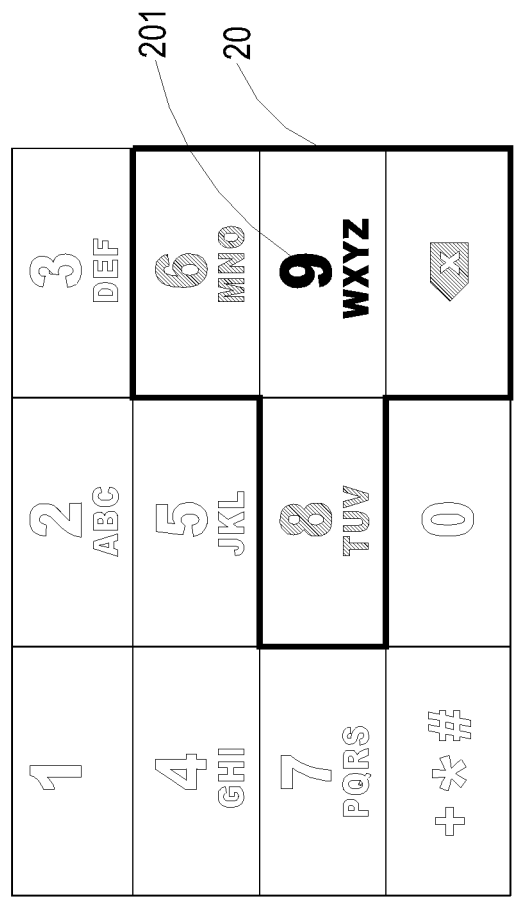

On the other hand, by continuously swinging the remote controller 12 rightwards, the center key 201 of the target zone 20 is switched to the number key "9" (see FIG. 3I). Under this circumstance, by pressing the center key 122e of the navigation/direction pad of the remote controller 12, the number "9" is inputted. By pressing the up key 122a of the navigation/direction pad of the remote controller 12, the number "6" is inputted. By pressing the left key 122c of the navigation/direction pad of the remote controller 12, the number "8" is inputted. By pressing the down key 122b of the navigation/direction pad of the remote controller 12, the special character "<x" is inputted.

Figure 3J:
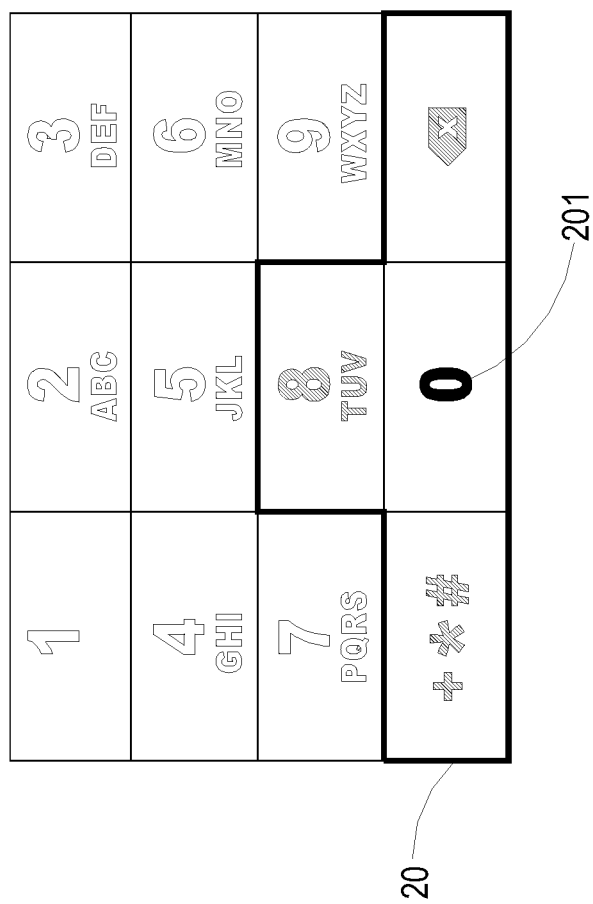

On the other hand, by swinging the remote controller 12 in the leftward direction and the downward direction, the center key 201 of the target zone 20 is switched to the number key "0" (see FIG. 3J). Under this circumstance, by pressing the center key 122e of the navigation/direction pad of the remote controller 12, the number "0" is inputted. By pressing the up key 122a of the navigation/direction pad of the remote controller 12, the number "8" is inputted. By pressing the left key 122c of the navigation/direction pad of the remote controller 12, the special character "+*#" is inputted. By pressing the right key 122d of the navigation/direction pad of the remote controller 12, the special character "<x" is inputted.

Figure 3K:
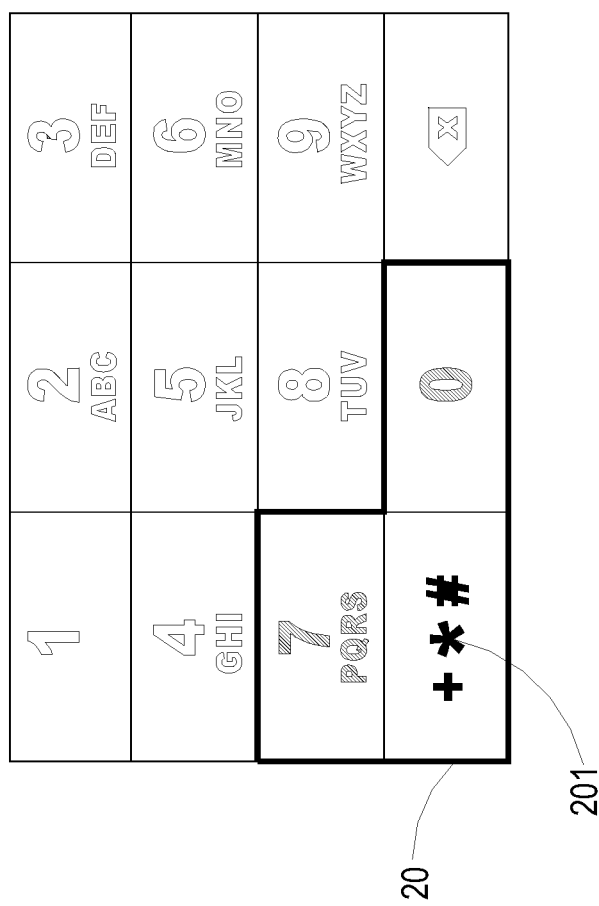

On the other hand, by continuously swinging the remote controller 12 leftwards, the center key 201 of the target zone 20 is switched to the special character key "+*#" (see FIG. 3K). Under this circumstance, by pressing the center key 122e of the navigation/direction pad of the remote controller 12, the special character "+*#" is inputted. By pressing the up key 122a of the navigation/direction pad of the remote controller 12, the number "7" is inputted. By pressing the right key 122d of the navigation/direction pad of the remote controller 12, the number "0" is inputted.

Figure 3L:
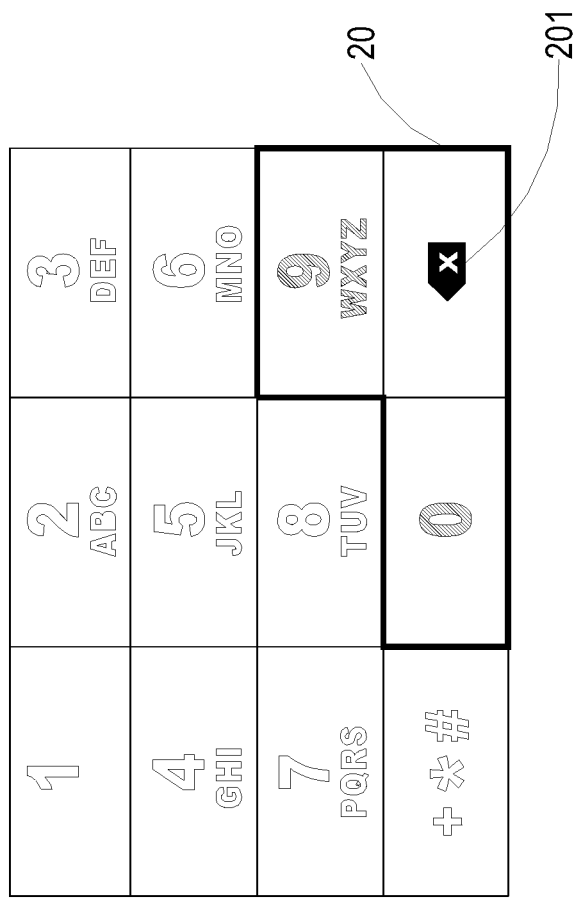

On the other hand, by continuously swinging the remote controller 12 rightwards, the center key 201 of the target zone 20 is switched to the special character key "<x" (see FIG. 3L). Under this circumstance, by pressing the center key 122e of the navigation/direction pad of the remote controller 12, the special character "<x" is inputted. By pressing the left key 122c of the navigation/direction pad of the remote controller 12, the number "0" is inputted. By pressing the up key 122a of the navigation/direction pad of the remote controller 12, the number "9" is inputted.

Consequently, by operating the navigation/direction pad (i.e. the keys 122a~122e) of the remote controller 12, the numerical keyboard shown on the display screen can be correspondingly controlled to input numbers. Under this circumstance, the demands on the sensibility of the remote controller and the precision of swinging remote controller are largely reduced.

Hereinafter, the uses of the intelligent input method of the present invention to operate another type of virtual keyboard will be illustrated with reference to FIG. 1 and FIGS. 4A~4D.

FIGS. 4A~4D schematically illustrate the implementation examples of an intelligent input system and an intelligent input method according to another embodiment of the present invention. In FIGS. 4A~4D, the layout of three horizontally-arranged keys of the remote controller 12 is mapped onto the virtual keyboard 102a of the display screen 102. In this embodiment, the virtual keyboard 102a is different from the standard QWERTY keyboard of FIGS. 2A~2G. Whereas, the virtual keyboard 102a of this embodiment is a virtual keyboard of a smart phone or a tablet personal computer. Three horizontally-arranged keys of the remote controller 12 are used to control number/character input of three corresponding keys of the virtual keyboard 102a. For example, the three horizontally-arranged keys of the remote controller 12 include the left key 122c, the center key 122e and the right key 122d of the navigation/direction pad. The key corresponding to the position of a hidden cursor or indicator on the virtual keyboard 102a of the display screen is set as the center key 201. The circumscribed highlighted keys of the target zone 20 comprise the center key 201 and two horizontally-neighboring keys at the left and right sides of the center key 201. For clarification, the operations of this embodiment will be illustrated by referring the left key 122c, the center key 122e and the right key 122d of the navigation/direction pad as the three horizontally-arranged keys.

Figure 4A:
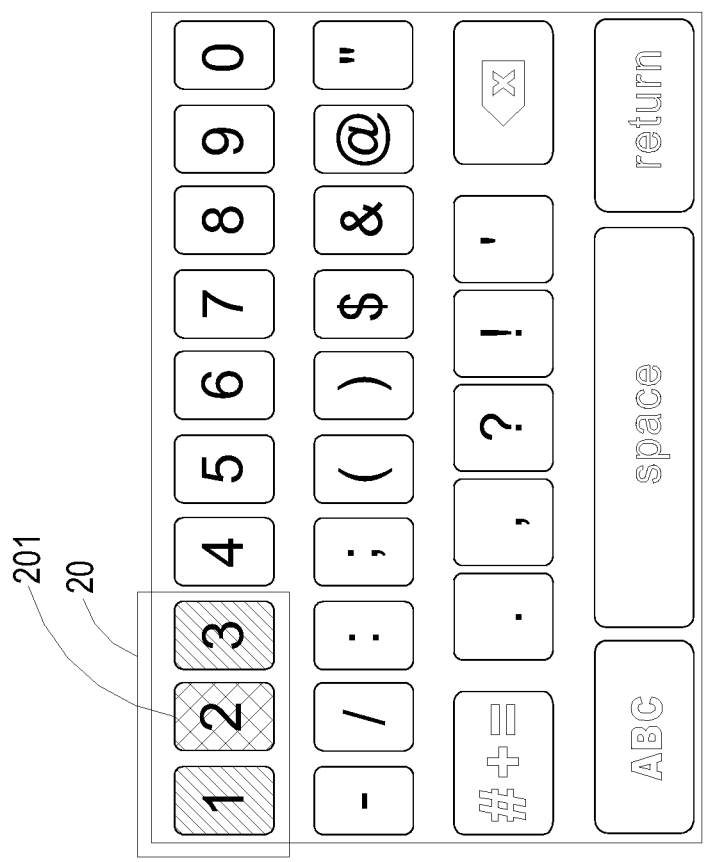
FIGS. 4A~4D schematically illustrate the implementation examples of an intelligent input system and an intelligent input method according to another embodiment of the present invention.

In the implementation example of FIG. 4A, the number key "2" is the center key 201 of the target zone 20 corresponding to the center key 122e of the navigation/direction pad of the remote controller 12. The two horizontally-neighboring keys of the number key "2" include the number key "1" and the number key "3". Consequently, the number key "2", the number key "1" and the number key "3" are highlighted. By pressing the center key 122e of the navigation/direction pad of the remote controller 12, the number "2" is inputted. By pressing the left key 122c of the navigation/direction pad of the remote controller 12, the number "1" is inputted. By pressing the right key 122d of the navigation/direction pad of the remote controller 12, the number "3" is inputted.

Figure 4B:
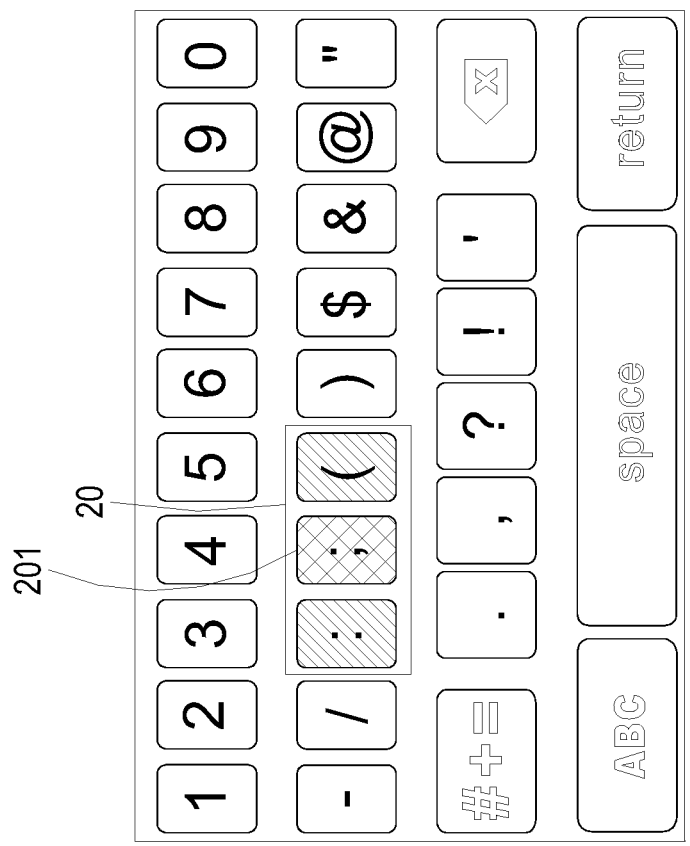

In the implementation example of FIG. 4B, the semicolon key ";" is the center key 201 of the target zone 20 corresponding to the center key 122e of the navigation/direction pad of the remote controller 12. The two horizontally-neighboring keys of the semicolon key ";" include the colon key ":" and the bracket key "(". Consequently, the semicolon key ";", the colon key ":" and the bracket key "(" are highlighted. By pressing the center key 122e of the navigation/direction pad of the remote controller 12, the semicolon punctuation ";" is inputted. By pressing the left key 122c of the navigation/direction pad of the remote controller 12, the colon punctuation ":" is inputted. By pressing the right key 122d of the navigation/direction pad of the remote controller 12, the bracket punctuation "(" is inputted.

Figure 4C:
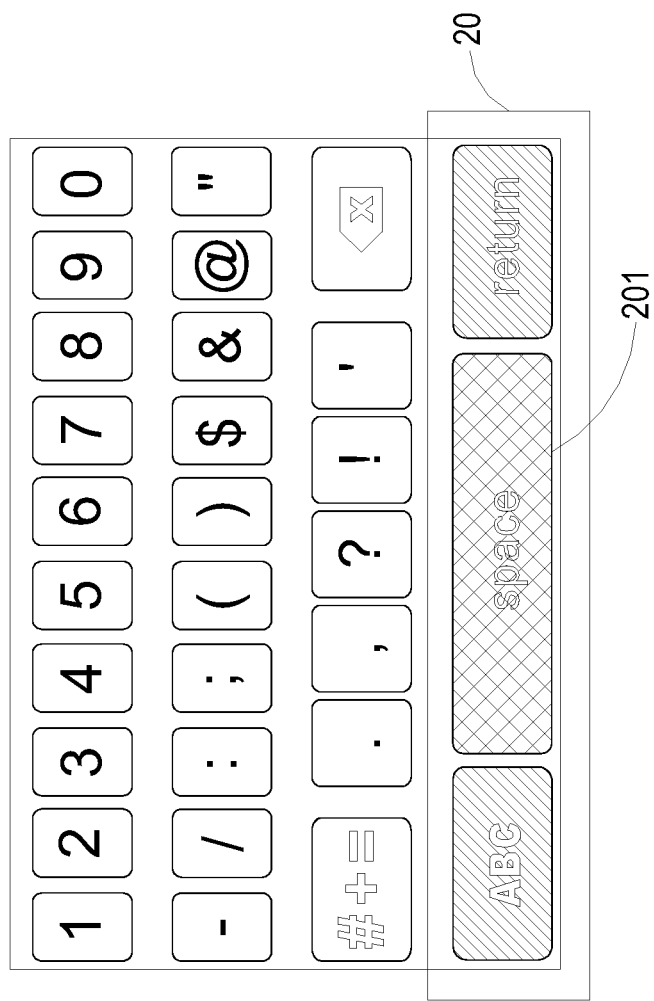

In the implementation example of FIG. 4C, the space key "space" is the center key 201 of the target zone 20 corresponding to the center key 122e of the navigation/direction pad of the remote controller 12. The two horizontally-neighboring keys of the space key "space" include the mode-switching key "ABC" and the return key "return". Consequently, the space key "space", the mode-switching key "ABC" and the return key "return" are highlighted. By pressing the center key 122e of the navigation/direction pad of the remote controller 12, a space is inputted. By pressing the left key 122c of the navigation/direction pad of the remote controller 12, the function of the mode-switching key "ABC" is executed. By pressing the right key 122d of the navigation/direction pad of the remote controller 12, the function of the return key "return" is executed.

Figure 4D:
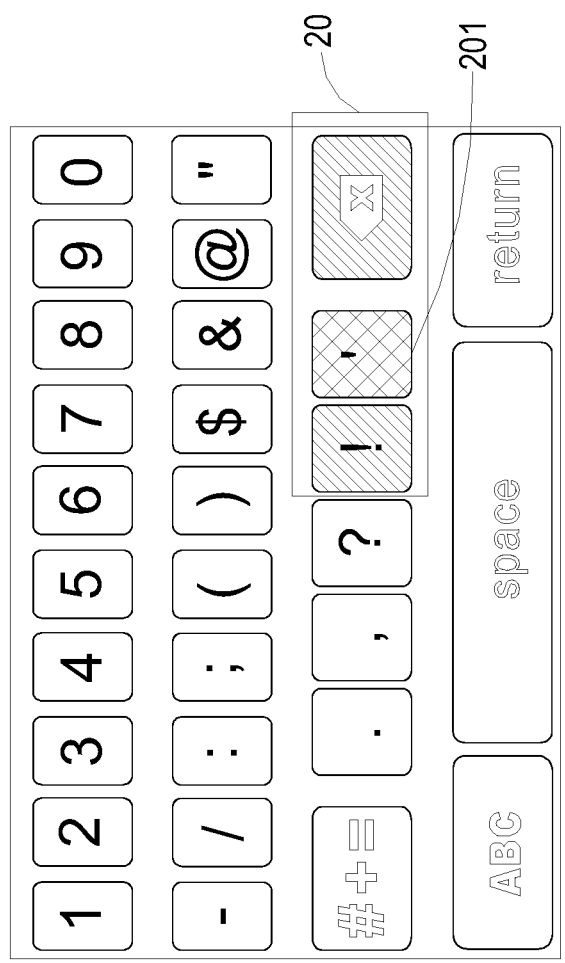

In the implementation example of FIG. 4D, the apostrophe key "'" is the center key 201 of the target zone 20 corresponding to the center key 122e of the navigation/direction pad of the remote controller 12. The two horizontally-neighboring keys of the apostrophe key "'" include the exclamation mark key "!" and the special character key "<x". Consequently, the apostrophe key "'", the exclamation mark key "!" and the special character key "<x" are highlighted. By pressing the center key 122e of the navigation/direction pad of the remote controller 12, an apostrophe punctuation "'" is inputted. By pressing the left key 122c of the navigation/direction pad of the remote controller 12, the exclamation mark "!" is inputted. By pressing the right key 122d of the navigation/direction pad of the remote controller 12, the special character "<x" is inputted.

Please refer to FIG. 1 and FIGS. 5A~5D. FIGS. 5A~5D schematically illustrate the implementation examples of an intelligent input system and an intelligent input method according to another embodiment of the present invention. In FIGS. 5A~5D, the layout of three vertically-arranged keys of the remote controller 12 is mapped onto the virtual keyboard 102a of the display screen 102. In this embodiment, the virtual keyboard 102a is different from the standard QWERTY keyboard of FIGS. 2A~2G. Whereas, the virtual keyboard 102a of this embodiment is a virtual keyboard of a smart phone or a tablet personal computer. Three vertically-arranged keys of the remote controller 12 are used to control number/character input of three corresponding keys of the virtual keyboard 102a. For example, the three vertically-arranged keys of the remote controller 12 include the up key 122a, the center key 122e and the down key 122b of the navigation/direction pad. The key corresponding to the position of a hidden cursor or indicator on the virtual keyboard 102a of the display screen is set as the center key 201. The circumscribed highlighted keys of the target zone 20 comprise the center key 201 and two vertically-neighboring keys at the top and bottom sides of the center key 201. For clarification, the operations of this embodiment will be illustrated by referring the up key 122a, the center key 122e and the down key 122b of the navigation/direction pad as the three horizontally-arranged keys.

Figure 5A:
FIGS. 5A~5D schematically illustrate the implementation examples of an intelligent input system and an intelligent input method according to another embodiment of the present invention.

In the implementation example of FIG. 5A, the hyphen key "-" is the center key 201 of the target zone 20 corresponding to the center key 122e of the navigation/direction pad of the remote controller 12. The two vertically-neighboring keys of the hyphen key "-" include the square bracket key "[" and the mode-switching key "123". Consequently, the hyphen key "-", the square bracket key "[" and the mode-switching key "123" are highlighted. By pressing the center key 122e of the navigation/direction pad of the remote controller 12, the hyphen punctuation "-" is inputted. By pressing the up key 122a of the navigation/direction pad of the remote controller 12, the square bracket punctuation "[" is inputted. By pressing the down key 122b down key 122b of the navigation/direction pad of the remote controller 12, the function of the mode-switching key "123" is executed.

Figure 5B:
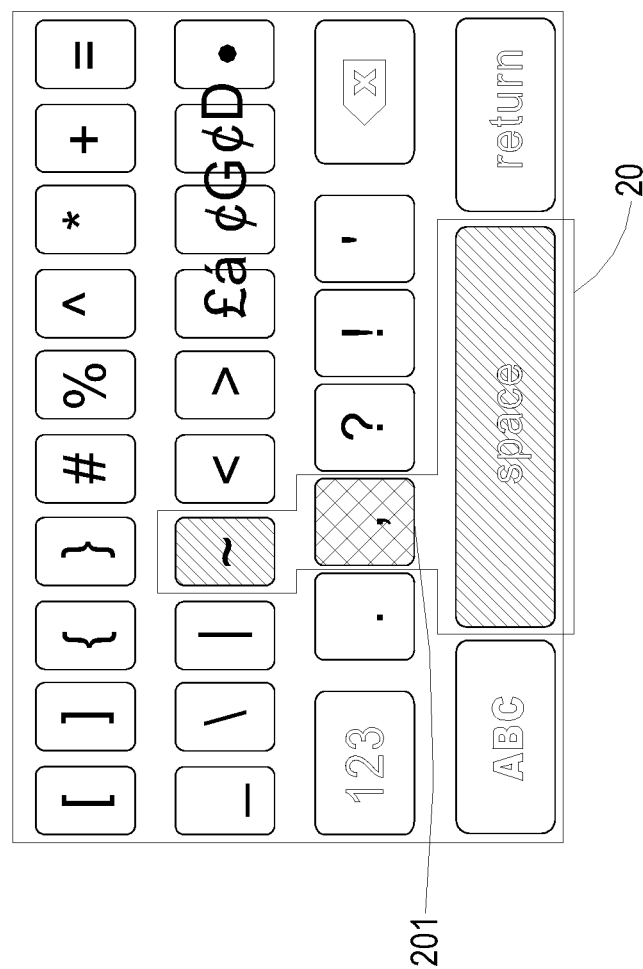

In the implementation example of FIG. 5B, the comma key "," is the center key 201 of the target zone 20 corresponding to the center key 122e of the navigation/direction pad of the remote controller 12. The two vertically-neighboring keys include the squiggle key "~" and the space key "space". Consequently, the comma key ",", the squiggle key "~" and the space key "space" are highlighted. By pressing the center key 122e of the navigation/direction pad of the remote controller 12, the comma punctuation "," is inputted. By pressing the up key 122a of the navigation/direction pad of the remote controller 12, the squiggle punctuation "~" is inputted. By pressing the down key 122b down key 122b of the navigation/direction pad of the remote controller 12, a space is inputted.

Figure 5C:
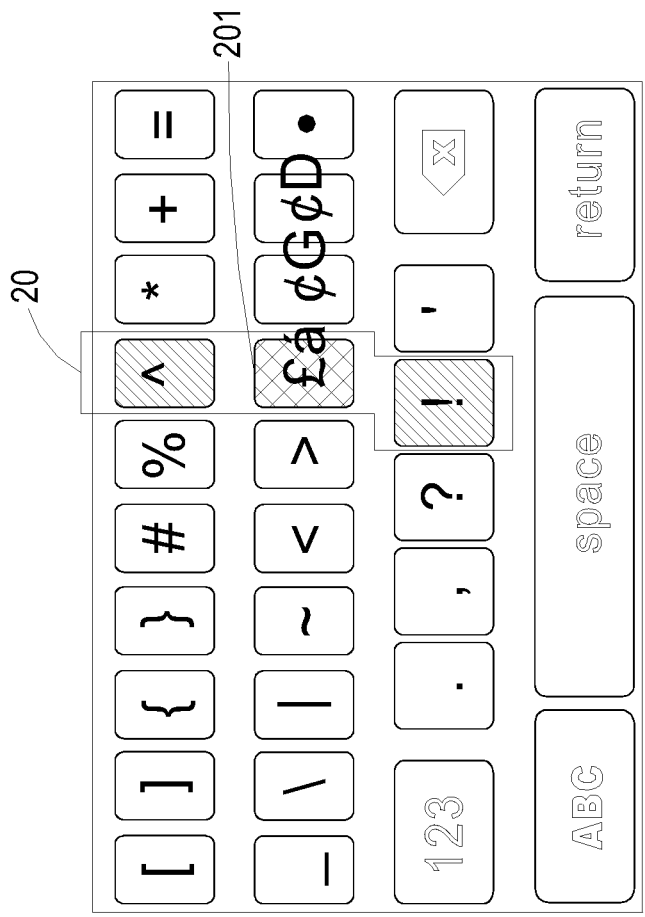

In the implementation example of FIG. 5C, the euro currency key "€" is the center key 201 of the target zone 20 corresponding to the center key 122e of the navigation/direction pad of the remote controller 12. The two vertically-neighboring keys of the euro currency key "€" include the caret key "^" and the exclamation mark key "!". Consequently, the euro currency key "€", the caret key "^" and the exclamation mark key "!" are highlighted. By pressing the center key 122e of the navigation/direction pad of the remote controller 12, the euro currency symbol "€" is inputted. By pressing the up key 122a of the navigation/direction pad of the remote controller 12, the caret symbol "^" is inputted. By pressing the down key 122b down key 122b of the navigation/direction pad of the remote controller 12, an exclamation "!" is inputted.

Figure 5D:
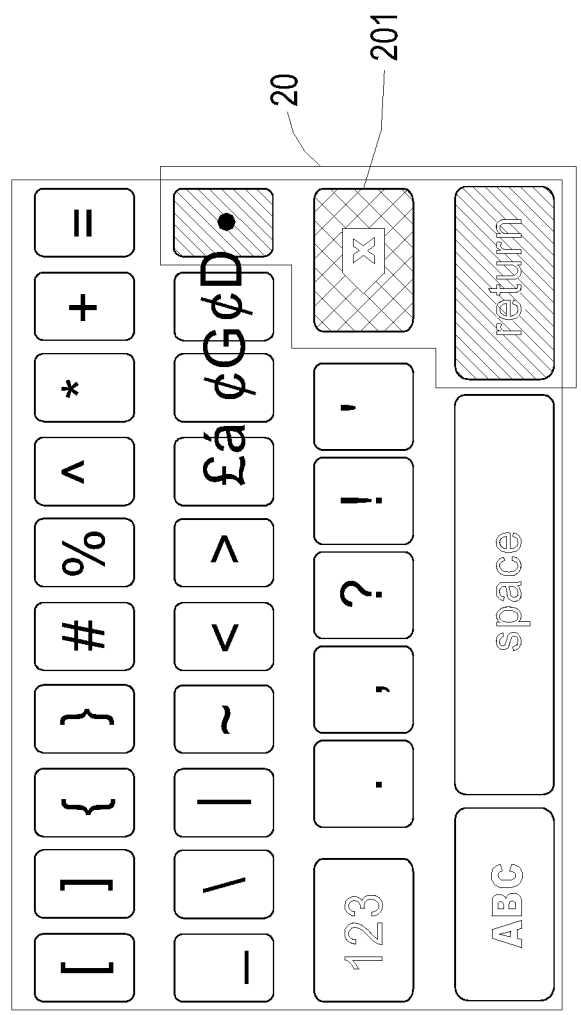

In the implementation example of FIG. 5D, the special character key "<x" is the center key 201 of the target zone 20 corresponding to the center key 122e of the navigation/direction pad of the remote controller 12. The two vertically-neighboring keys of the special character key "<x" include the separation dot key "•" and the return key "return". Consequently, the special character key "<x", the separation dot key "•" and the return key "return" are highlighted. By pressing the center key 122e of the navigation/direction pad of the remote controller 12, the special character "<x" is inputted. By pressing the up key 122a of the navigation/direction pad of the remote controller 12, the separation dot "•" is inputted. By pressing the down key 122b down key 122b of the navigation/direction pad of the remote controller 12, the function of the return key "return" is executed.

Please refer to FIG. 1 and FIGS. 6A~6D. FIGS. 6A~6D schematically illustrate the implementation examples of an intelligent input system and an intelligent input method according to another embodiment of the present invention. In FIGS. 6A~6D, the layout of three horizontally-arranged keys of the remote controller 12 is mapped onto the virtual keyboard 102a of the display screen 102. In this embodiment, the virtual keyboard 102a is a numerical keyboard. Three horizontally-arranged keys of the remote controller 12 are used to control number input of three corresponding keys of the virtual keyboard 102a. For example, the three horizontally-arranged keys of the remote controller 12 include the left key 122c, the center key 122e and the right key 122d of the navigation/direction pad. The key corresponding to the position of a hidden cursor or indicator on the virtual keyboard 102a of the display screen is set as the center key 201. The circumscribed highlighted keys of the target zone 20 comprise the center key 201 and two horizontally-neighboring keys at the left and right sides of the center key 201.

Figure 6A:
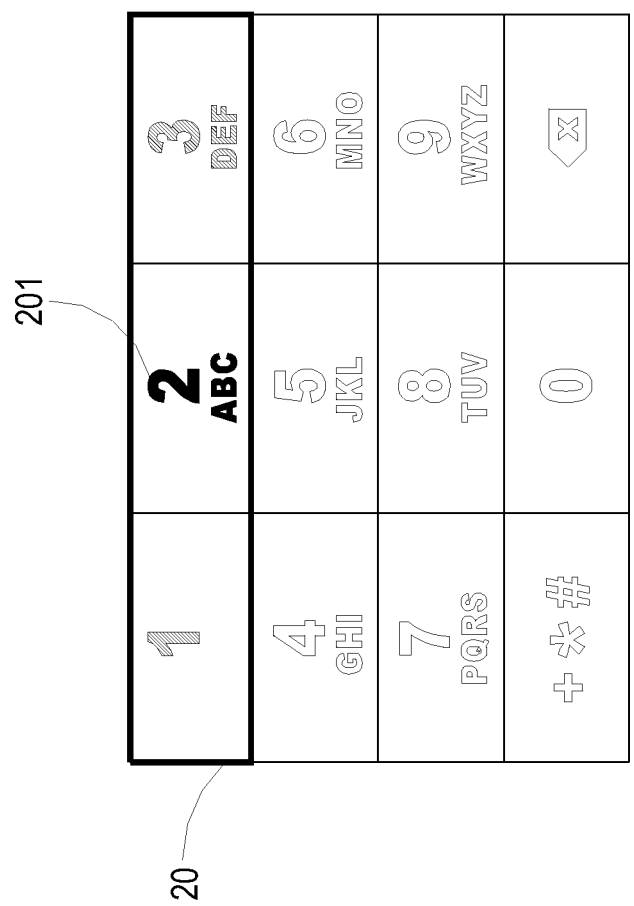
FIGS. 6A~6D schematically illustrate the implementation examples of an intelligent input system and an intelligent input method according to another embodiment of the present invention.

In the implementation example of FIG. 6A, the three keys in the first row are the circumscribed keys of the target zone 20. By pressing the center key 122e of the navigation/direction pad of the remote controller 12, the number "2" is inputted. By pressing the left key 122c of the navigation/direction pad of the remote controller 12, the number "1" is inputted. By pressing the right key 122d of the navigation/direction pad of the remote controller 12, the number "3" is inputted.

Figure 6B:
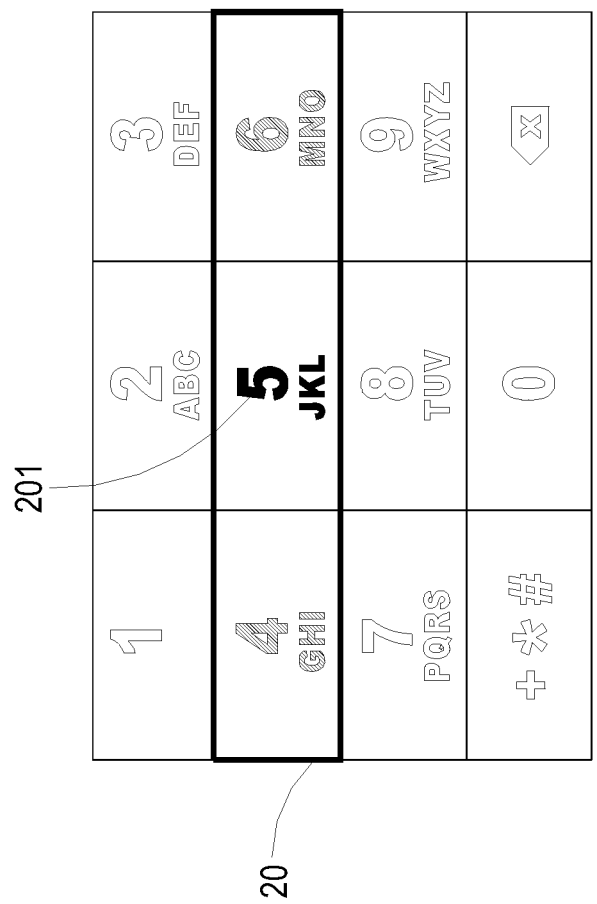

In the implementation example of FIG. 6B, the three keys in the second row are the circumscribed keys of the target zone 20. By pressing the center key 122e of the navigation/direction pad of the remote controller 12, the number "5" is inputted. By pressing the left key 122c of the navigation/direction pad of the remote controller 12, the number "4" is inputted. By pressing the right key 122d of the navigation/direction pad of the remote controller 12, the number "6" is inputted.

Figure 6C:
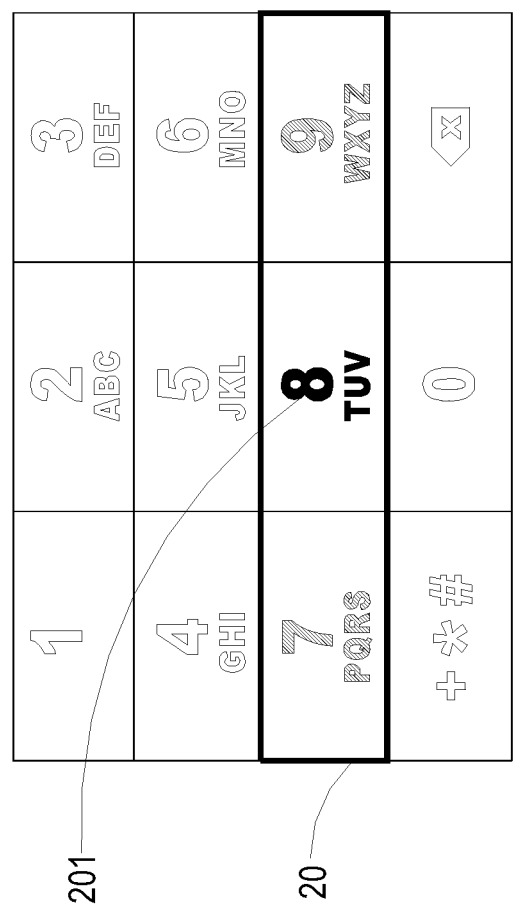

In the implementation example of FIG. 6C, the three keys in the third row are the circumscribed keys of the target zone 20. By pressing the center key 122e of the navigation/direction pad of the remote controller 12, the number "8" is inputted. By pressing the left key 122c of the navigation/direction pad of the remote controller 12, the number "7" is inputted. By pressing the right key 122d of the navigation/direction pad of the remote controller 12, the number "9" is inputted.

Figure 6D:
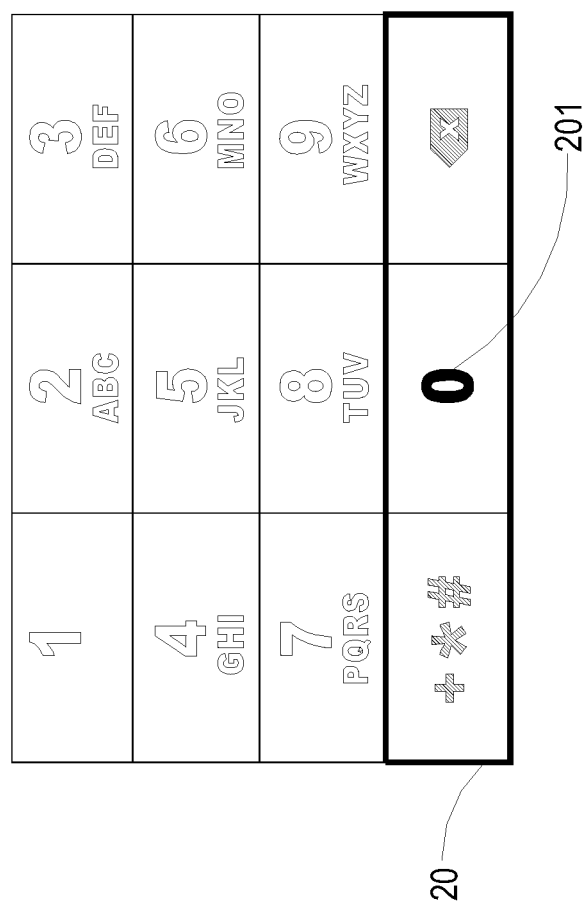

In the implementation example of FIG. 6D, the three keys in the fourth row are the circumscribed keys of the target zone 20. By pressing the center key 122e of the navigation/direction pad of the remote controller 12, the number "0" is inputted. By pressing the left key 122c of the navigation/direction pad of the remote controller 12, the special character "+*#" is inputted. By pressing the right key 122d of the navigation/direction pad of the remote controller 12, the special character "<x" is inputted.

In the above embodiments of FIGS. 1~6D, the present invention provides an intelligent input system and an intelligent input method. The intelligent input system comprises an electronic device and an input device. A virtual keyboard is shown on a display screen of the electronic device. The input device is for example a remote controller with physical keys. The input device is in communication with the electronic device. Moreover, the input device comprises an input control keypad for controlling a hidden cursor or indicator on the display screen of the electronic device. Consequently, the input of the virtual keyboard is correspondingly controlled in response to the operations of the input control keypad. Moreover, the key corresponding to the position of the hidden cursor or indicator of the display screen is set as a center virtual key. The center virtual key is set to be correlated with a center physical key of the input control keypad. According to a layout of the input control keypad, the virtual keys corresponding to the center physical key and its neighboring virtual keys are displayed as a highlighted target zone. As the remote controller is swung, the target zone is correspondingly moved in the same direction as the remote controller. By operating the input control keypad of the remote controller, the virtual keys of the target zone may be controlled to input characters and/or numbers. Consequently, the demands on the sensibility of the remote controller and the precision of swinging remote controller are largely reduced.

In the above embodiments, the operations of the physical keys of the input device may correspondingly control the character/number input of the virtual keys of the virtual keyboard shown on the display screen. In the following embodiments, the operations of the physical keys of the input device may correspondingly control input of the selective items. For example, in the architecture of an intelligent input system of FIG. 7, the operations of the physical keys of the remote controller 12 may correspondingly control a multimedia content 102b shown on the display screen 102. For example, the multimedia content 102b contains graphical user interfaces (GUI), icons, function tabs, photos, videos or other objects shown on a drop down menu, a desktop icon layout or an editing application software.

Figure 8A:
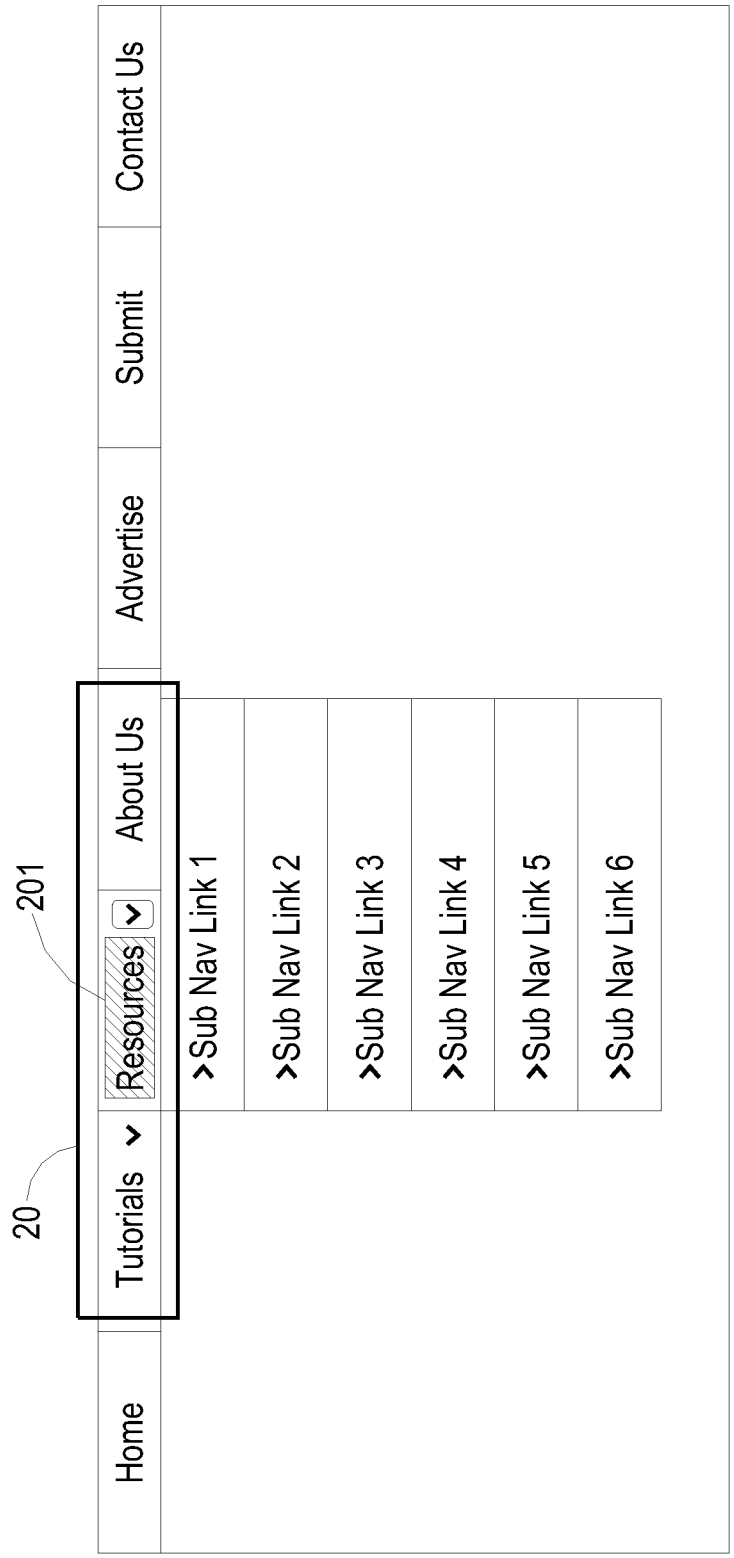
FIGS. 8A~8C schematically illustrate the implementation examples of an intelligent input system and an intelligent input method according to another embodiment of the present invention.
Figure 8B:
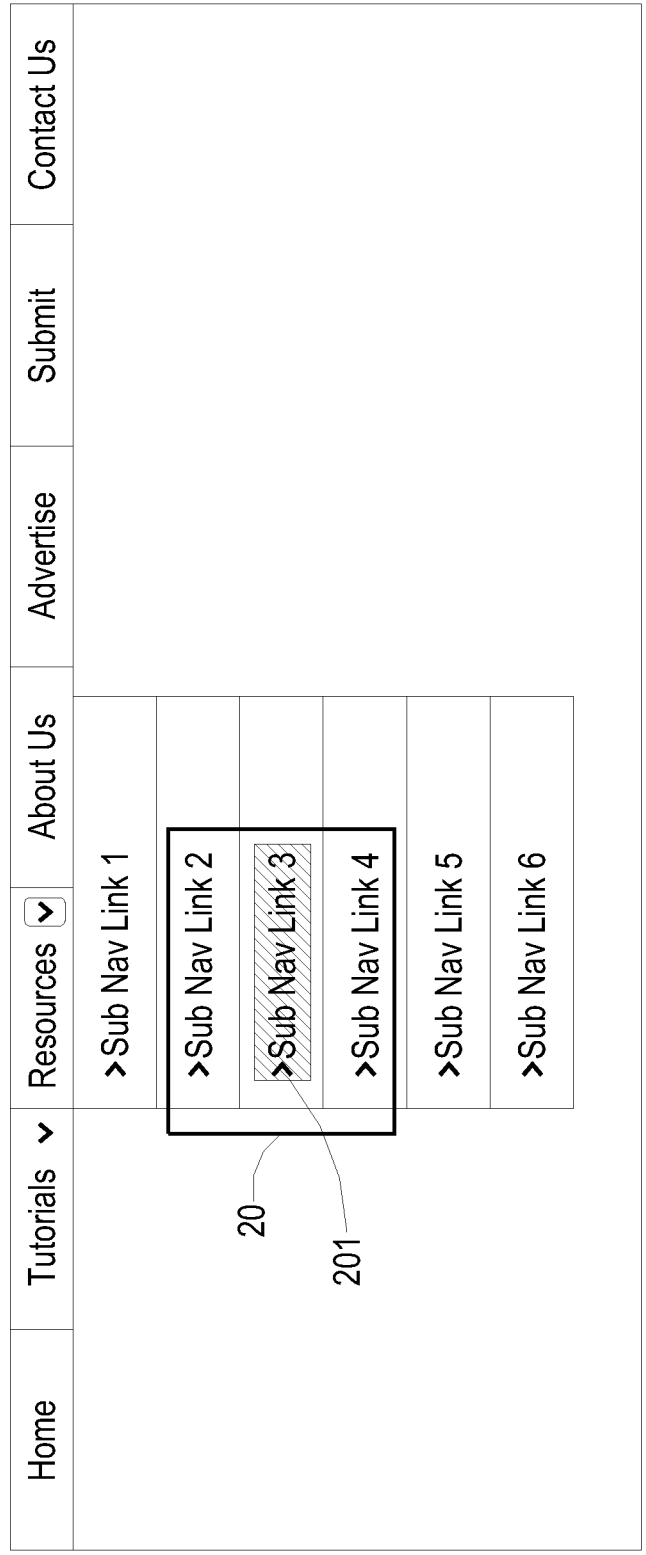
Figure 8C:
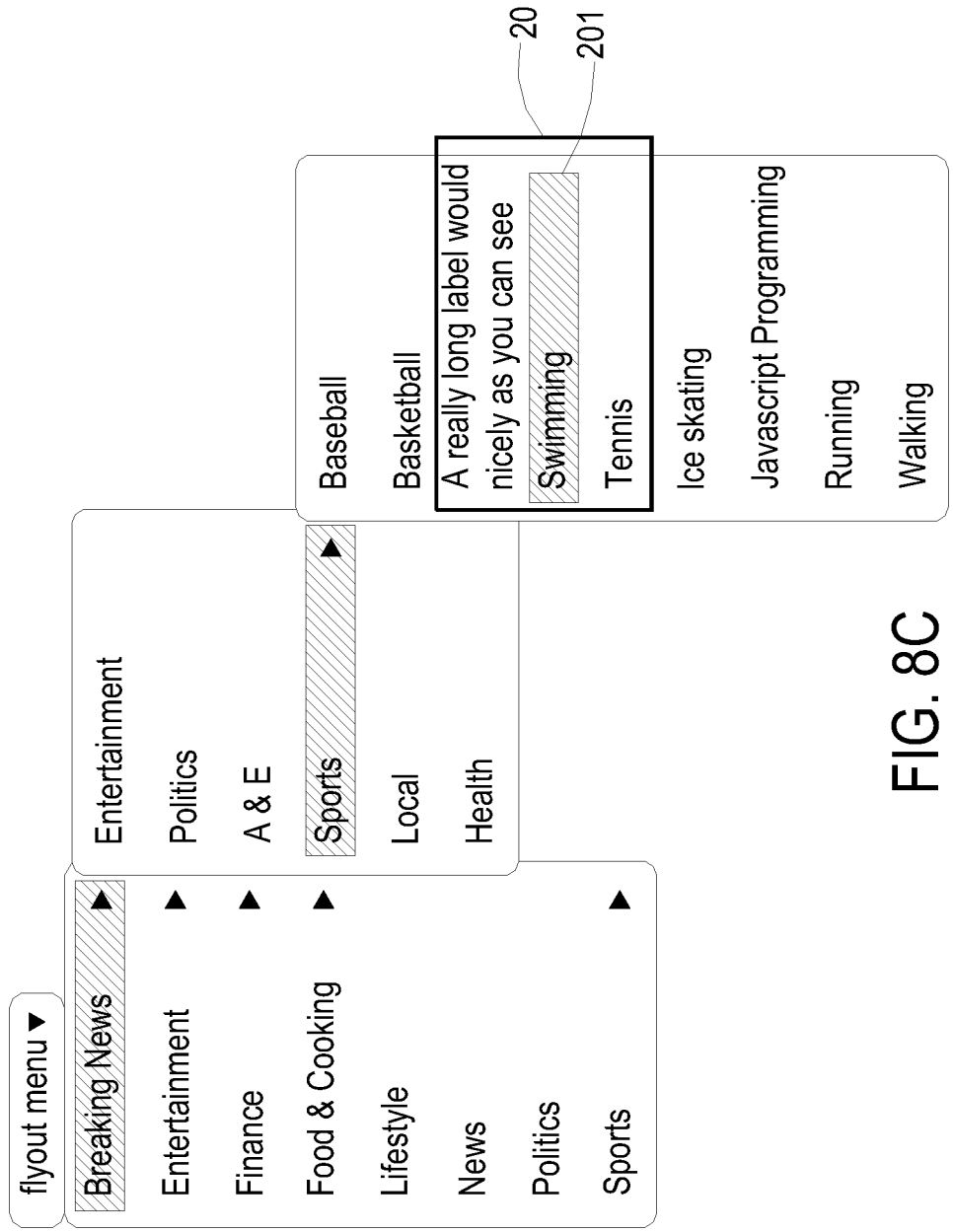

Please refer to FIG. 7 and FIGS. 8A~8C. FIGS. 8A~8C schematically illustrate the implementation examples of an intelligent input system and an intelligent input method according to another embodiment of the present invention. In this embodiment, the multimedia content 102b shown on the display screen 10 is a drop down menu. Moreover, the selective item corresponding to the position of a hidden cursor or indicator of the display screen is set as a center selective item 201. For clarification, the hidden cursor or indicator is not shown. Moreover, the circumscribed selective items of the target zone 20 are highlighted to assist the user in identifying which selective items of the drop down menu correspond to the keys of the 5-direction navigation/direction pad (i.e. the keys 122a~122e) or the 3×3 numerical keypad 128 of the remote controller 12.

Similarly, by swinging the remote controller 12 leftwards or rightwards or by controlling a pointing device on the remote controller 12, the target zone 20 is moved to the left part or the right part of the drop down menu. Then, by pressing the key of navigation/direction pad (122a~122e), a target selective item can be selected.

Moreover, the selective item corresponding to the position of a hidden cursor or indicator of the display screen is set as the center selective item 201. In the implementation example of FIG. 8A, the center selective item 201 is the selective item "Resources". By pressing the center key 122e of the navigation/direction pad of the remote controller 12, the selective item "Resources" is selected. By pressing the left key 122c of the navigation/direction pad of the remote controller 12, the selective item "Tutorials" is selected. By pressing the right key 122d of the navigation/direction pad of the remote controller 12, the selective item "About Us" is selected.

After the menus drops down, the user may operate the built-in pointing device of the remote controller 12 to move the target zone 20 upwardly or downwardly in the vertical direction. Then, by pressing the key of navigation/direction pad (122a~122e), a target selective item can be selected. In the implementation example of FIG. 8B, the center selective item 201 is the selective item "Sub Nav Link 3". By pressing the center key 122e of the navigation/direction pad of the remote controller 12, the selective item "Sub Nav Link 3" is selected. By pressing the up key 122a of the navigation/direction pad of the remote controller 12, the selective item "Sub Nav Link 2" is selected. By pressing the down key 122b of the navigation/direction pad of the remote controller 12, the selective item "Sub Nav Link 4" is selected.

The above concepts may be applied to a multi-layer drop down menu. In the implementation example of FIG. 8C, the center selective item 201 is the selective item "Swimming". By pressing the center key 122e of the navigation/direction pad of the remote controller 12, the selective item "Swimming" is selected. By pressing the up key 122a of the navigation/direction pad of the remote controller 12, the selective item "A really long label . . . " is selected. By pressing the down key 122b of the navigation/direction pad of the remote controller 12, the selective item "Tennis" is selected.

In some other embodiments, the layout of the navigation/direction pad of the remote controller 12 may be realized on a 3×3 numerical keypad. The 3×3 numerical keypad includes the number keys 1, 2, 3, 4, 5, 6, 7, 8 and 9 of the numerical keypad 128. The number keys 1, 2 and 3 are located at the topmost row of the 3×3 numerical keypad; the number keys 4, 5 and 6 are located at the middle row of the 3×3 numerical keypad; and the number keys 7, 8 and 9 are located at the bottommost row of the 3×3 numerical keypad. In other words, the upper key 122a of the navigation/direction pad is realized by the key "2" of the 3×3 numerical keypad; the left key 122c of the navigation/direction pad is realized by the key "4" of the 3×3 numerical keypad; the center key 122e of the navigation/direction pad is realized by the key "5" of the 3×3 numerical keypad; the right key 122d of the navigation/direction pad is realized by the key "6" of the 3×3 numerical keypad; and the down key 122b of the navigation/direction pad is realized by the key "8" of the 3×3 numerical keypad.

In accordance with a benefit of this embodiment, the non-technical-savvy (NTS) who is not familiar with or not good at the use of the TV remote controller can easily browse the layers of the GUI (graphical user interface) objects. Moreover, the remote controller 12 is used to move the highlighted target zone 20 including plural selective items, instead of the cursor point. The highlighted target zone 20 may have a green color or a red color. Consequently, the demands on the sensibility of the remote controller and the precision of swinging remote controller are largely reduced.

Please refer to FIG. 7 and FIGS. 9A~9E. FIGS. 9A~9E schematically illustrate the implementation examples of an intelligent input system and an intelligent input method according to another embodiment of the present invention. In this embodiment, the multimedia content 102*b* shown on the display screen 10 is a desktop icon layout. Moreover, the icon corresponding to the position of a hidden cursor or indicator of the display screen is set as a center icon 201. Moreover, the circumscribed icons of the target zone 20 are highlighted to assist the user in identifying which icons of the desktop icon layout correspond to the keys of the navigation/direction pad (i.e. the keys 122*a*~122*e*) or the 3×3 numerical keypad 128 of the remote controller 12. In the implementation example of FIG. 9A, the center icon 201 is the icon "MLB.TV". By pressing the center key 122*e* of the navigation/direction pad of the remote controller 12, the icon "MLB.TV" is selected. By pressing the up key 122*a* of the navigation/direction pad of the remote controller 12, the icon "TV Shows" is selected. By pressing the down key 122*b* of the navigation/direction pad of the remote controller 12, the icon "YouTube" is selected. By pressing the left key 122*c* of the navigation/direction pad of the remote controller 12, the icon "NETFLIX" is selected. By pressing the right key 122*d* of the navigation/direction pad of the remote controller 12, the icon "NBA Game Time" is selected.

Figure 9A:
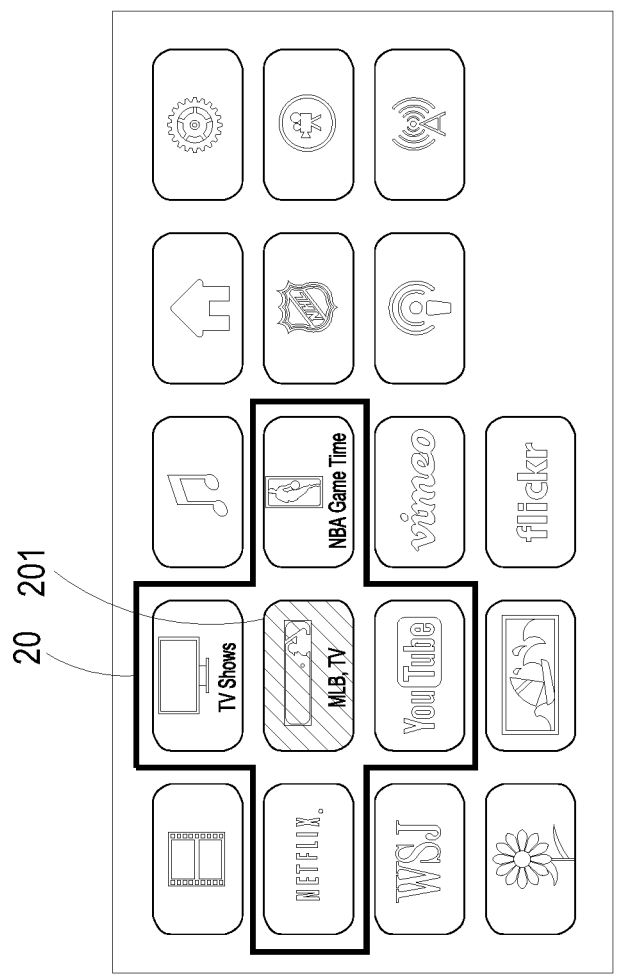
FIGS. 9A~9E schematically illustrate the implementation examples of an intelligent input system and an intelligent input method according to another embodiment of the present invention.
Figure 9B:
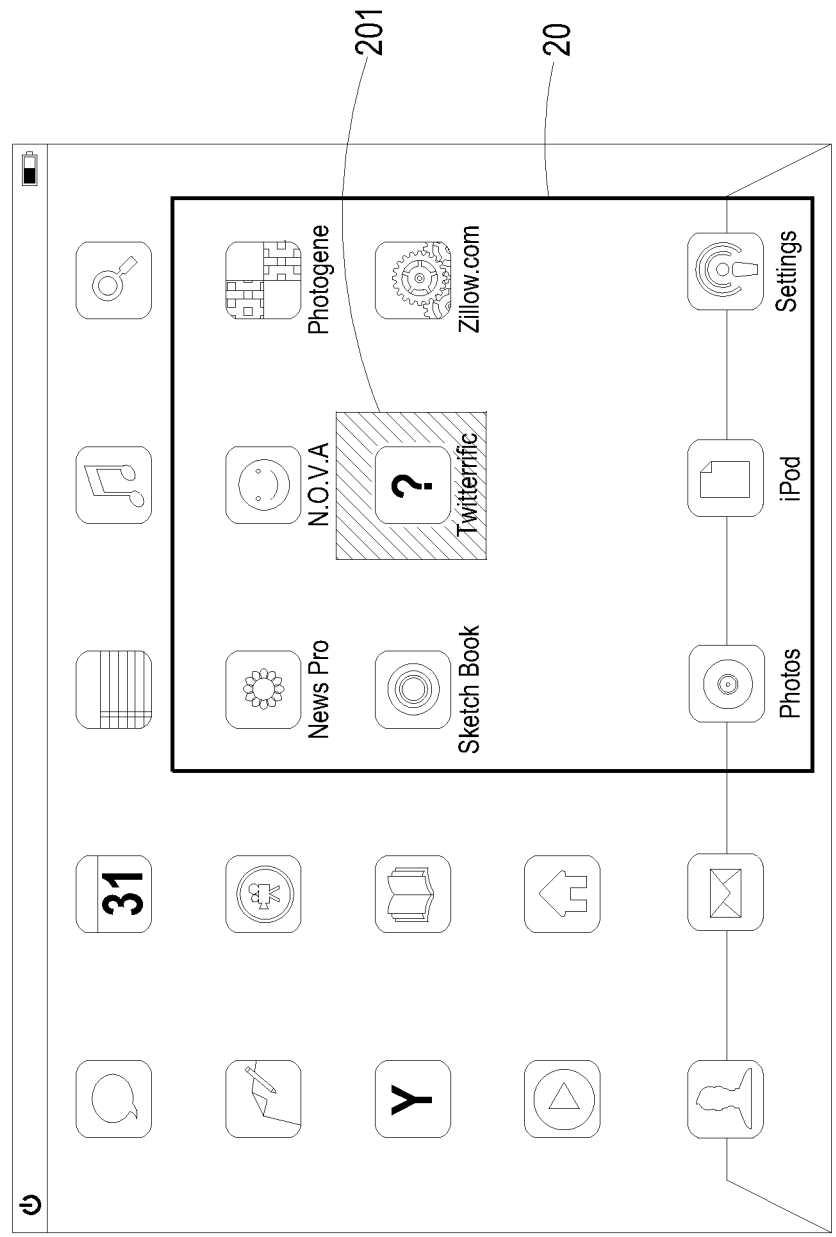

The above concepts may be applied to the graphical user interfaces (GUI) of a tablet computer iPad, which is marketed by Apple Inc. That is, the iPad desktop icon layout may be browsed by operating the remote controller 12. In FIG. 9B, the iPad desktop icon layout is shown, and the icon corresponding to the position of a hidden cursor or indicator of the display screen is set as a center icon 201. Moreover, the circumscribed icons of the target zone 20 are highlighted to assist the user in identifying which icons of the desktop icon layout correspond to the keys of the navigation/direction pad (i.e. the keys 122*a*~122*e*) or the 3×3 numerical keypad 128 of the remote controller 12. In the implementation example of FIG. 9B, the center icon 201 is the App icon "Twitterrific". The number keys 1, 2 and 3 are mapped onto the App icons "News Pro", "N.O.V.A" and "Photogene", respectively. The number keys 4, 5 and 6 are mapped onto the App icons "Sketch Book", "Twitterrific" and "Zillow.com", respectively. The number keys 7, 8 and 9 are mapped onto the App icons "Photos", "iPod" and "Settings". In this embodiment, the App icons "News Pro", "N.O.V.A", "Photogen", "Sketch Book", "Twitterrific" and "Zillow.com" belong to a function set (i.e. the application software of the iPad desktop), and the App icons "Photos", "iPod" and "Settings" belong to another function set (i.e. the application software of the iPad dock). In other words, the highlighted target zone 20 may contain the icons of different function sets (application software) in order to facilitate navigation and selection.

For controlling the iPad in a touch control mode, a one-finger touch gesture of sliding the touch screen of the iPad leftwards or rightwards may correspondingly rotate or scroll the page shown on the touch screen to the left direction or the right direction. For controlling the iPad in a remote control mode according to the present invention, the user may simply swing the remote controller 12 to move the target zone 20 in the top, down, left or right direction to scroll the page. When the target zone 20 is moved to the borders of the function set or the display frame, the page may be scrolled in a direction toward the selected border. In the implementation example of FIG. 9B, if the target zone 20 is moved to the right, the position of the center icon 201 is moved rightwards from the App icon "Twitterrific" to the App icon "Zillow.com". If the target zone 20 is continuously moved to the right direction, the touch screen can be scrolled to a next page.

Figure 9C:
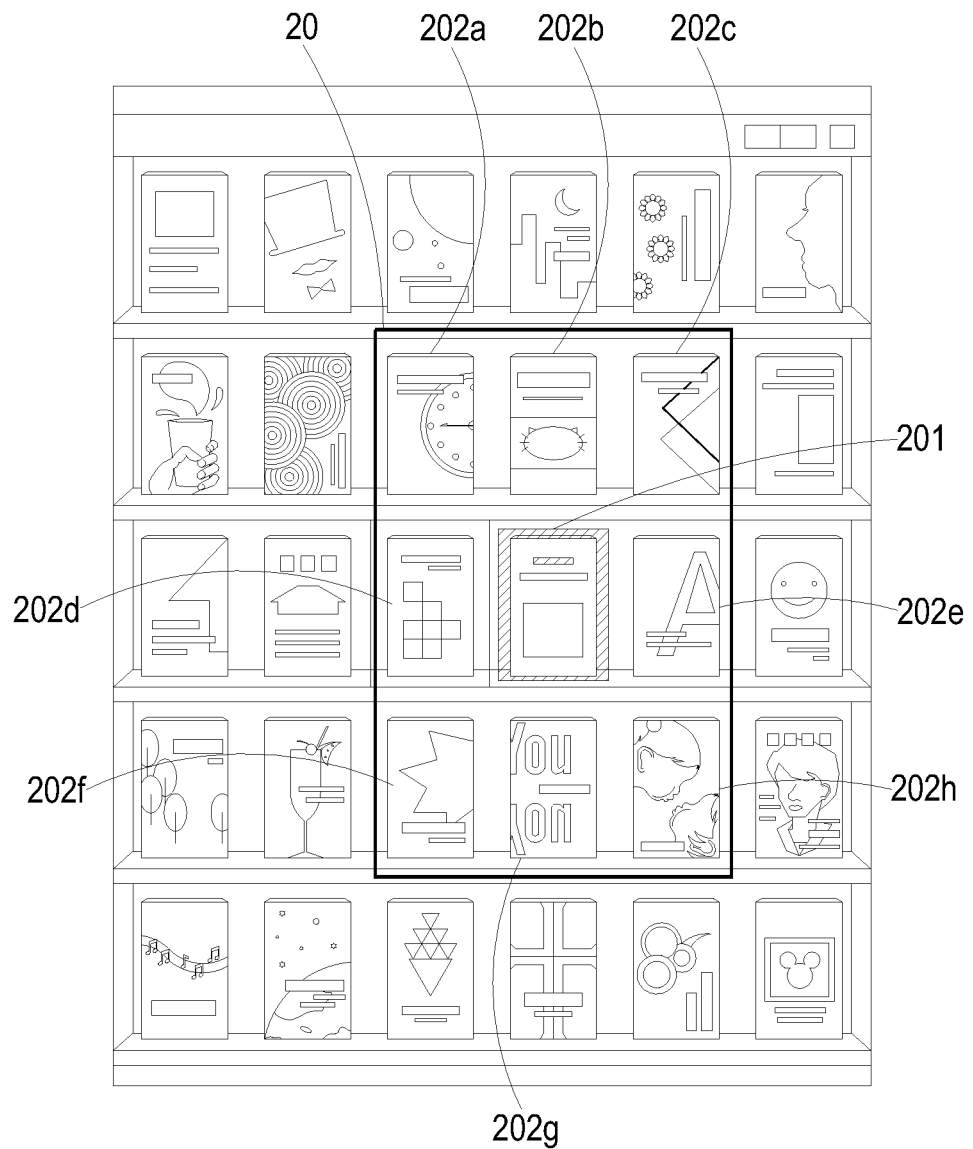

The above concepts may be applied to the desktop icon layout of an e-book application software iBooks by Apple Inc. That is, the iBooks desktop icon layout may be browsed by operating the remote controller 12. In FIG. 9C, the iBooks desktop icon layout is shown, and the icon corresponding to the position of a hidden cursor or indicator of the display screen is set as a center icon 201. Moreover, the circumscribed icons of the target zone 20 are highlighted to assist the user in identifying which icons of the desktop icon layout correspond to the keys of the navigation/direction pad (i.e. the keys 122*a*~122*e*) or the 3×3 numerical keypad 128 of the remote controller 12. In the implementation example of FIG. 9C, the number keys 1, 2 and 3 are respectively mapped onto the icons 202*a*, 202*b* and 202*c*; the number keys 4, 5 and 6 are respectively mapped onto the icons 202*d*, 201 and 202*e*; and the number keys 7, 8 and 9 are respectively mapped onto the icons 202*f*, 202*g* and 202*h*.

Figure 9D:
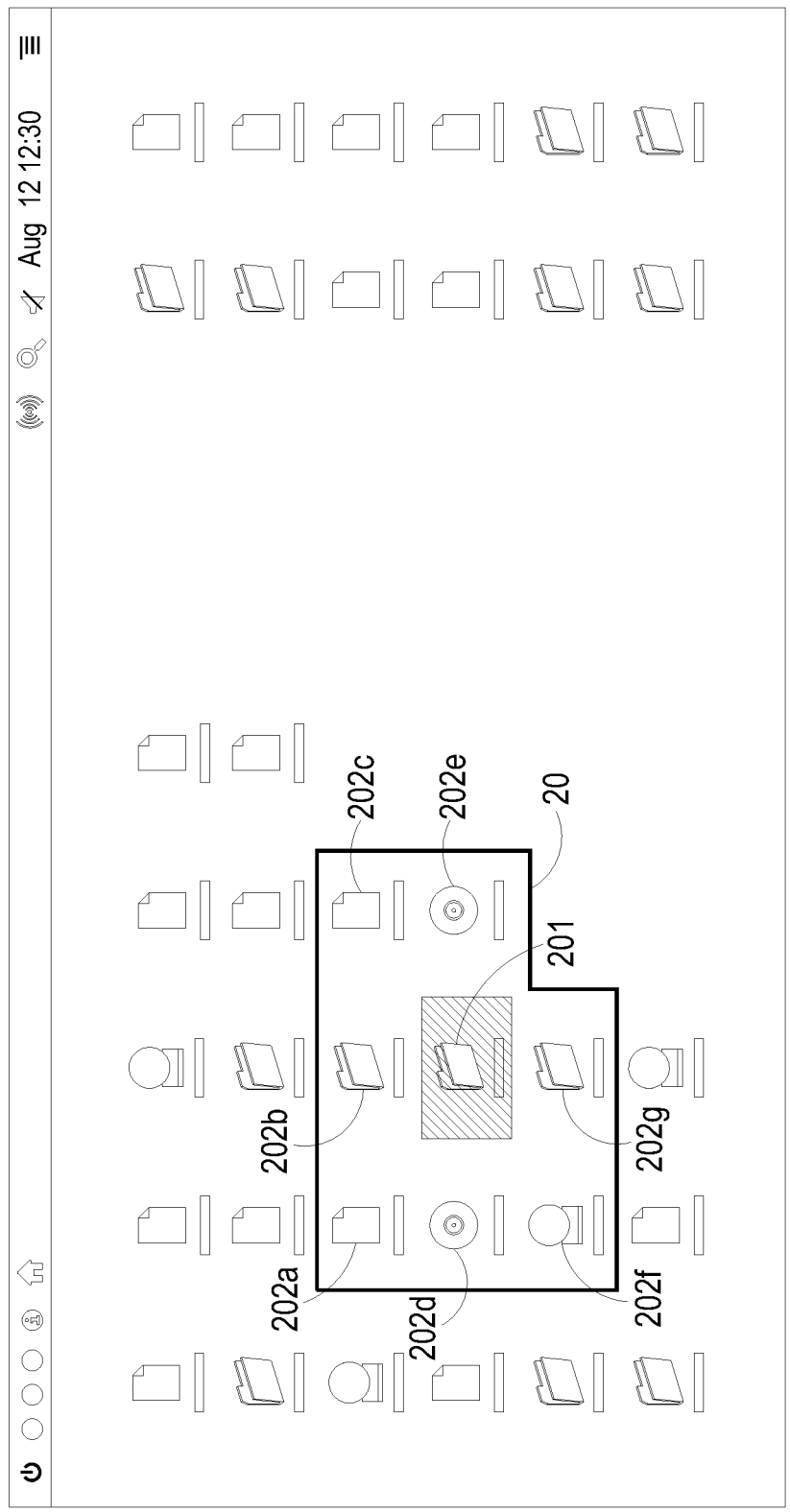

The above concepts may be applied to the desktop icon layout of a Linux-based Ubuntu operating system. That is, the Ubuntu desktop icon layout may be browsed by operating the remote controller 12. In FIG. 9D, the Ubuntu desktop icon layout is shown, and the icon corresponding to the position of a hidden cursor or indicator of the display screen is set as a center icon 201. Moreover, the circumscribed icons of the target zone 20 are highlighted to assist the user in identifying which icons of the desktop icon layout correspond to the keys of the navigation/direction pad (i.e. the keys 122*a*~122*e*) or the 3×3 numerical keypad 128 of the remote controller 12. In the implementation example of FIG. 9D, the number keys 1, 2 and 3 are respectively mapped onto the icons 202*a*, 202*b* and 202*c*; the number keys 4, 5 and 6 are respectively mapped onto the icons 202*d*, 201 and 202*e*; and the number keys 7 and 8 are respectively mapped onto the icons 202*f* and 202*g*. In FIG. 9D, even if the key 9 is not mapped onto any icon, the highlighted target zone 20 can still facilitate the user to identify the relationships between icons and keys.

Figure 9E:
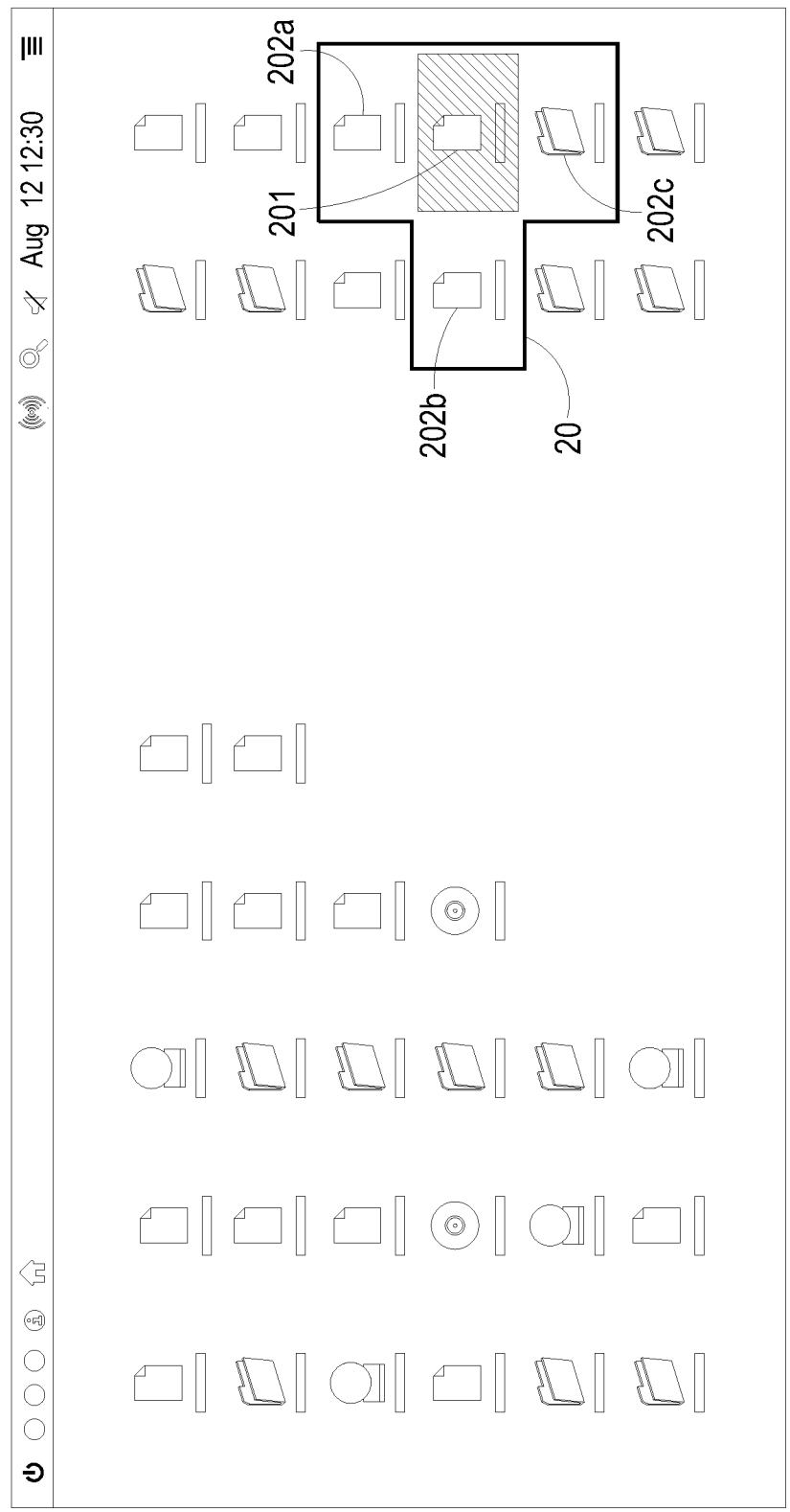

In FIG. 9E, the Ubuntu desktop icon layout is shown, and the icon corresponding to the position of a hidden cursor or indicator of the display screen is set as a center icon 201. Moreover, the circumscribed icons of the target zone 20 are highlighted to assist the user in identifying which icons of the desktop icon layout correspond to the keys of the navigation/direction pad (i.e. the keys 122*a*~122*e*) or the 3×3 numerical keypad 128 of the remote controller 12. In the implementation example of FIG. 9E, the number key 2 is mapped onto the icon 202*a*; the number keys 4 and 5 are respectively mapped onto the icons 202*b* and 201; and the number key 8 is mapped onto the icon 202*c*. In FIG. 9E, even if the keys 1, 3, 6, 7 and 9 are not mapped onto any icon, the highlighted target zone 20 can still facilitate the user to identify the relationships between icons and keys.

If the desktop icons are disorderly distributed, the navigation method of the present invention may be implemented after the desktop icons are rearranged to be orderly distributed. If only some of the desktop icons are not orderly distributed, or when icons are slightly out of order, the highlighted target zone 20 can still facilitate the user to identify the relationships between icons and keys.

Please refer to FIG. 7 and FIGS. 10A~10D. FIGS. 10A~10D schematically illustrate the implementation examples of an intelligent input system and an intelligent input method according to another embodiment of the present invention. In this embodiment, the multimedia content 102b shown on the display screen 10 is a photo editing application software. Moreover, the object (e.g. an album folder, a photo or a thumbnail) corresponding to the position of a hidden cursor or indicator of the display screen is set as a center object 201. Moreover, the circumscribed objects of the target zone 20 are highlighted to assist the user in identifying which objects of the photo editing application software correspond to the keys of the navigation/direction pad (i.e. the keys 122a~122e) or the 3×3 numerical keypad 128 of the remote controller 12. In FIGS. 10A~10D, a photo management application software iPhoto (by Apple Inc) is shown.

Figure 10A:
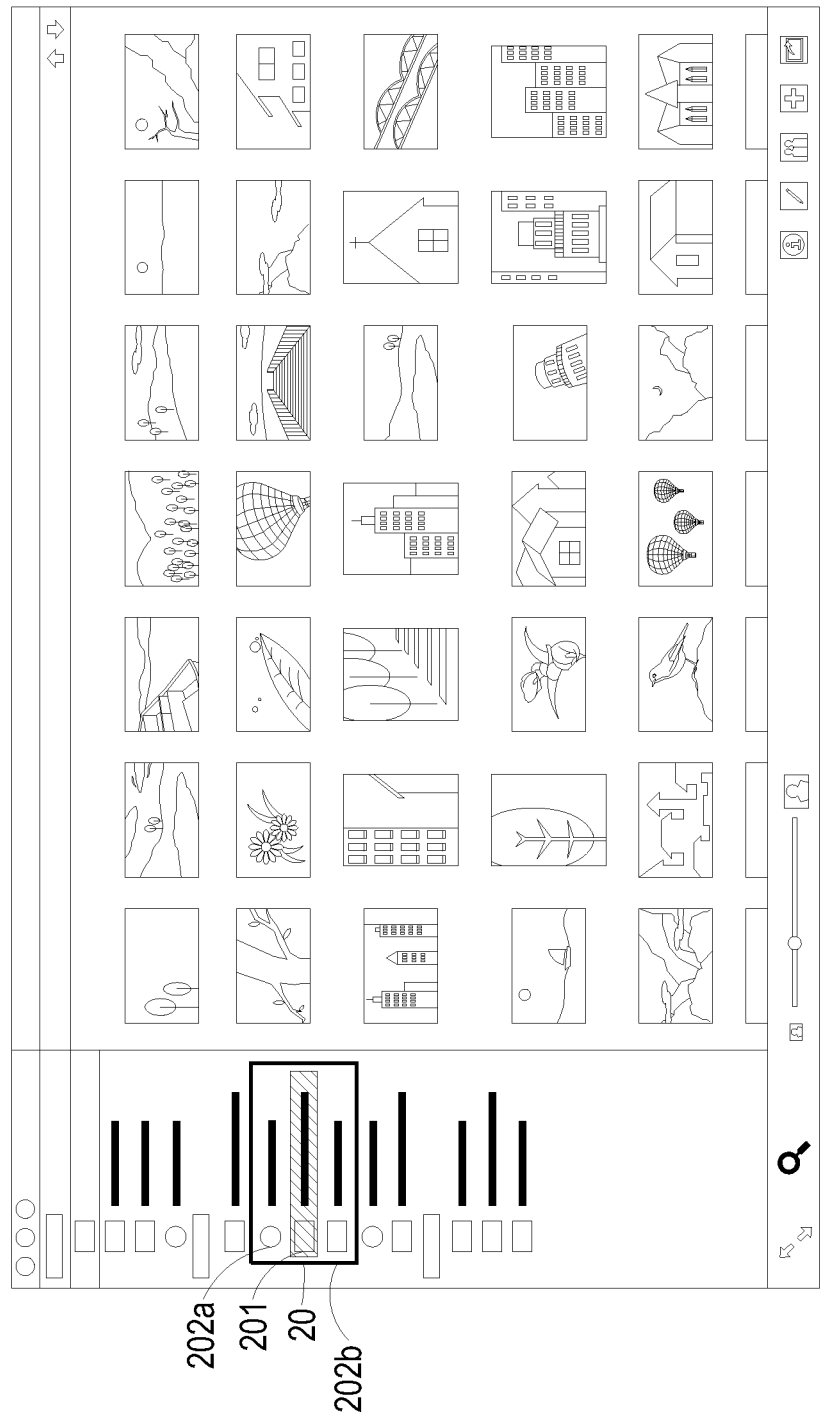

In the implementation example of FIG. 10A, the left panel of the photo management App iPhoto may be controlled by operating the navigation/direction pad (i.e. the keys 122a~122e) of the remote controller 12. In FIG. 10A, the album folder corresponding to the position of a hidden cursor or indicator of the display screen is set as a center album folder 201. By pressing the center key 122e of the navigation/direction pad of the remote controller 12, the center album folder 201 is selected. By pressing the up key 122a of the navigation/direction pad of the remote controller 12, the album folder 202a is selected. By pressing the down key 122b of the navigation/direction pad of the remote controller 12, the album folder 202b is selected.

Figure 10B:
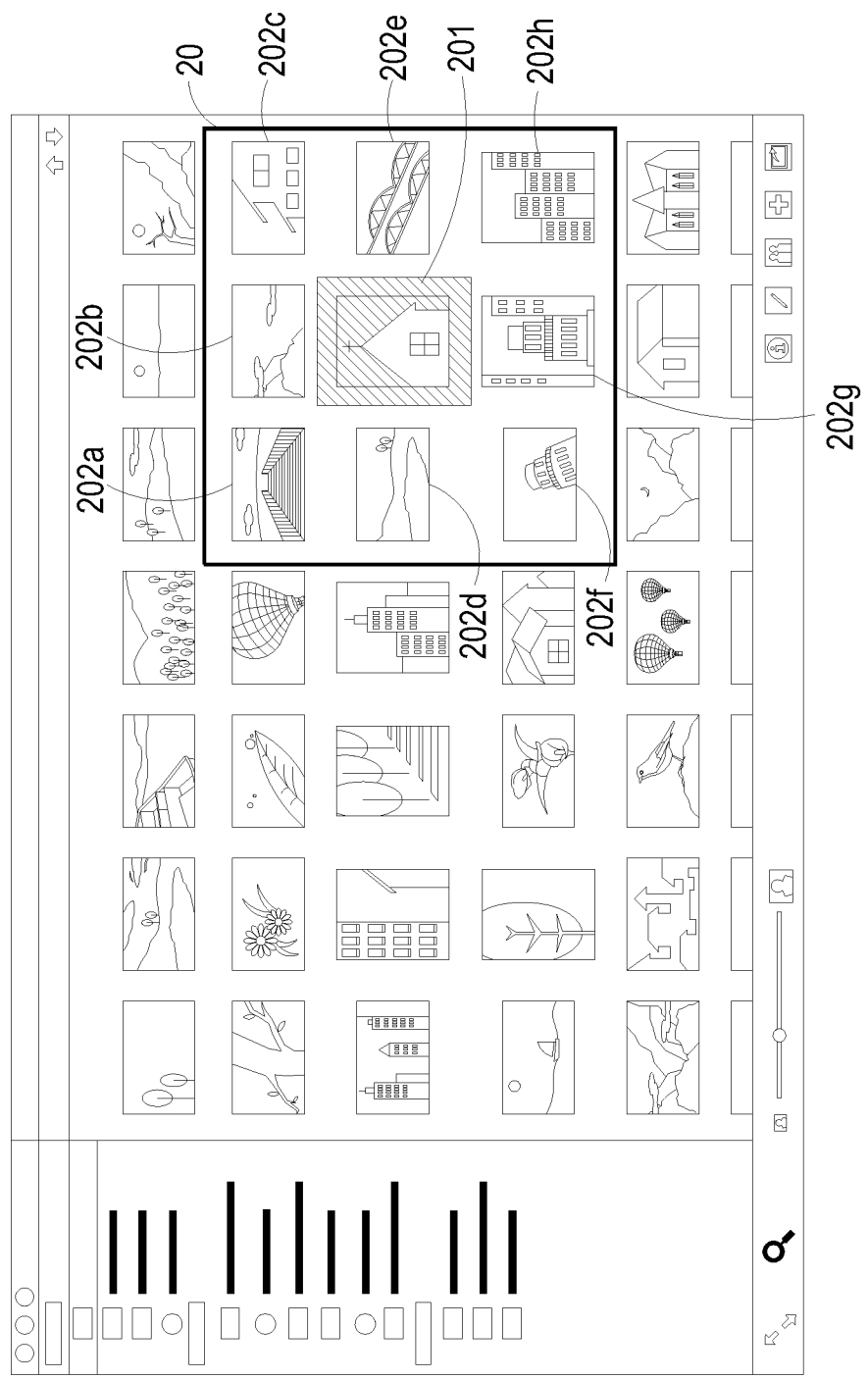

In the implementation example of FIG. 10B, the photos in the right panel of the photo management App iPhoto may be controlled by operating the 3×3 numerical keypad 128 of the remote controller 12. In FIG. 10B, the photo corresponding to the position of a hidden cursor or indicator of the display screen is set as a center photo 201. By pressing the number key 1, the photo 202a in the right panel of the photo management App iPhoto is selected. By pressing the number key 2, the photo 202b in the right panel of the photo management App iPhoto is selected. By pressing the number key 3, the photo 202c in the right panel of the photo management App iPhoto is selected. By pressing the number key 4, the photo 202d in the right panel of the photo management App iPhoto is selected. By pressing the number key 5, the photo 201 in the right panel of the photo management App iPhoto is selected. By pressing the number key 6, the photo 202e in the right panel of the photo management App iPhoto is selected. By pressing the number key 7, the photo 202f in the right panel of the photo management App iPhoto is selected. By pressing the number key 8, the photo 202g in the right panel of the photo management App iPhoto is selected. By pressing the number key 9, the photo 202h in the right panel of the photo management App iPhoto is selected.

In the implementation example of FIG. 10C, the thumbnails in the right panel of the photo management App iPhoto may be controlled by operating the 3×3 numerical keypad 128 of the remote controller 12. In FIG. 10C, the thumbnail corresponding to the position of a hidden cursor or indicator of the display screen is set as a center thumbnail 201. By pressing the number key 1, the thumbnail 202a in the right panel of the photo management App iPhoto is selected. By pressing the number key 2, the thumbnail 202b in the right panel of the photo management App iPhoto is selected. By pressing the number key 3, the thumbnail 202c in the right panel of the photo management App iPhoto is selected. By pressing the number key 4, the thumbnail 202d in the right panel of the photo management App iPhoto is selected. By pressing the number key 5, the thumbnail 201 in the right panel of the photo management App iPhoto is selected. By pressing the number key 6, the thumbnail 202e in the right panel of the photo management App iPhoto is selected. By pressing the number key 7, the thumbnail 202f in the right panel of the photo management App iPhoto is selected. By pressing the number key 8, the thumbnail 202g in the right panel of the photo management App iPhoto is selected. By pressing the number key 9, the thumbnail 202h in the right panel of the photo management App iPhoto is selected.

Figure 10D:
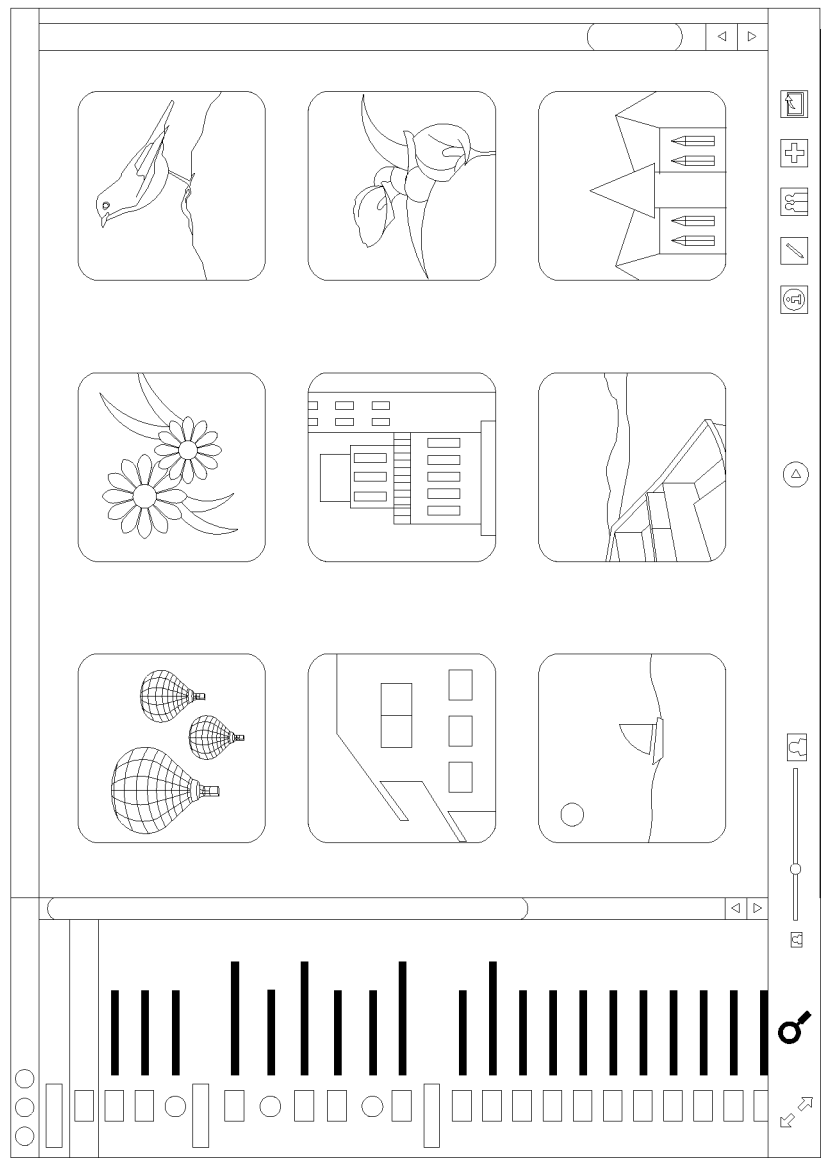

In some other embodiments, the photo management App iPhoto may be switched to a 3×3 display mode. In FIG. 10D, 3×3 photos or 3×3 thumbnails are shown. In this display mode, it is not necessary to highlight the icons because the 3×3 display mode can assist the user in identifying which objects correspond to the 3×3 numerical keypad 128 of the remote controller 12.

Please refer to FIG. 7 and FIGS. 11A~11E. FIGS. 11A~11E schematically illustrate the implementation examples of an intelligent input system and an intelligent input method according to another embodiment of the present invention. In this embodiment, the multimedia content 102b shown on the display screen 10 is a video editing application software. Moreover, the icon (e.g. a video icon or a function tab) corresponding to the position of a hidden cursor or indicator of the display screen is set as a center icon 201. Moreover, the circumscribed icons of the target zone 20 are highlighted to assist the user in identifying which icons of the video editing application software correspond to the keys of the navigation/direction pad (i.e. the keys 122a~122e) or the 3×3 numerical keypad 128 of the remote controller 12. In FIGS. 11A~11E, a video editing application software iMovie (by Apple Inc) is shown.

Figure 11A:
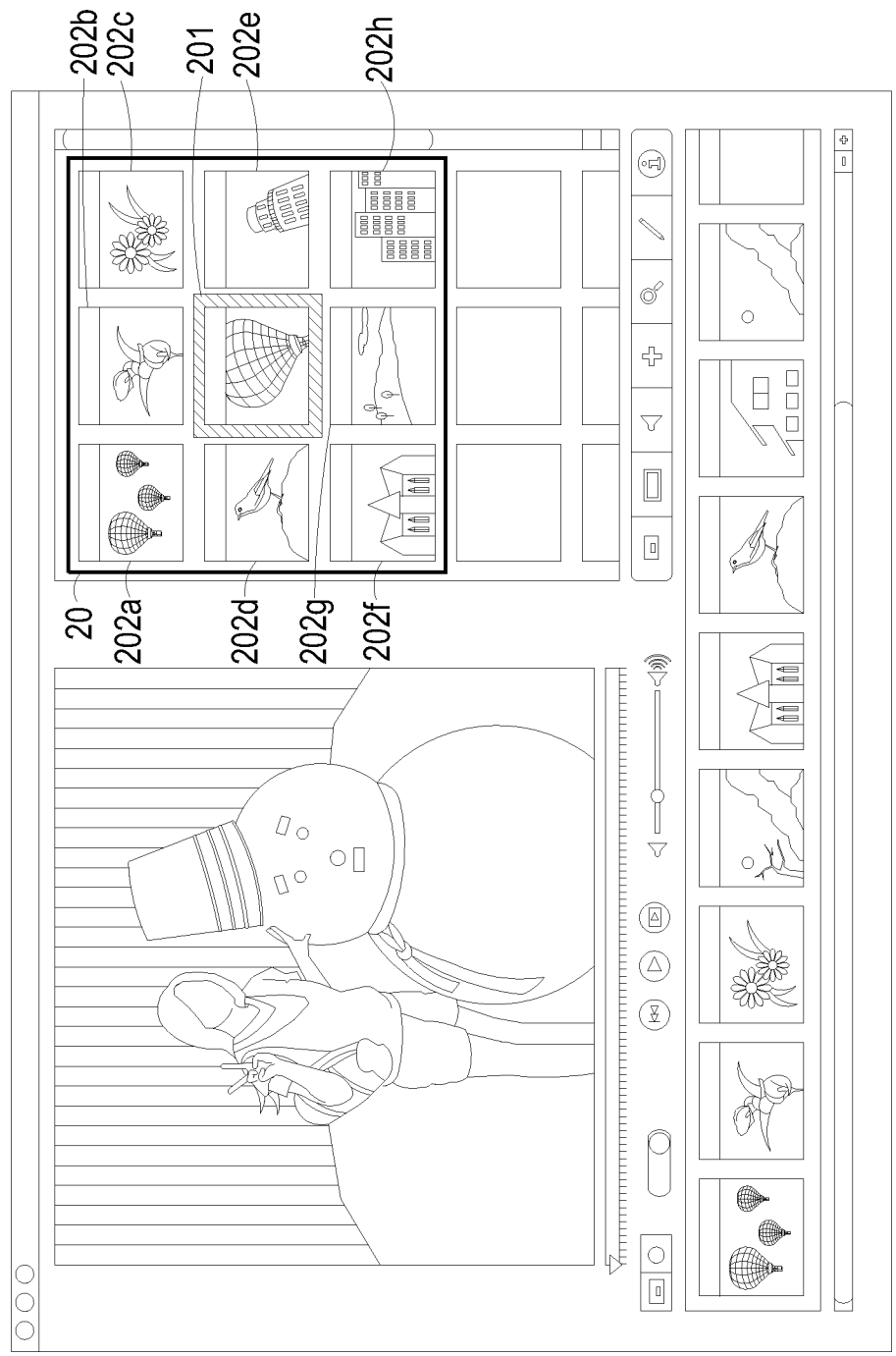
FIGS. 11A~11E schematically illustrate the implementation examples of an intelligent input system and an intelligent input method according to another embodiment of the present invention.

In the implementation example of FIG. 11A, the video icons in the right panel of the video editing App iMovie may be controlled by operating the 3×3 numerical keypad 128 of the remote controller 12. In FIG. 11A, the video icon corresponding to the position of a hidden cursor or indicator of the display screen is set as a center video icon 201. The center video icon 201 is one of the video icons in the right panel of the video editing App iMovie. By pressing the number key 1, the video icon 202a in the right panel of the video editing App iMovie is selected. By pressing the number key 2, the video icon 202b in the right panel of the video editing App iMovie is selected. By pressing the number key 3, the video icon 202c in the right panel of the video editing App iMovie is selected. By pressing the number key 4, the video icon 202d in the right panel of the video editing App iMovie is selected. By pressing the number key 5, the video icon 201 in the right panel of the video editing App iMovie is selected. By pressing the number key 6, the video icon 202e in the right panel of the video editing App iMovie is selected. By pressing the number key 7, the video icon 202f in the right panel of the video editing App iMovie is selected. By pressing the number key 8, the video icon 202g in the right panel of the video editing App iMovie is selected. By pressing the number key 9, the video icon 202h in the right panel of the video editing App iMovie is selected.

Figure 11B:
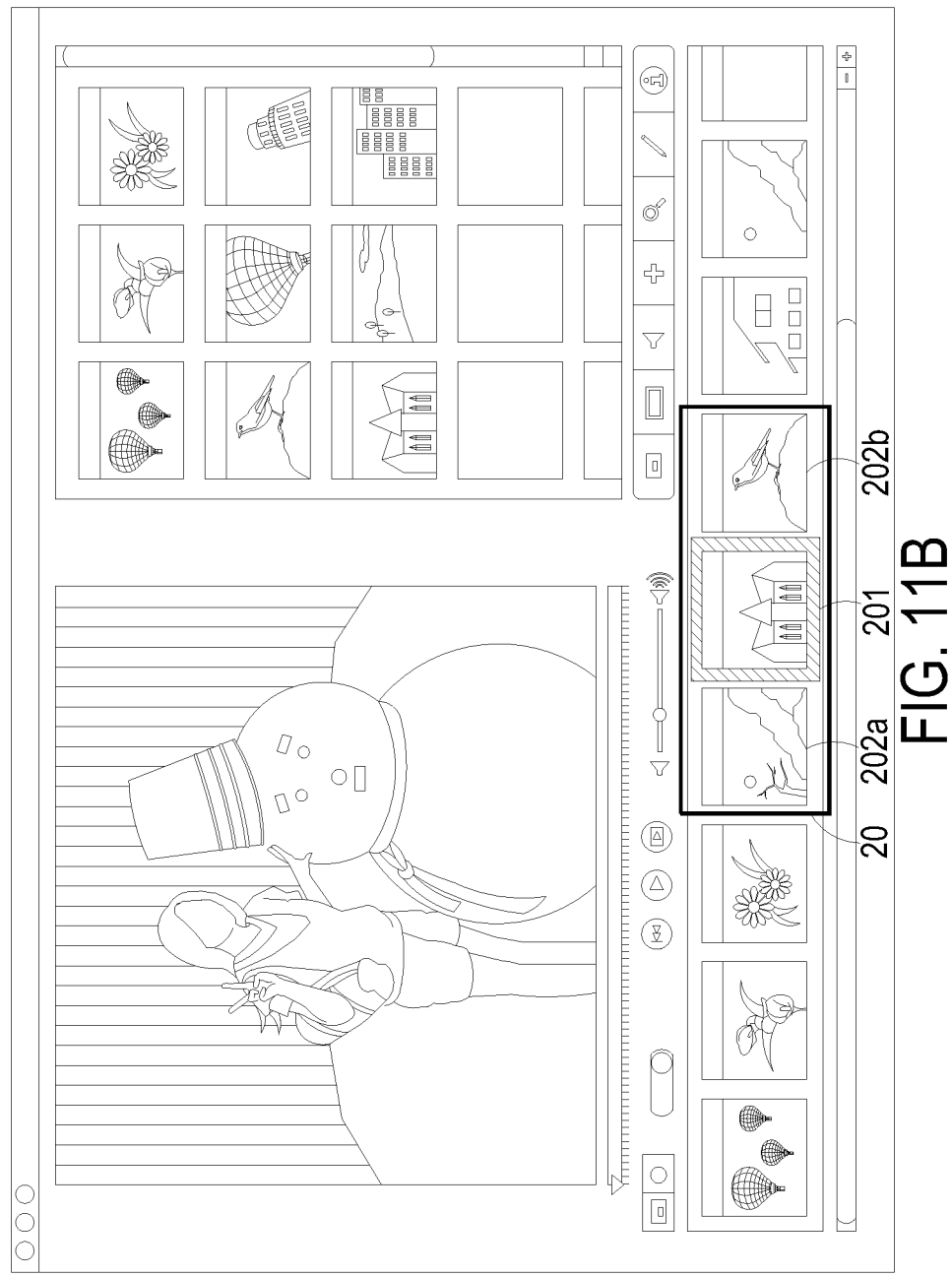

In the implementation example of FIG. 11B, video icons in the lower panel of the video editing App iMovie may be controlled by operating the keys 4, 5 and 6 of the 3×3 numerical keypad 128 of the remote controller 12. In FIG. 11B, the video icon corresponding to the position of a hidden cursor or indicator of the display screen is set as a center video icon 201. The center video icon 201 is one of the video icons in the lower panel of the video editing App iMovie. By pressing the number key 4, the video icon 202a in the lower panel of the video editing App iMovie is selected. By pressing the number key 5, the video icon 201 in the lower panel of the video editing App iMovie is selected. By pressing the number key 6, the video icon 202b in the lower panel of the video editing App iMovie is selected.

Figure 11C:
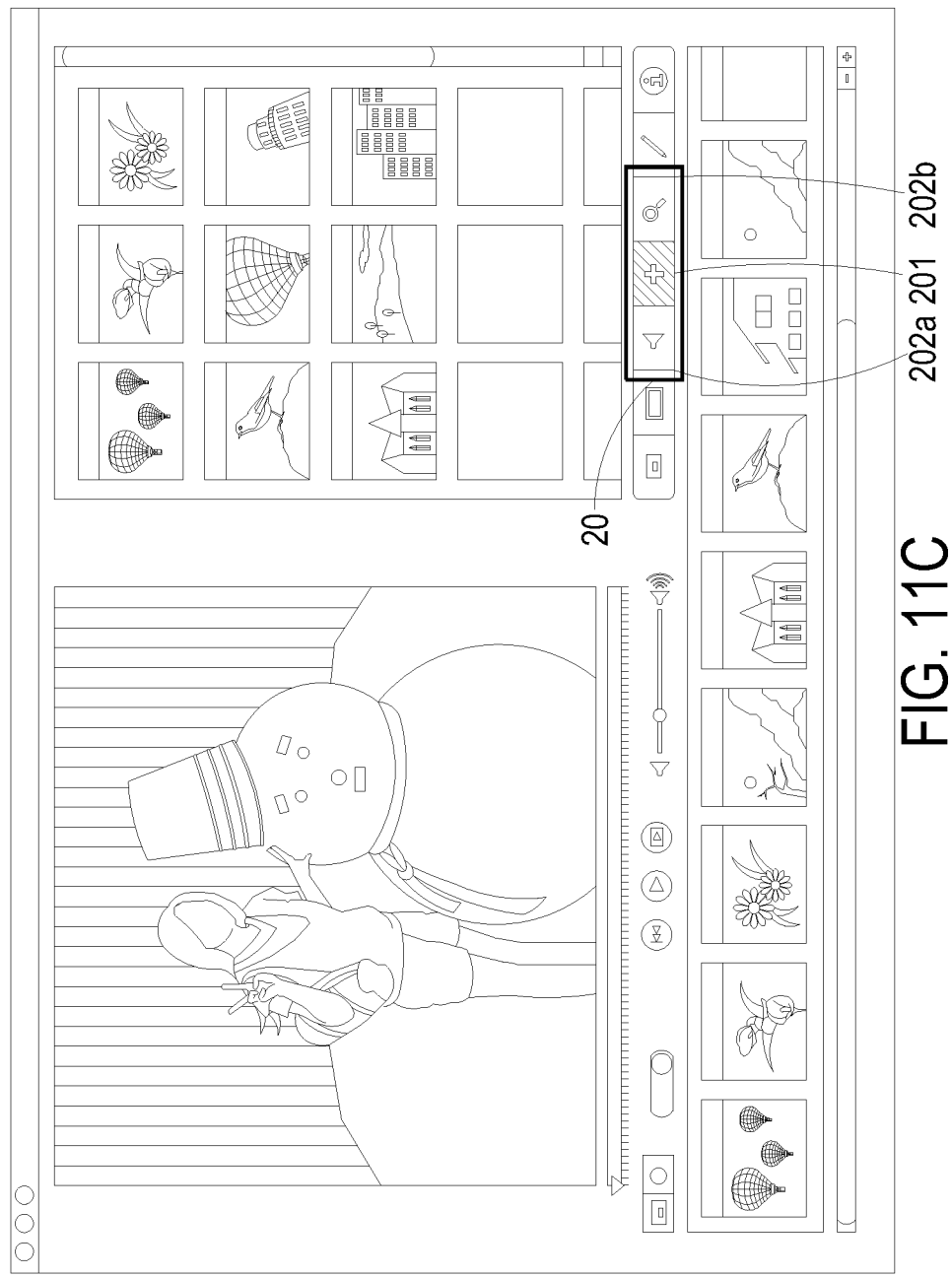

In the implementation example of FIG. 11C, basic function tabs in the middle panel of the video editing App iMovie may be controlled by operating the keys 4, 5 and 6 of the 3×3 numerical keypad 128 of the remote controller 12. In FIG. 11C, the basic function tab corresponding to the position of a hidden cursor or indicator of the display screen is set as a center basic function tab 201. The center basic function tab 201 is one of the basic function tabs in the middle panel of the video editing App iMovie. By pressing the number key 4, the basic function tab 202a in the middle panel of the video editing App iMovie is selected. By pressing the number key 5, the basic function tab 201 in the middle panel of the video editing App iMovie is selected. By pressing the number key 6, the basic function tab 202b in the middle panel of the video editing App iMovie is selected.

Figure 11D:
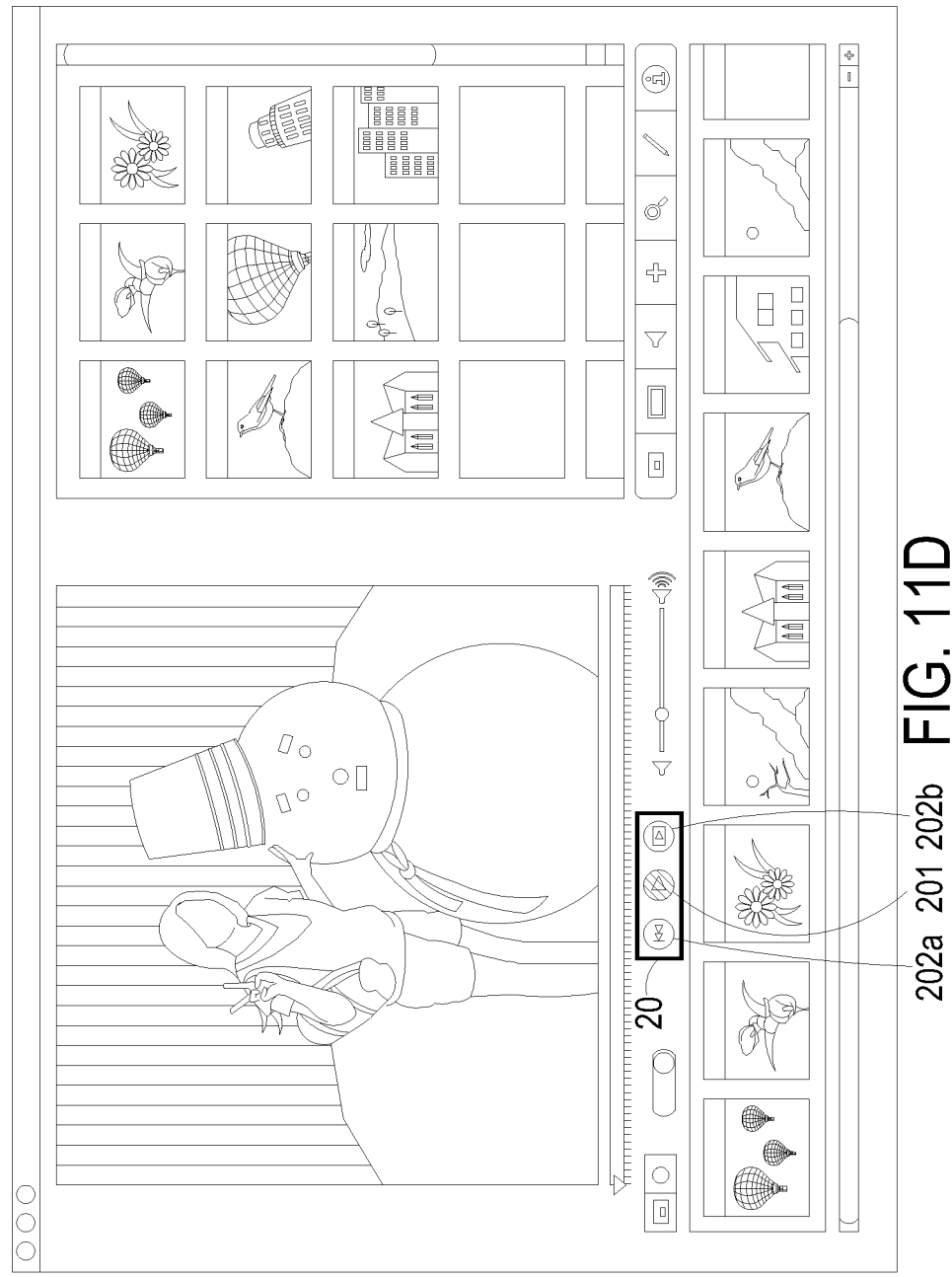

In the implementation example of FIG. 11D, playback function tabs in the middle panel of the video editing App iMovie may be controlled by operating the keys 4, 5 and 6 of the 3×3 numerical keypad 128 of the remote controller 12. In FIG. 11D, the playback function tab corresponding to the position of a hidden cursor or indicator of the display screen is set as a center playback function tab 201. The playback function tab 201 is one of the playback function tabs in the middle panel of the video editing App iMovie. By pressing the number key 4, the playback function tab 202a (e.g. a rewind tab) in the middle panel of the video editing App iMovie is selected. By pressing the number key 5, the playback function tab 201 (e.g. a play or pause tab) in the middle panel of the video editing App iMovie is selected. By pressing the number key 6, the playback function tab 202b (e.g. a forward tab) in the middle panel of the video editing App iMovie is selected.

Figure 11E:
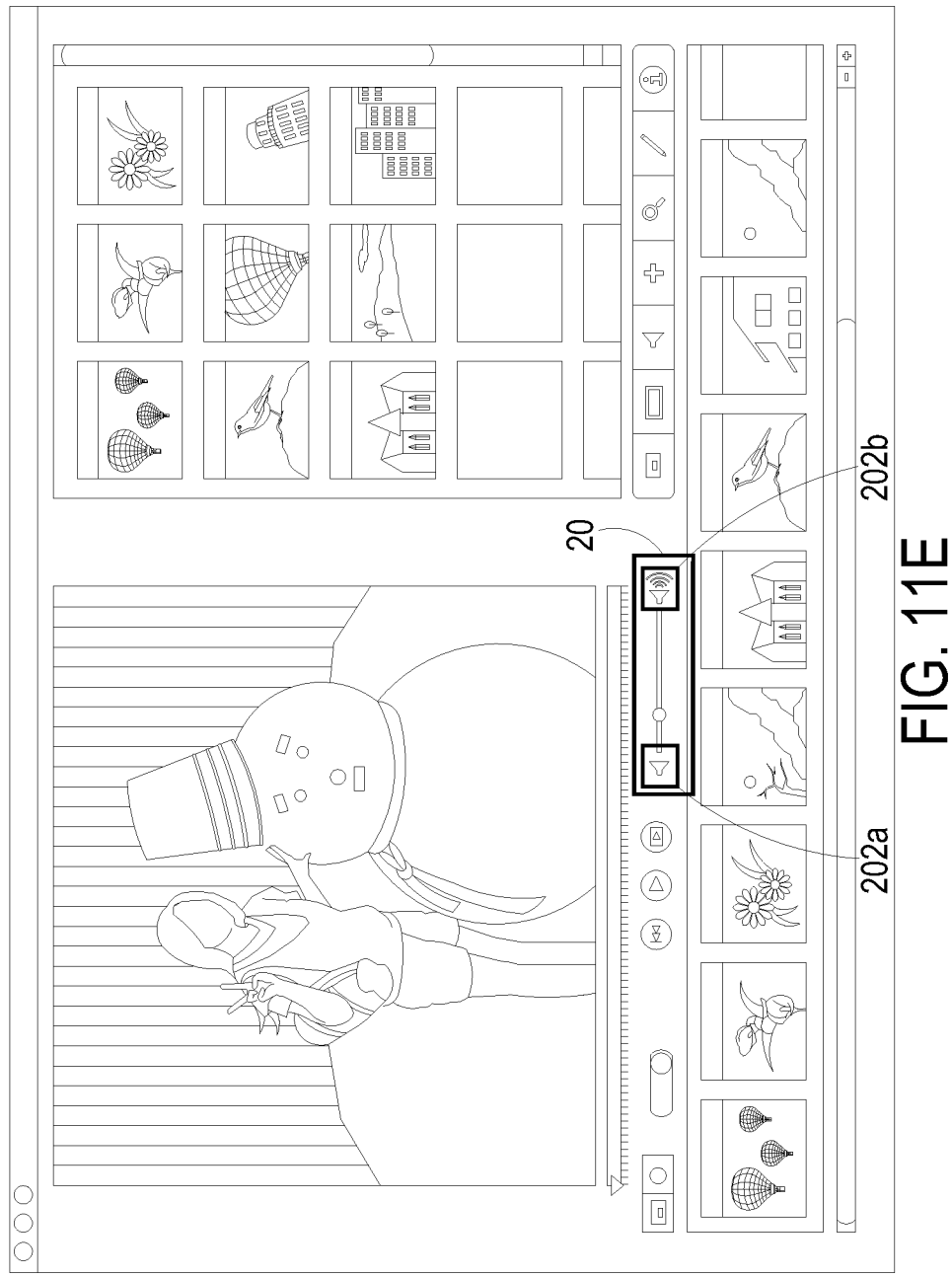

In the implementation example of FIG. 11E, audio volume control function tabs in the middle panel of the video editing App iMovie may be controlled by operating the keys 4 and 6 of the 3×3 numerical keypad 128 of the remote controller 12. By pressing the number key 4, the audio volume control function tab 202a in the middle panel of the video editing App iMovie is selected. By pressing the number key 6, the audio volume control function tab 202b in the middle panel of the video editing App iMovie is selected. In some other embodiments, the audio volume control mode is a continuous control mode. The audio volume is adjusted by pressing a control key and swinging the pointing device of the remote controller. For example, by pressing the number key 5 and swinging the remote controller in the right direction, the audio volume is turned up. By pressing the number key 5 and swinging the remote controller in the left direction, the audio volume is turned down.

In the above embodiments of FIGS. 11A~11E, as the highlighted target zone 20 is moved from the right panel to the middle panel or the bottom panel, the circumscribed icons or function tabs of the highlighted target zone 20 are adaptively adjusted according to the position of the hidden cursor or indicator of the display screen.

As shown in FIGS. 11A~11E, the right panel allows the "up/down scrolling" movement of the icons. In addition, the "up/down scrolling" movement in the right panel is in conflict with the "up/down crossing-over" movement of the highlighted target zone between the right panel, the middle panel and the lower panel. In accordance with the present invention, the right panel is configured to allow left/right scrolling movement to move icons of the target zone; and the "up/down crossing-over" movement of the highlighted target zone between the right panel, the middle panel and the lower panel may be implemented by the "up/down" movement of the target zone 20. Generally, for avoiding the conflict between the scrolling movement and the crossing-over movement, the graphical user interfaces (GUI) are specially designed such that the direction of the scrolling movement is different from the direction of the crossing-over movement.

In some other embodiments, the application software of the remote controller is programmed to allow the crossing-over movement of the target zone across panels in response to a specified action applied on the remote controller before or when the target zone is moved. For example, the application software of the remote controller may be programmed to allow the scrolling movement when the number key 5 of the 3×3 numerical keypad is not continuously pressed, and allow the crossing-over movement when the number key 5 of the 3×3 numerical keypad is continuously pressed. Alternatively, the application software of the remote controller may be programmed to allow the scrolling movement when the number key 5 of the 3×3 numerical keypad is continuously pressed, and allow the crossing-over movement when the number key 5 of the 3×3 numerical keypad is not continuously pressed.

Generally, the 3×3 numerical keypad can function as a full-function navigation control keypad because the 3×3 numerical keypad (also referred as a 3×3 layout) contains the navigation/direction pad (also referred as a 5-direction control pad), the three horizontally-arranged keys (3-H) and the three vertical-arranged keys (3-V). Consequently, the 3×3 numerical keypad can function as a 3×3 layout control keypad in a first panel or function set, or functions as a 5-direction navigation/direction pad in a second panel or function set, or functions as a 3-H navigation pad in a third panel or function set, or functions as a 3-V navigation pad in a fourth panel or function set, or functions as any partial-function 3×3 numerical keypad in any other panel or function set. Moreover, when the center object of the target zone (e.g. an item, a key, an icon, a photo, a video or a function tab) may be displayed in a visually distinguishable manner, the user can easily realize which key is to be pressed to apply an input action of the target object according to the correspondence between the object layout of the target zone and the key layout of the remote controller. With the auto-adapt function of the present invention, the non-technical-savvy (NTS) who is not familiar with or not good at the use of the computer product can easily operate the intelligent input system and the intelligent input method of the present invention.

In the above embodiments of FIGS. 7~11E, the present invention provides an intelligent input system and an intelligent input method. The intelligent input system comprises an electronic device and an input device. A multimedia content is shown on a display screen of the electronic device. The input device is for example a remote controller with physical keys. The input device is in communication with the electronic device. Moreover, the input device comprises a navigation control keypad for controlling a hidden cursor or indicator on the display screen of the electronic device. Consequently, the navigation of the multimedia content is correspondingly controlled in response to the operations of the navigation control keypad. The navigation control keypad is a navigation/direction pad or a 3×3 numerical keypad. The remote controller has a built-in G-sensor or has an air mouse function for allowing the user to move the hidden cursor or indicator by swinging the remote controller. Alternatively, the remote controller has a pointing device such as a track ball for allowing the user to move the hidden cursor or indicator by operating the pointing device. Moreover, the icon of the multimedia content corresponding to the position of the hidden cursor or indicator of the display screen is set as a center icon. The center icon is set to be correlated with a center key of the navigation control keypad. According to a layout of the navigation control keypad, the icons corresponding to the center physical key and its neighboring physical keys of the navigation control keypad are displayed as a highlighted target zone. As the hidden cursor or indicator is moved, the target zone is correspondingly moved in the moving direction of the hidden cursor or indicator. Consequently, the multimedia content can be browsed by operating the navigation control keypad of the remote controller.

In the above embodiments, the operations of the physical keys of the input device may correspondingly control selection or input of the objects of the virtual keyboard or the multimedia content shown on the display screen. Nevertheless, the intelligent input system and the intelligent input method of the present invention can be implemented by using the input device without the physical key (e.g. a touch screen or a touch pad). The intelligent input system and the intelligent input method of the present invention using the input device without the physical key will be illustrated as follows.

The input device without the physical key includes but is not limited to a smart phone with a touch screen, a portable electronic device with touch-sensitive surface (e.g. a tablet), or the likes. The touch-sensitive surface may be a touch surface without a display screen (e.g. a touch pad of a notebook computer).

The input device is capable of distinguishing different input actions of the finger on the touch-sensitive surface. For example, the slide touch of the finger indicates that the finger is continuously moved on the touch-sensitive surface for a longer time (e.g. longer than 0.5 second) instead of only touching a specified point. In addition, the tap touch of the finger indicates that the finger is contacted with a specified point of the touch-sensitive surface for a very short time.

Of course, the input action of the finger on the touch-sensitive surface may be implemented by a stylus pen or another other contacting element.

The input device is in communication with the electronic device. Moreover, the selective items of the target zone (including the center object and its neighboring objects) can be simultaneously shown on the display screen of the electronic device. The center object can be arbitrarily changed in response to the operations of the input device. As the center object changes, the selective items correspondingly change. Consequently, via the input interface of the input device, the user can quickly select one of the selective items. In comparison with the conventional input technology which requires tediously switching among items one by one or one at a time, the intelligent input method of the present invention is more time-saving.

Figure 12:
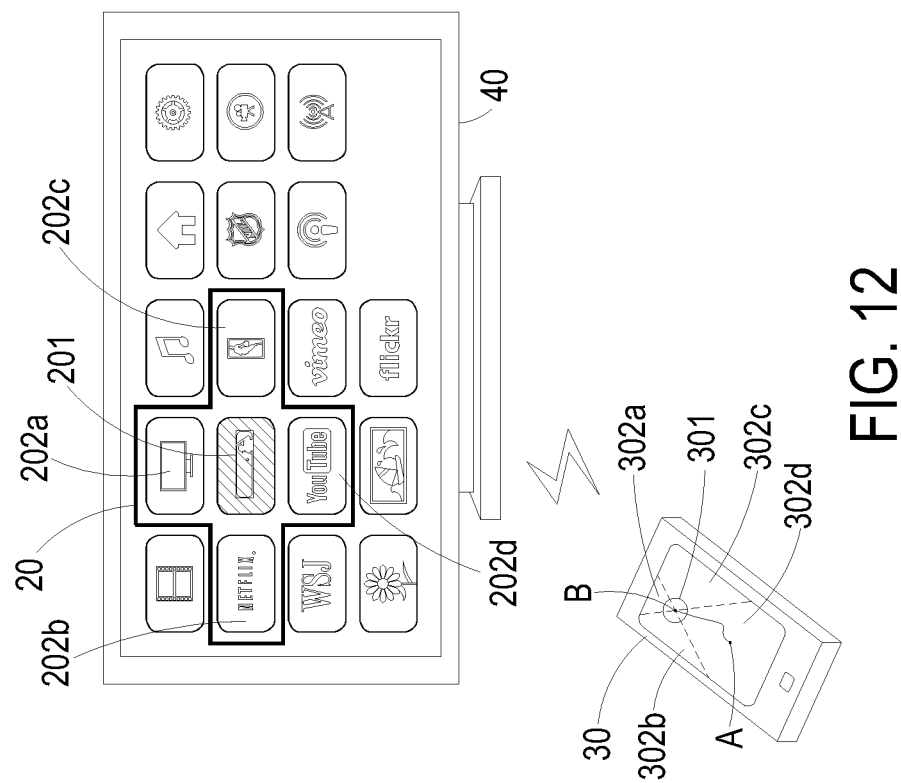
FIG. 12 schematically illustrate the architecture of an intelligent input system according to another embodiment of the present invention.

FIG. 12 schematically illustrates the architecture of an intelligent input system according to another embodiment of the present invention. As shown in FIG. 12, the intelligent input system comprises an input device 30 and an electronic device 40. In this embodiment, the input device 30 is a smart phone, and the electronic device 40 is an intelligent TV. There are plural icons shown on the display screen of the electronic device 40. For selecting a target object, a slide touch of a finger on a touch-sensitive surface of the input device 30 results in a slide trajectory from a starting point A to an end point B. When the finger is placed on the starting point A, a highlighted zone is shown on the display screen of the electronic device 40. As the hidden cursor or indicator controlled by the input device 30 is moved, the highlighted zone is correspondingly moved. When the target object is included in the highlighted zone, the slide touch is ended (i.e. at the end point B). Once the user's finger is lifted from the touch-sensitive surface, the highlighted zone is fixed at the current position, and a target zone 20 including some circumscribed selective items is shown.

The target zone 20 shown on the electronic device 40 comprises a center object 201 and plural neighboring objects 202a~202d. The neighboring objects 202a~202d are located around the center object 201 and near the center object 201. The end point B is used as a control point of the input device 30. A circle enclosing the end point B denotes a center control area 301 corresponding to the center object 201 of the target zone 20. The area around the center control area 301 is divided into four neighboring control areas 302a~302d corresponding to the neighboring objects 202a~202d, respectively. For identifying the input command of the user on the input device 30, the four neighboring control areas 302a~302d are arranged around the center control area 301 in fan-shaped configurations. The total angle of the fan-shaped neighboring control areas 302a~302d is equal to 360 degrees. In this embodiment, the neighboring control areas 302a~302d around the center control area 301 may be respectively considered as the up area, the down area, the left area and the right area relative to the center control area 301. Moreover, the center control area 301 and the neighboring control areas 302a~302d are collaboratively defined as a 5-direction control pad. The layout of the 5-direction control pad is mapped onto the center object 201 and the neighboring objects 202a~202d.

For example, by tapping the center control area 301 of the input device 30, the input device 30 can immediately identify that the selective item corresponding to the tap position is the center object 201. By tapping one of the neighboring control areas 302a~302d of the input device 30, the input device 30 can immediately identify the selective item of the neighboring objects 202a~202d corresponding to the tap position. For example, by tapping the neighboring control area 302a of the input device 30, the icon "TV Shows" corresponding to the neighboring object 202a is selected. Similarly, by tapping the neighboring control area 302d of the input device 30, the icon "YouTube" corresponding to the neighboring object 202d is selected.

Figure 13:
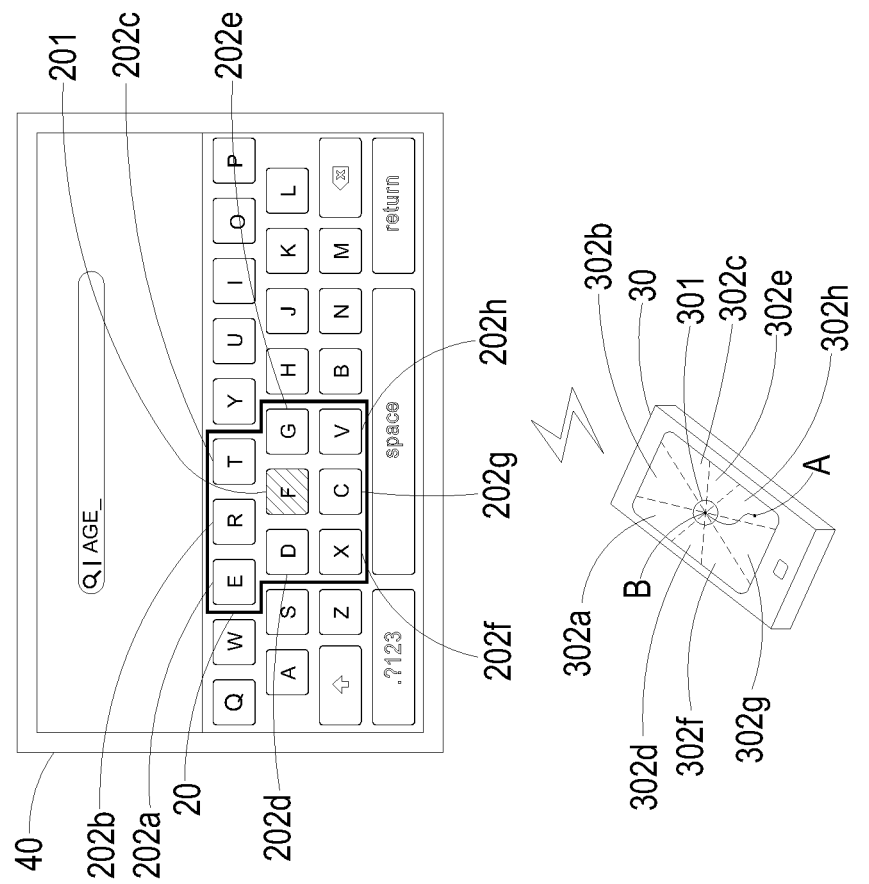
FIG. 13 schematically illustrates the architecture of an intelligent input system according to another embodiment of the present invention.

In addition to the 5-direction control pad mode, the concepts of the present invention can be applied to 3×3 numerical keypad (or a 3×3 layout). FIG. 13 schematically illustrates the architecture of an intelligent input system according to another embodiment of the present invention. As shown in FIG. 13, the intelligent input system comprises an input device 30 and an electronic device 40. In this embodiment, the input device 30 is a smart phone, and the electronic device 40 is a satellite navigation device. A virtual keyboard of the satellite navigation device is shown on the display screen of the electronic device 40. For inputting characters, a slide touch of the user's finger on the touch screen of the input device 30 may correspondingly move the target zone 20, so that the target object is included in the target zone 20. The target zone 20 comprises a center object 201 and plural neighboring objects 202a~202h. As shown in FIG. 13, the center object 201 denotes the English letter F, and plural neighboring objects 202a~202h denote the English letters E, R, T, D, G, X, C and V, respectively.

The end point B is used as a control point of the input device 30. A circle enclosing the end point B denotes a center control area 301 corresponding to the center object 201 of the target zone 20. The area around the center control area 301 is divided into eight neighboring control areas 302a~302h corresponding to the neighboring objects 202a~202h, respectively. Each of the eight neighboring control areas 302a~302h covers 45-degree area. The center control area 301 denotes the number key 5 of the 3×3 numerical keypad, and the eight neighboring control areas 302a~302h denote the numbers 1, 2, 3, 4, 6, 7, 8 and 9 of the 3×3 numerical keypad, respectively.

By tapping the center control area 301 of the input device 30, the input device 30 can immediately identify that the selective item corresponding to the tap position is the center object 201. By tapping one of the neighboring control areas 302a~302h of the input device 30, the input device 30 can immediately identify the selective item of the neighboring objects 202a~202h corresponding to the tap position. For example, by tapping the neighboring control area 302a of the input device 30, the character "E" corresponding to the neighboring object 202a is inputted. Similarly, by tapping the neighboring control area 302e of the input device 30, the character "G" corresponding to the neighboring object 202e is inputted. Similarly, by tapping the neighboring control area 302g of the input device 30, the character "C" corresponding to the neighboring object 202g is inputted.

In an embodiment, the input device 30 can determine the target object by calculating the distance and the angle of the tap position relative to the center point of the center control area 301 (i.e. the end point B).

In the above embodiments, the way of moving the highlighted zone is implemented by the slide touch of the user's finger. However, the way of moving the highlighted zone is not restricted. For example, the input device 30 may further include a built-in G-sensor, gyroscope or air mouse. By swinging or shaking the input device, the highlighted zone may be moved to the target zone including the target object. In other words, the intelligent control method of the present invention may be implemented by the swinging action and the tap touch. In this operating mode, the input device 30 is programmed to judge the rest of the finger on the touch-sensitive surface. For example, if the user's finger touches a specified point of the touch-sensitive surface for a time period longer than a predetermined time threshold, it means that the finger rests on the touch-sensitive surface.

For example, by swinging the input device 30 with a user's thumb resting on any appropriate point of touch-sensitive surface of the input device 30, the highlighted zone is correspondingly moved. Until the highlighted zone contains the target object, the user may stop swinging the input device 30. Meanwhile, the resting position of the thumb is the center point of the center control area 301 (i.e. the end point B). Moreover, by intuitively tapping a specified neighboring control area 302a~302h at a specified position relative to the center control area 301 of the input device 30, a target object at the specified position relative to the center object 201 of the target zone 20 is inputted.

In an embodiment, the input device 30 is configured to activate the swinging control mode when the thumb rests on any appropriate point of touch-sensitive surface of the input device 30, and to deactivate the swinging control mode when the rest of the thumb on the touch-sensitive surface of the input device 30 is not detected. Since the swinging control mode is deactivated after the thumb leaves the touch-sensitive surface, the target zone 20 is frozen. Consequently, during the tapping period, even if the input device 30 is accidentally swung, the target zone 20 does not undergo movement. Moreover, in a case that the input device has a touch screen, the circle of the center control area 301 and the dividing lines between the neighboring control areas 302a~302h are shown on the display screen for allowing the user to identify the positions of these areas. Alternatively, in some embodiments, the dividing lines are invisible as long as the center point of the center control area 301 can be realized by the user. Under this circumstance, the desired control area can still be successfully tapped without the need of using the naked eyes to recognize the control area.

From the above discussions, the touch-sensitive surface is divided into several control areas. By touching the control areas, the functions of the 5-direction control pad or the 3×3 numerical keypad (or the 3×3 layout) can be implemented by the input device without physical keys. In other words, the input device 30 is flexibly provided with a floating input area corresponding to the layout of the objects of the highlighted target zone 20. Since the floating input area is adaptively adjusted to comply with the layout of the objects of the highlighted target zone 20, by intuitively tapping a specified neighboring control area at a specified position relative to the center control area of the input device 30, a target object at the specified position relative to the center object 201 of the target zone 20 is inputted.

The intelligent input method of the present invention may be implemented by a multi-touch control technology. In the multi-touch mode, the input device 30 is configured to identify different touch commands on the touch-sensitive surface of the input device 30. For example, the touch commands may be executed by a one-finger slide touch, a one-finger tap touch, a one-finger double tap touch, a one-finger rest touch, a one-finger swipe touch, a multi-finger slide touch, a multi-finger tap touch, a multi-finger double tap touch, a multi-finger rest touch, a multi-finger swipe touch, a multi-finger pinch gesture, a multi-finger spread gesture or a multi-finger rotate gesture.

For example, in the multi-touch mode, the input device 30 is configured to receive a first kind of touch command to move the highlighted target zone 20 shown on the display screen of the electronic device 40, then to receive a second kind of touch command to select the target object of the highlighted target zone 20, then to receive a third kind of touch command to reset the center point of the input device 30, and finally to receive a fourth kind of touch command to change the layout of the highlighted target zone 20.

It is noted that numerous combinations and variations may be made while retaining the teachings of the invention. For example, the input device 30 may be configured to control movement of the target zone 20 by the two-finger slide touch with the left-finger touch point as a default center point, then to select a target object by a one-finger tap touch, and finally to reset the center point of the input device by a two-finger tap touch.

In some embodiments, the layout of the selective items of the target zone 20 may be further adjusted. For example, in response to the two-finger pinch touch on the touch-sensitive surface, the layout of the selective items of the target zone 20 is simplified from the 3×3 layout to 5-direction control pad layout (5-D layout), the 3-V layout or the 3-H layout. In response to the two-finger spread touch on the touch-sensitive surface, the layout of the selective items of the target zone 20 is expanded from they-direction control pad layout, the 3-V layout or the 3-H layout to the complicated 3×3 layout. In response to the two-finger rotate touch on the touch-sensitive surface, the layout of the selective items of the target zone 20 is switched from the 3-V layout to the 3-H layout, or the layout of the selective items of the target zone 20 is switched from the 3-H layout to the 3-V layout.

Figure 14:
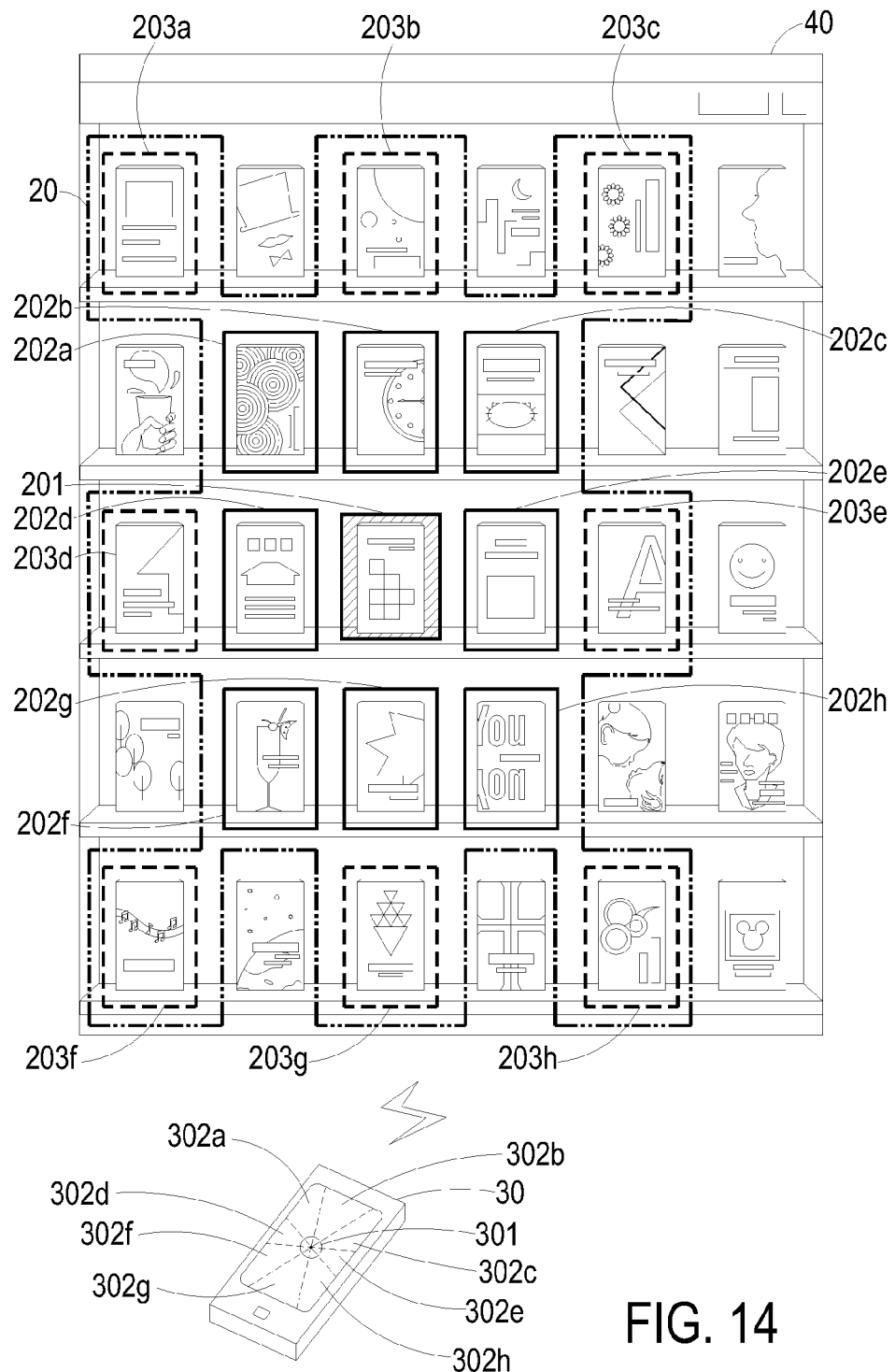
FIG. 14 schematically illustrates an implementation example of an intelligent input system and an intelligent input method according to another embodiment of the present invention.

Hereinafter, a more complicated example of the intelligent input method will be illustrated with reference to FIG. 14. FIG. 14 schematically illustrates an implementation example of an intelligent input system and an intelligent input method according to another embodiment of the present invention. As shown in FIG. 14, the objects of the target zone 20 shown on the display screen of the electronic device 40 comprise a center object 201, plural first-layer neighboring objects 202a~202h, and plural second-layer neighboring objects 203a~203h. The input device 30 may receive the following touch commands. For example, the target zone 20 is moved in response to a one-finger slide touch, the center object 201 and the first-layer neighboring objects 202a~202h are selected in response to a one-finger tap touch, the second-layer neighboring objects 203a~203h are selected in response to a two-finger tap touch, the left-finger touch point on the touch-sensitive surface is reset as the center point of the input device 30 in response to a two-finger tap touch, the double-layer 3×3 layout of the target zone 20 is simplified to the single-layer 3×3 layout of the target zone 20 in response to a two-finger pinch touch, and the single-layer 3×3 layout of the target zone 20 is switched to the double-layer 3×3 layout of the target zone 20 in response to a two-finger spread touch.

In this embodiment, the 3×3 layout has two-layer configurations. Alternatively, the 5-D layout, the 3-V layout or the 3-H layout may also have the multi-layer configuration. Consequently, different touch commands may be executed to input different layers of selective items.

Figure 15:
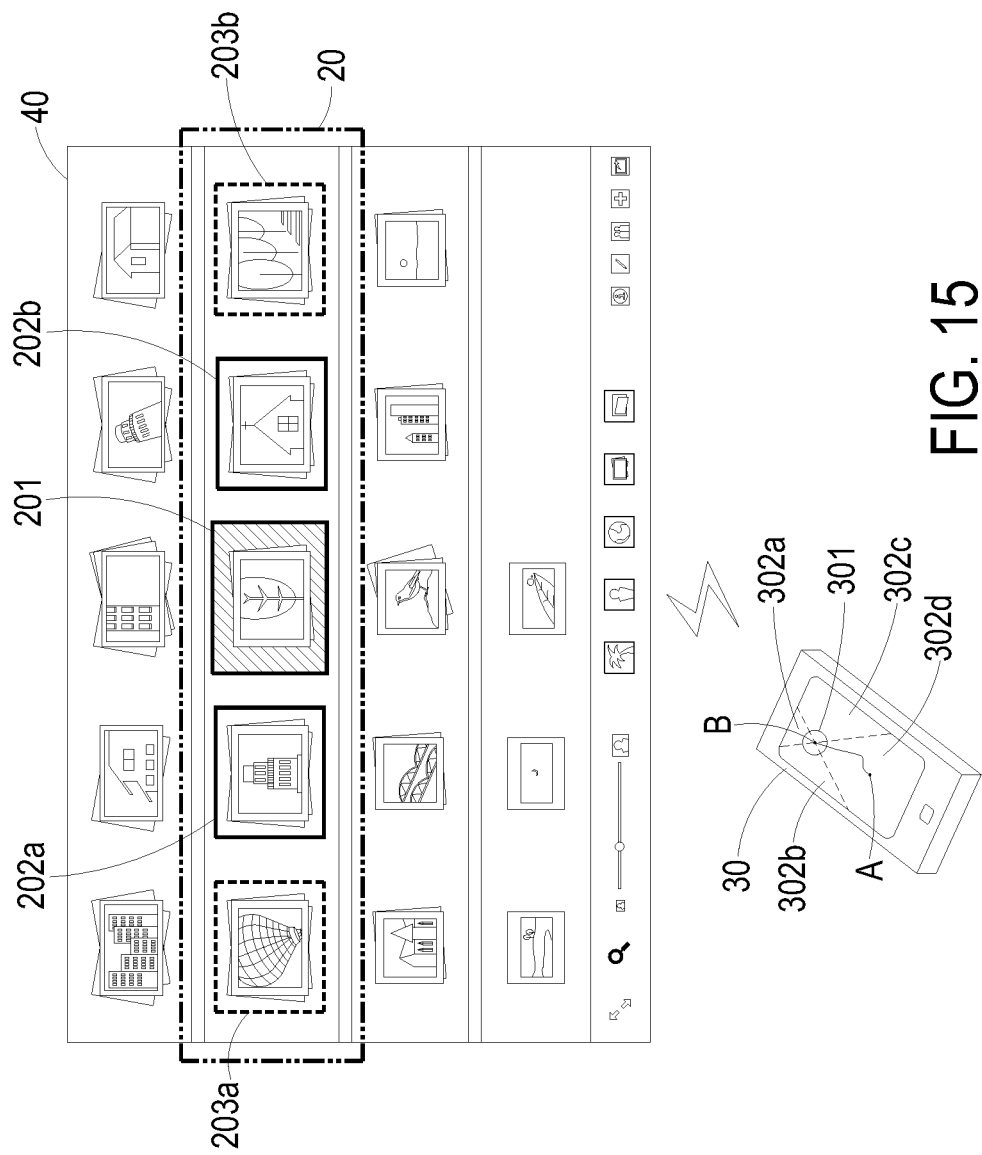
FIG. 15 schematically illustrates an implementation example of an intelligent input system and an intelligent input method according to another embodiment of the present invention.

FIG. 15 schematically illustrates an implementation example of an intelligent input system and an intelligent input method according to another embodiment of the present invention. As shown in FIG. 15, the objects of the target zone 20 shown on the display screen of the electronic device 40 are orderly distributed along the horizontal direction. The objects of the target zone 20 comprise a center object 201, plural first-layer neighboring objects 202a~202b, and plural second-layer neighboring objects 203a~203b. The center object 201 and the first-layer neighboring objects 202a~202b are selected in response to a one-finger tap touch. The second-layer neighboring objects 203a~203b are selected in response to a two-finger tap touch.

Figure 16:
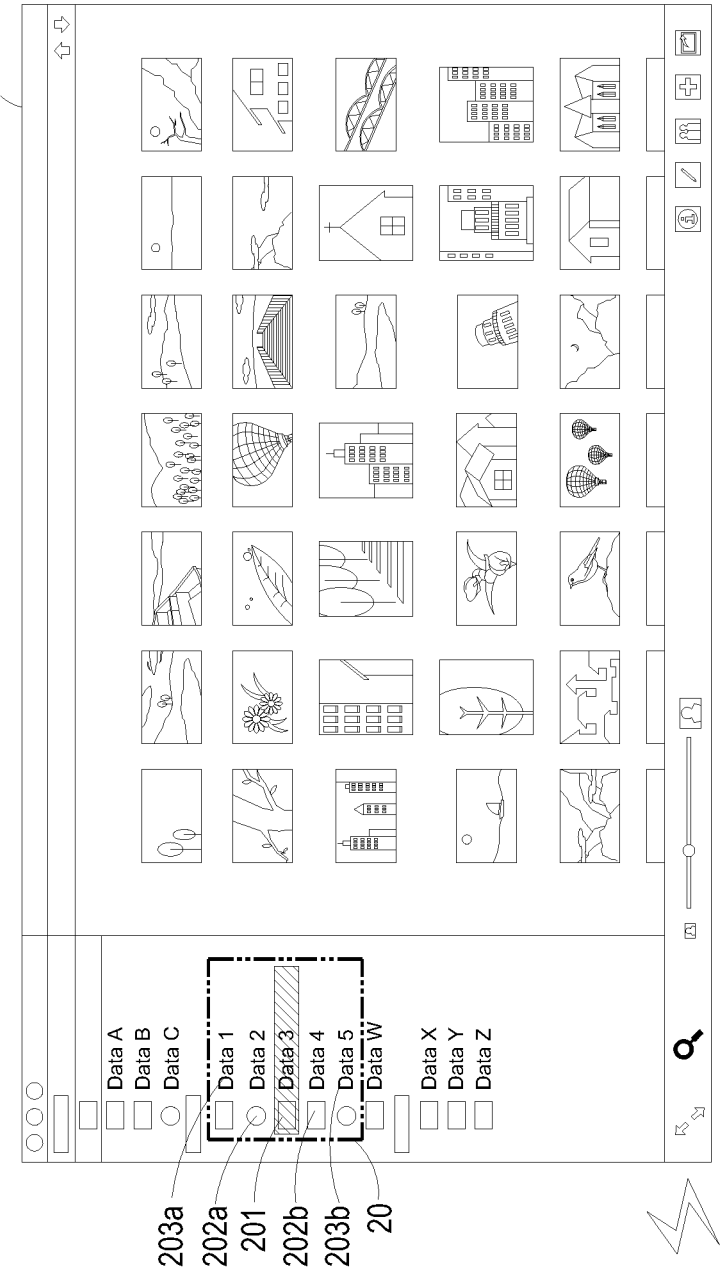
FIG. 16 schematically illustrates an implementation example of an intelligent input system and an intelligent input method according to another embodiment of the present invention.

FIG. 16 schematically illustrates an implementation example of an intelligent input system and an intelligent input method according to another embodiment of the present invention. As shown in FIG. 16, the objects of the target zone 20 shown on the display screen of the electronic device 40 are orderly distributed along the vertical direction. The objects of the target zone 20 comprise a center object 201, plural first-layer neighboring objects 202a~202b, and plural second-layer neighboring objects 203a~203b. The center object 201 and the first-layer neighboring objects 202a~202b are selected in response to a one-finger tap touch. The second-layer neighboring objects 203a~203b are selected in response to a two-finger tap touch.

Figure 17:
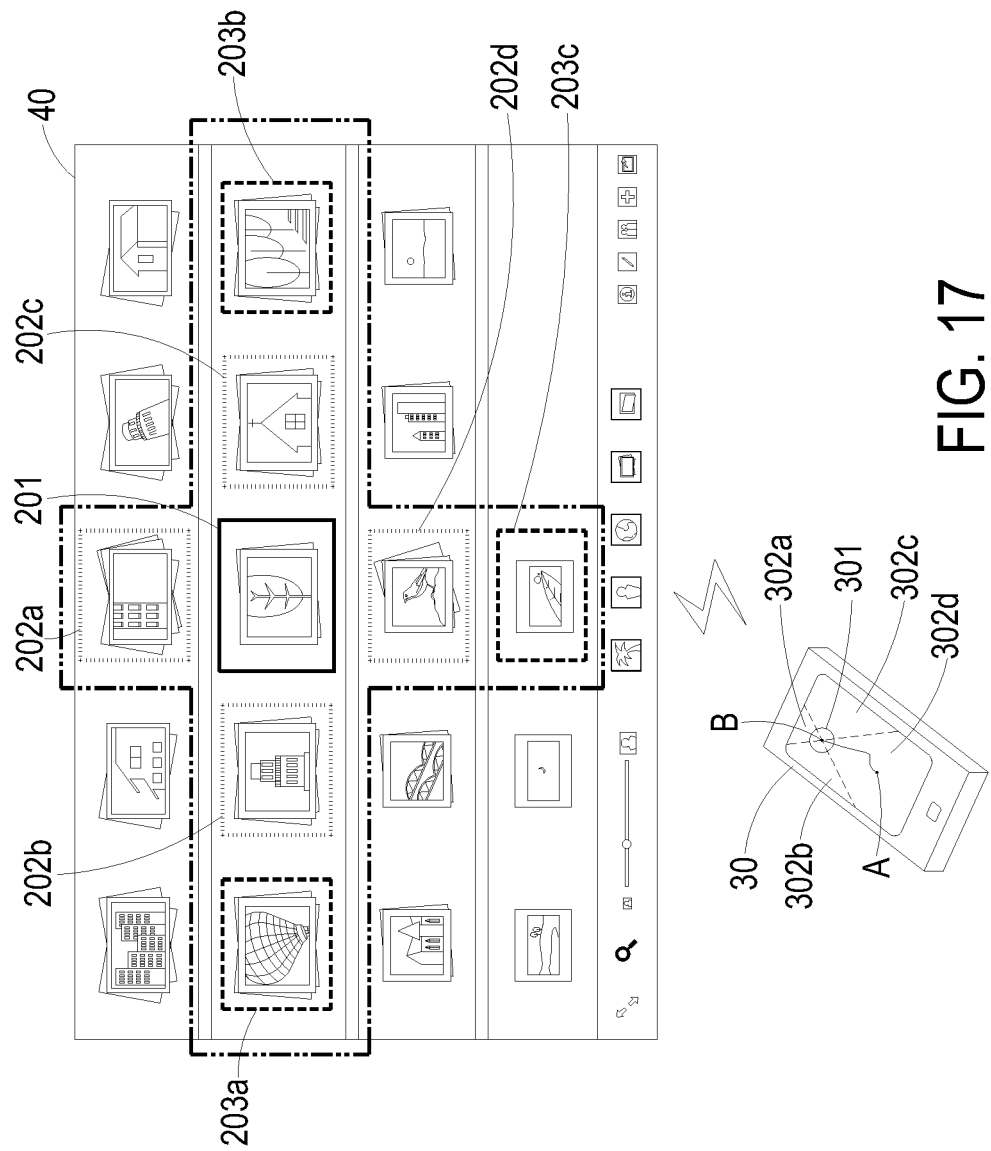
FIG. 17 schematically illustrates an implementation example of an intelligent input system and an intelligent input method according to another embodiment of the present invention.

FIG. 17 schematically illustrates an implementation example of an intelligent input system and an intelligent input method according to another embodiment of the present invention. As shown in FIG. 17, the objects of the target zone 20 shown on the display screen of the electronic device 40 are arranged in a two-layer 5-D layout. The objects of the target zone 20 comprise a center object 201, plural first-layer neighboring objects 202a~202d, and plural second-layer neighboring objects 203a~203c. The center object 201 and the first-layer neighboring objects 202a~202d are selected in response to a one-finger tap touch. The second-layer neighboring objects 203a~203c are selected in response to a two-finger tap touch.

In the multi-layer configuration, the center object is highlighted in a first visually-distinguishable manner, the first-layer neighboring objects are highlighted in a second visually-distinguishable manner, the second-layer neighboring objects are highlighted in a third visually-distinguishable manner, and the outer-layer objects are highlighted in another visually-distinguishable manner. Moreover, the center object and the first-layer neighboring objects are selected in response to a first touch command (e.g. a single tap touch), the second-layer neighboring objects are selected in response to a second touch command (e.g. a double tap touch), and the third-layer neighboring objects are selected in response to a third touch command (e.g. a triple tap touch). In other words, different touch commands may be executed to select different layers of selective items.

In the multi-touch mode, when the two-finger touch command is executed, it is difficult for the user to hold the input device and execute the touch command by a single hand. Consequently, the input device may be held by the left hand while the multi-touch command is inputted by the right hand. Alternatively, the input device may be placed on the user's lap or on a sofa.

In an embodiment, the input device 30 is programmed to receive the touch command of a default 3×3 layout of the target zone 20. In the 3×3 layout control mode, the touch-sensitive surface of the input device 30 may be used for the 5-D layout, the 3-V layout or the 3-H layout. Regardless of whether the scrolling-over movement of the target zone 20 across different panels or function sets takes place during the auto-adapt process, the touch-sensitive surface of the input device 30 can comply with the layout of the objects of the target zone 20.

Moreover, the input device 30 may be programmed to allow user customization for mode switching. If the 5-D layout control mode is selected by the user, the touch-sensitive surface of the input device 30 may be also used for the 3-V layout or the 3-H layout. Since each neighboring control area of the 5-D layout control mode covers 90-degree area, the possibility of erroneously touching the control area is reduced when compared with the 45-degree neighboring control area of the 3×3 layout control mode.

In an embodiment, a bi-directional communication channel between the input device 30 and the electronic device 40 may be established. In a case that the target zone 20 is automatically shrunken or expanded in response to the crossing-over movement of the target zone across different panels or function tabs, the electronic device 40 will issue a control signal to the input device 30. In response to the control signal, the touch areas of the input device 30 are correspondingly adjusted according to the layout of the objects of the target zone 20.

In an embodiment, when a touch command is executed, the coordinates of the current center point and the touch point, or the coordinate of a touch point relative to the current center point, or the angle and the distance of the touch point relative to the current center point or any other information about the position and the direction of the touch point and the current center point will be issued from the input device to the electronic device 40. After calculation, the object selected by the input device can be determined.

Figure 18:
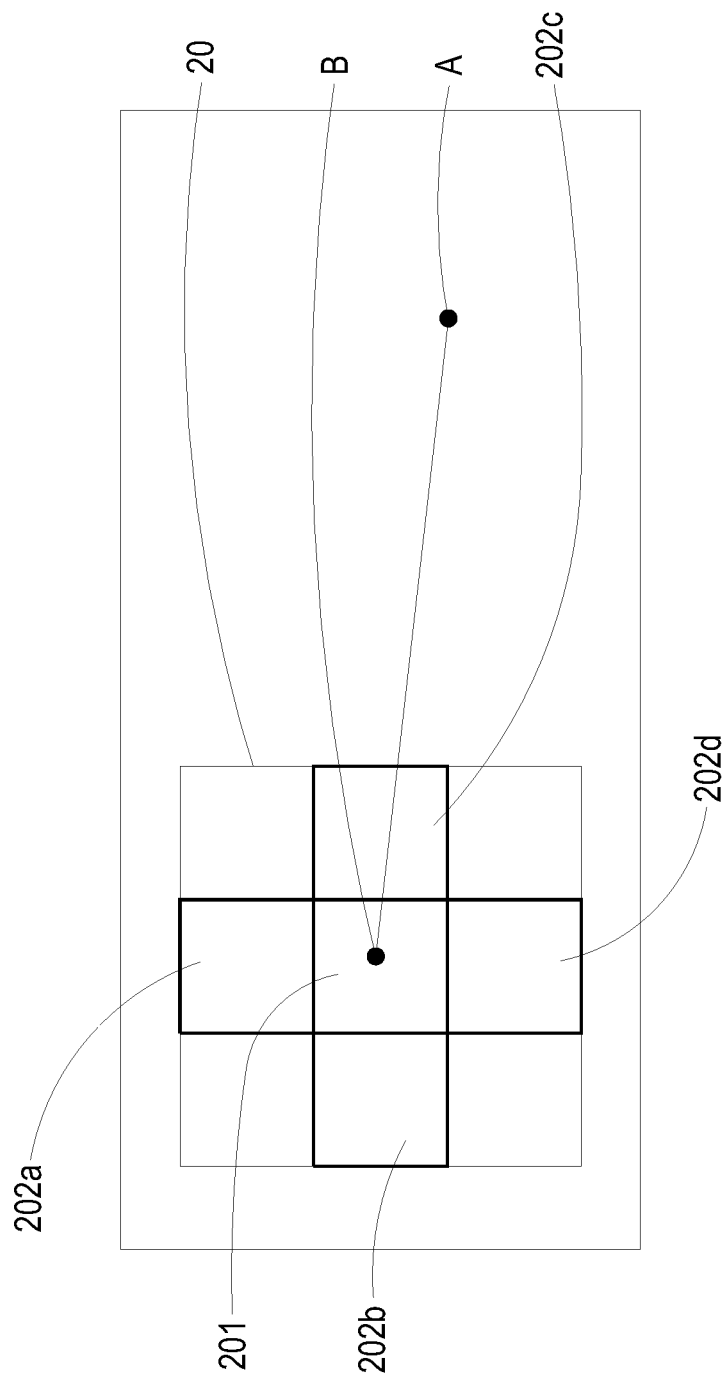
FIG. 18 schematically illustrates an input area on the touch-sensitive surface of the intelligent input device according to an embodiment of the present invention.

FIG. 18 schematically illustrates an input area on the touch-sensitive surface of the intelligent input device according to an embodiment of the present invention. The input area of the touch-sensitive surface may have a grid layout as shown in FIG. 18. The size of the input area may be customized and reconfigured to accommodate the habits and finger sizes of different users. Moreover, the dividing lines between the neighboring control areas may be shifted, distorted or skewed for right-handed user or left-handed user.

In the above embodiments of FIGS. 12~18, the operations of the input device with the touch-sensitive surface may correspondingly control selection or input of the objects of the target zone. By sliding the user's finger on the touch-sensitive surface of the input device or swinging the input device, the highlighted zone is moved to the target zone including the target object. According to the layout of the objects of the target zone, the area of the touch-sensitive surface of the input device is divided into different control areas corresponding to layout of the objects of the target zone, so that the target object can be selected. By the intelligent input method of the present invention, plural selective items can be simultaneously provided. Under this circumstance, the user can clearly understand the contents of the selective items and easily select the target selective item via the input device. Consequently, via the input device, the user can quickly select one of the selective items or input a character/number. In comparison with the conventional input technology, the intelligent input method of the present invention is more time-saving and user-friendly.

In the above embodiments, the input device is illustrated by referring to a smart phone, and the input is implemented in response to a finger touch on the touch-sensitive surface.

Figure 19:
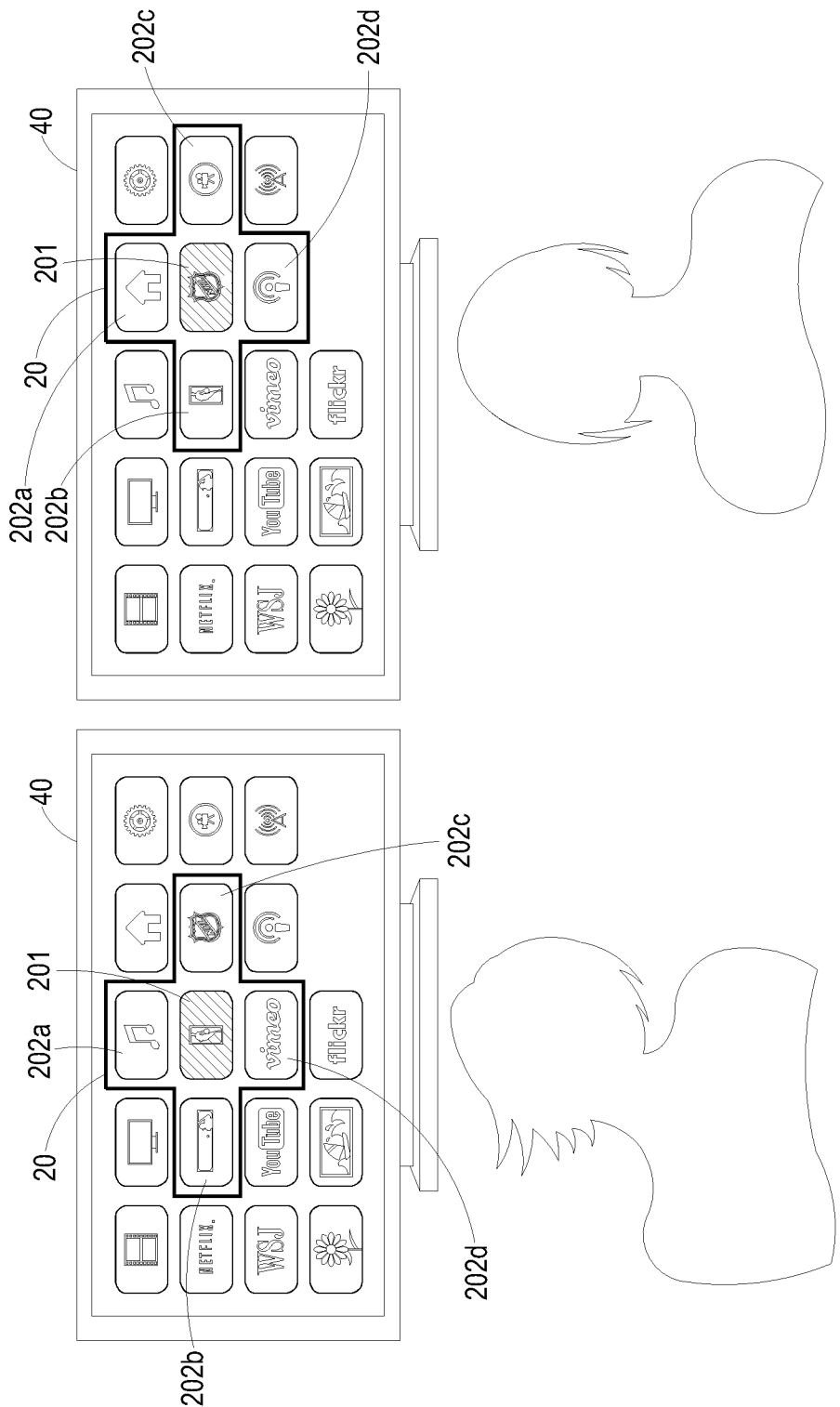
FIGS. 19A~19B schematically illustrate the implementation examples of an intelligent input system and an intelligent input method according to another embodiment of the present invention.

FIGS. 19A~19B schematically illustrate the implementation examples of an intelligent input system and an intelligent input method according to another embodiment of the present invention. In this embodiment, a highlighted target zone 20 is shown on the display screen of the electronic device 40. The target zone 20 comprises a center object 201 and plural neighboring objects 202a~202d. The input device is a motion detector for detecting the motion or gesture of the user's body. For example, if the user's head is swung in the right direction, the target zone 20 is moved in the right direction according to the swinging degree of the user's head. Consequently, the selective items of the target zone 20 are correspondingly changed according to the practical requirements of the user. Moreover, if the motion detector detects that a specified motion or gesture of the user's body (e.g. raising the right hand), the motion detector may identify that the selected object is the neighboring object 202c at the right side of the center object 201.

It is noted that the numerous modifications and alterations of the motion control input method may be made while retaining the teachings of the invention. For example, in an embodiment, a camera lens is installed on the display screen of the electronic device for detecting the hand gesture of the user. If the center of the user's palm faces the camera lens and the display screen and the hand is swung, the highlighted zone is correspondingly moved. If the center of the user's palm faces the ground and the fingers face the camera lens and the display screen, the highlighted zone is frozen. If the user makes a fist, the center object is selected. If a user's finger points to the right side, the right object is selected. If a user's finger points up, the up object is selected. It is noted that the hand gestures are presented herein for purpose of illustration and description only. Of course, other motions, movements or gestures of any parts of user's body may be applied to the intelligent input method of the present invention.

Alternatively, in another embodiment, a camera lens is installed on the display screen of the electronic device for detecting the hand gesture of the user. In addition, the electronic device is equipped with a sound-receiving device for receiving the sound commands. If the center of the user's palm faces the camera lens and the display screen and the hand is swung, the highlighted zone is correspondingly moved. If the user makes a fist, the highlighted zone is frozen. If the user says "center", the center object is selected. If the user says "right", the right object is selected. If the user says "lower left", the lower left object is selected. It is noted that the hand gestures or sound commands are presented herein for purpose of illustration and description only. Of course, other gestures or sound commands may be applied to the intelligent input method of the present invention.

Moreover, different combinations of control methods may be implemented in different embodiments of the present invention. For example, during the pointing stage of moving the target zone and during the selecting stage of selecting the target object, the motion control input method and the touch input method may be respectively employed. Alternatively, during the pointing stage of moving the target zone and during the selecting stage of selecting the target object, the touch input method and the motion control input method may be respectively employed. Motion control, sound control, touch control or any other control methods may be combined in different ways to implement the intelligent input method of the present invention, without limiting the scopes of the present invention to any particular control methods.

On the other hand, the intelligent input system and the intelligent input method of the present invention can be used to browse a web page or operate a graphical user interface includes randomly-distributed objects. Hereinafter, the input device will be illustrated by referring to a smart phone, and the electronic device will be illustrated by referring to an intelligent TV.

Figure 20:
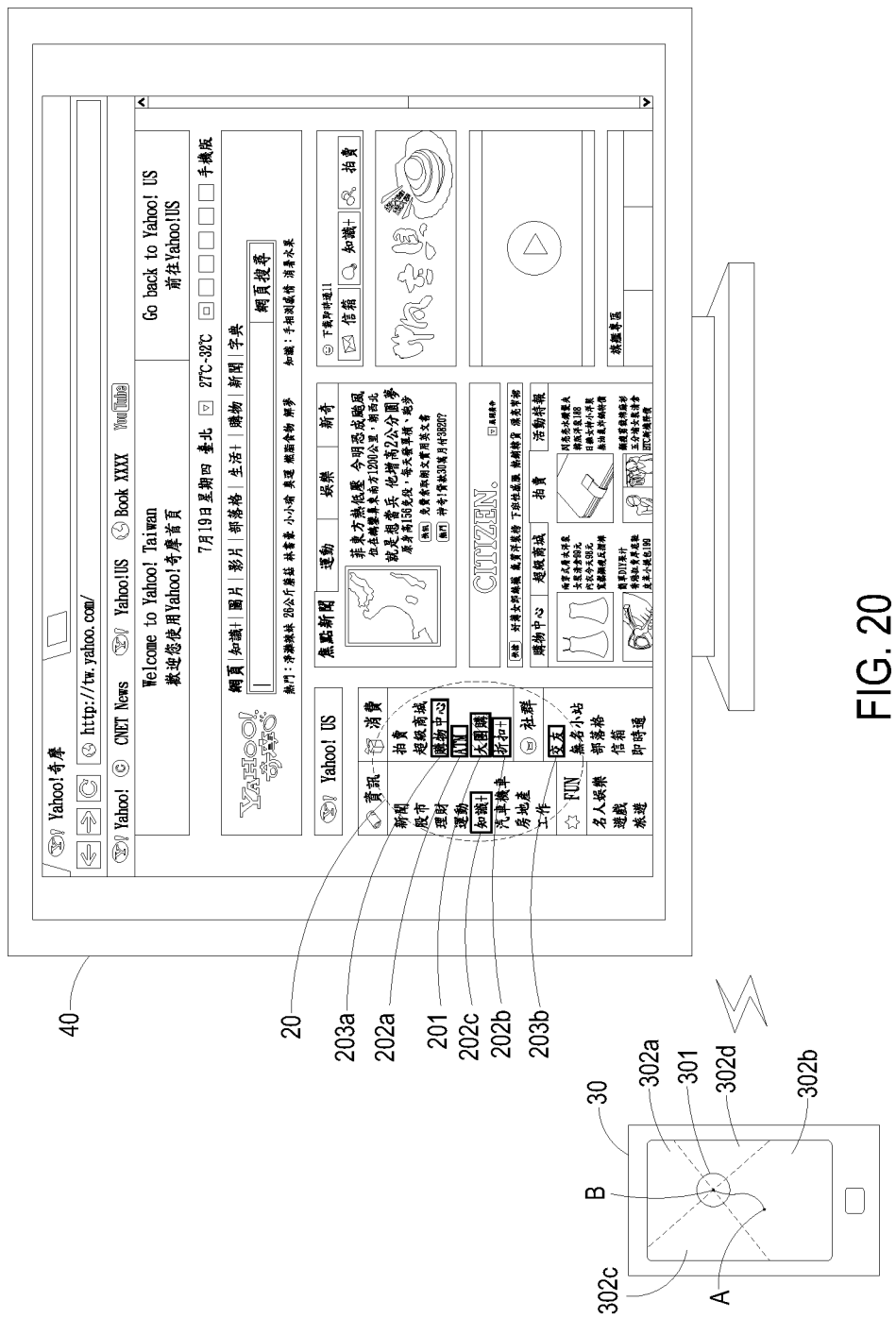
FIG. 20 schematically illustrates an implementation example of an intelligent input system and an intelligent input method according to another embodiment of the present invention.

FIG. 20 schematically illustrates an implementation example of an intelligent input system and an intelligent input method according to another embodiment of the present invention. A Yahoo homepage is shown on the display screen of the electronic device 40. For selecting a target link, a slide touch of a finger on a touch-sensitive surface of the input device 30 results in a slide trajectory from a starting point A to an end point B. When the finger is placed on the starting point A, a highlighted zone is shown on the display screen of the electronic device 40. As the hidden cursor or indicator controlled by the input device 30 is moved, the highlighted zone is correspondingly moved. When the target link is included in the highlighted zone, the slide touch is ended (i.e. at the end point B). Once the user's finger is lifted from the touch-sensitive surface, the highlighted zone is fixed at the current position, and a target zone 20 including some circumscribed selective items is shown.

The target zone 20 shown on the electronic device 40 comprises a center link 201 and plural neighboring links 202a, 202b, 202c, 203a and 203b around the center link 201. The target link is one of the center link 201 and the plural neighboring links 202a, 202b, 202c, 203a and 203b. As shown in FIG. 20, the layout of the links of the target zone 20 is similar to the layout of the 5-direction control pad. That is, the target zone 20 contains the center link, the up link, the down link, the left link and the right link. For example, the link "Big group buying" is the center link 201, which is located at the hidden cursor or indicator controlled by the input device 30. The links "ATM", "Discount+" and "Knowledge" are respectively the first-layer neighboring links 202a, 202b and 202c around the center link 201. The links "Shopping center" and "Dating" are respectively the second-layer neighboring links 203a and 203b around the center link 201.

The end point B is used as a control point of the input device 30. A circle enclosing the end point B denotes a center control area 301 corresponding to the center link 201 of the target zone 20. The area around the center control area 301 is divided into four neighboring control areas 302a, 302b, 302c and 302d, which are radially extended from the center control area 301. In this embodiment, the neighboring control areas 302a, 302b, 302c and 302d of the center control area 301 may be respectively considered as the up area, the down area, the left area and the right area relative to the center control area

301. The neighboring control areas 302a, 302b, 302c and 302d are correlated to the neighboring links at the upper side, the lower side, the left side and the right side of the center link 201, respectively. For example, in response to a single tap touch on the center control area 301, the link "Big group buying" is selected. In response to a single tap touch on the neighboring control area 302a at the upper side of the center control area 301, the link "ATM" is selected. In response to a single tap touch on the neighboring control area 302b at the lower side of the center control area 301, the link "Discount+" is selected. In response to a single tap touch on the neighboring control area 302c at the left side of the center control area 301, the link "Knowledge" is selected. Since the links "Shopping center" and "Dating" are the second-layer neighboring links, these links are selected in response to the double tap touch. For example, in response to a double tap touch on the neighboring control area 302a at the upper side of the center control area 301, the link "Shopping center" is selected. In response to a double tap touch on the neighboring control area 302b at the lower side of the center control area 301, the link "Dating" is selected.

The input device 30 is capable of distinguishing different input actions of the finger on the touch-sensitive surface. For example, the slide touch of the finger indicates that the finger is continuously moved on the touch-sensitive surface for a longer time (e.g. longer than 0.5 second) instead of only touching a specified point. In addition, the tap touch of the finger indicates that the finger is contacted with a specified point of the touch-sensitive surface for a very short time.

In the above embodiments, the way of moving the highlighted zone is implemented by the slide touch of the user's finger. However, the way of moving the highlighted zone is not restricted. For example, the input device 30 may further include a built-in G-sensor, gyroscope or air mouse. By swinging or shaking the input device, the highlighted zone may be moved to the target zone including the target link.

Figure 21:
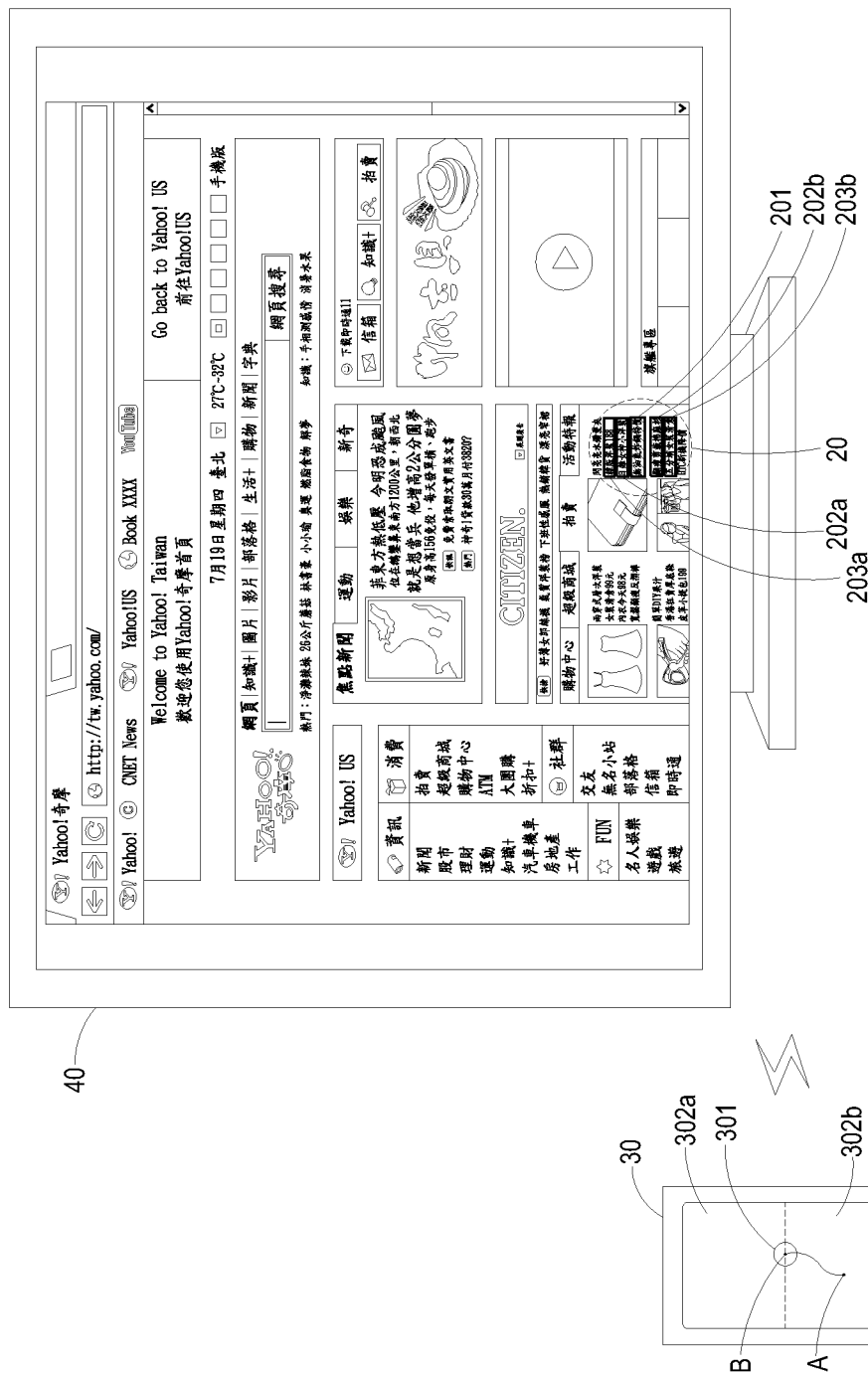
FIG. 21 schematically illustrates an implementation example of an intelligent input system and an intelligent input method according to another embodiment of the present invention.

FIG. 21 schematically illustrates an implementation example of an intelligent input system and an intelligent input method according to another embodiment of the present invention. The target zone of this embodiment is different from the target zone of FIG. 1. In comparison with FIG. 1, the links of the target zone 20 of FIG. 21 are well arranged along the vertical direction. The link "Oil-free air fryer special offer" is the center link 201. The links "Japanese goodness dress" and "Thin cotton fit" are respectively the first-layer neighboring links 202a and 202b around the center link 201. The links "Korean 188" and "Wufenpu women clearance" are respectively the second-layer neighboring links 203a and 203b around the center link 201.

The end point B is used as a control point of the input device 30. A circle enclosing the end point B denotes a center control area 301 corresponding to the center link 201 of the target zone 20. The area around the center control area 301 is divided into two neighboring control areas 302a and 302b, which are respectively located at the upper side and the lower side of the center control area 301. The neighboring control areas 302a and 302b are correlated to the neighboring links at the upper side and the lower side of the center link 201, respectively. For example, in response to a single tap touch on the center control area 301, the link "Oil-free air fryer special offer" is selected. In response to a single tap touch on the neighboring control area 302a at the upper side of the center control area 301, the link "Japanese goodness dress" is selected. In response to a single tap touch on the neighboring control area 302b at the lower side of the center control area 301, the link "Thin cotton fit" is selected. In response to a double tap touch on the neighboring control area 302a at the upper side of the center control area 301, the link "Korean 188" is selected. In response to a double tap touch on the neighboring control area 302b at the lower side of the center control area 301, the link "Wufenpu women clearance" is selected.

Figure 22:
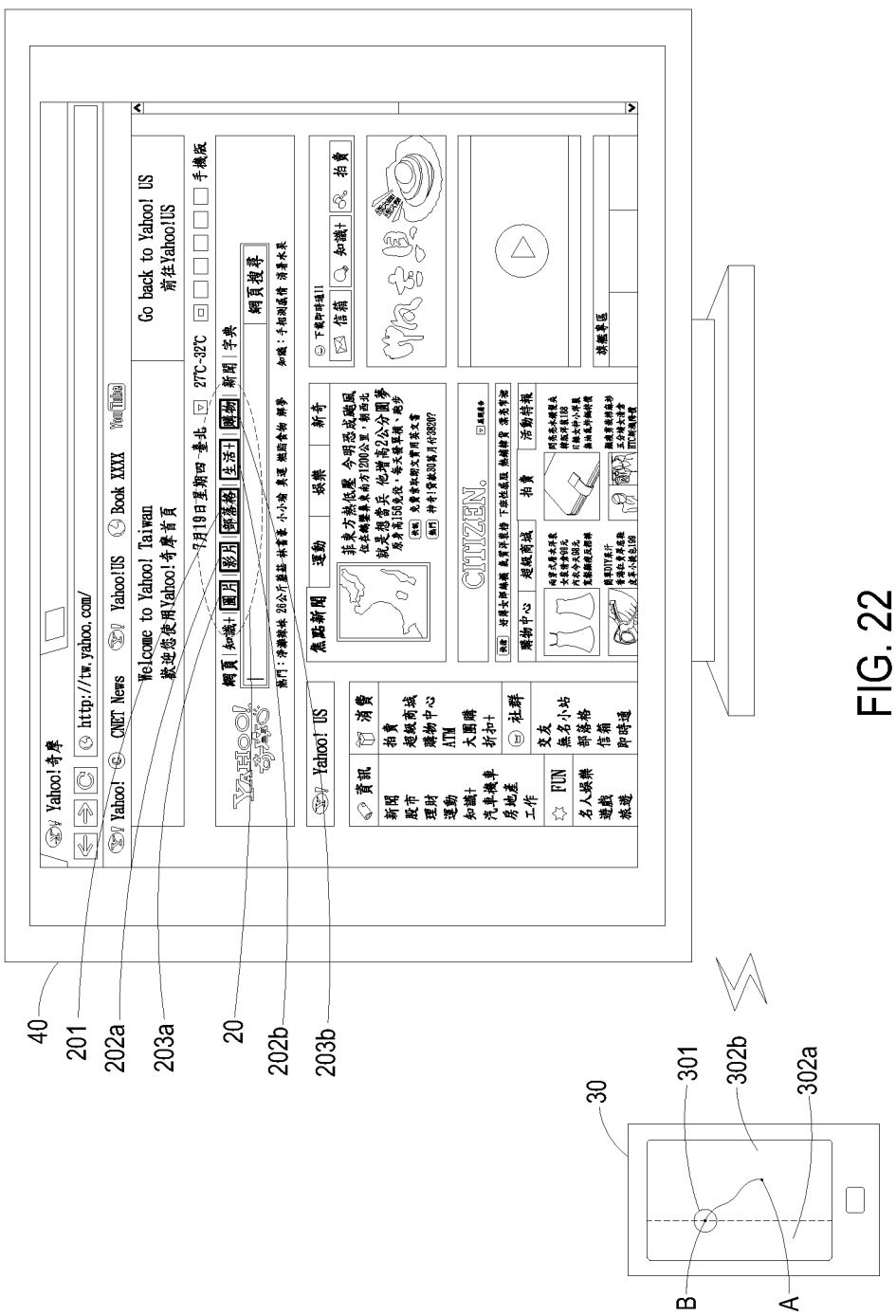
FIG. 22 schematically illustrates an implementation example of an intelligent input system and an intelligent input method according to another embodiment of the present invention.

FIG. 22 schematically illustrates an implementation example of an intelligent input system and an intelligent input method according to another embodiment of the present invention. The target zone of this embodiment is different from the target zone of FIG. 1. In comparison with FIG. 1, the links of the target zone 20 of FIG. 22 are well arranged along the horizontal direction. The link "Blog" is the center link 201. The links "Video" and "Life" are respectively the first-layer neighboring links 202a and 202b around the center link 201. The links "Image" and "Shopping" are respectively the second-layer neighboring links 203a and 203b around the center link 201.

The end point B is used as a control point of the input device 30. A circle enclosing the end point B denotes a center control area 301 corresponding to the center link 201 of the target zone 20. The area around the center control area 301 is divided into two neighboring control areas 302a and 302b, which are respectively located at the left side and the right side of the center control area 301. The neighboring control areas 302a and 302b are correlated to the neighboring links at the left side and the right side of the center link 201, respectively. For example, in response to a single tap touch on the center control area 301, the link "Blog" is selected. In response to a single tap touch on the neighboring control area 302a at the left side of the center control area 301, the link "Video" is selected. In response to a single tap touch on the neighboring control area 302b at the right side of the center control area 301, the link "Life" is selected. In response to a double tap touch on the neighboring control area 302a at the left side of the center control area 301, the link "Image" is selected. In response to a double tap touch on the neighboring control area 302b at the right side of the center control area 301, the link "Shopping" is selected.

Figure 23:
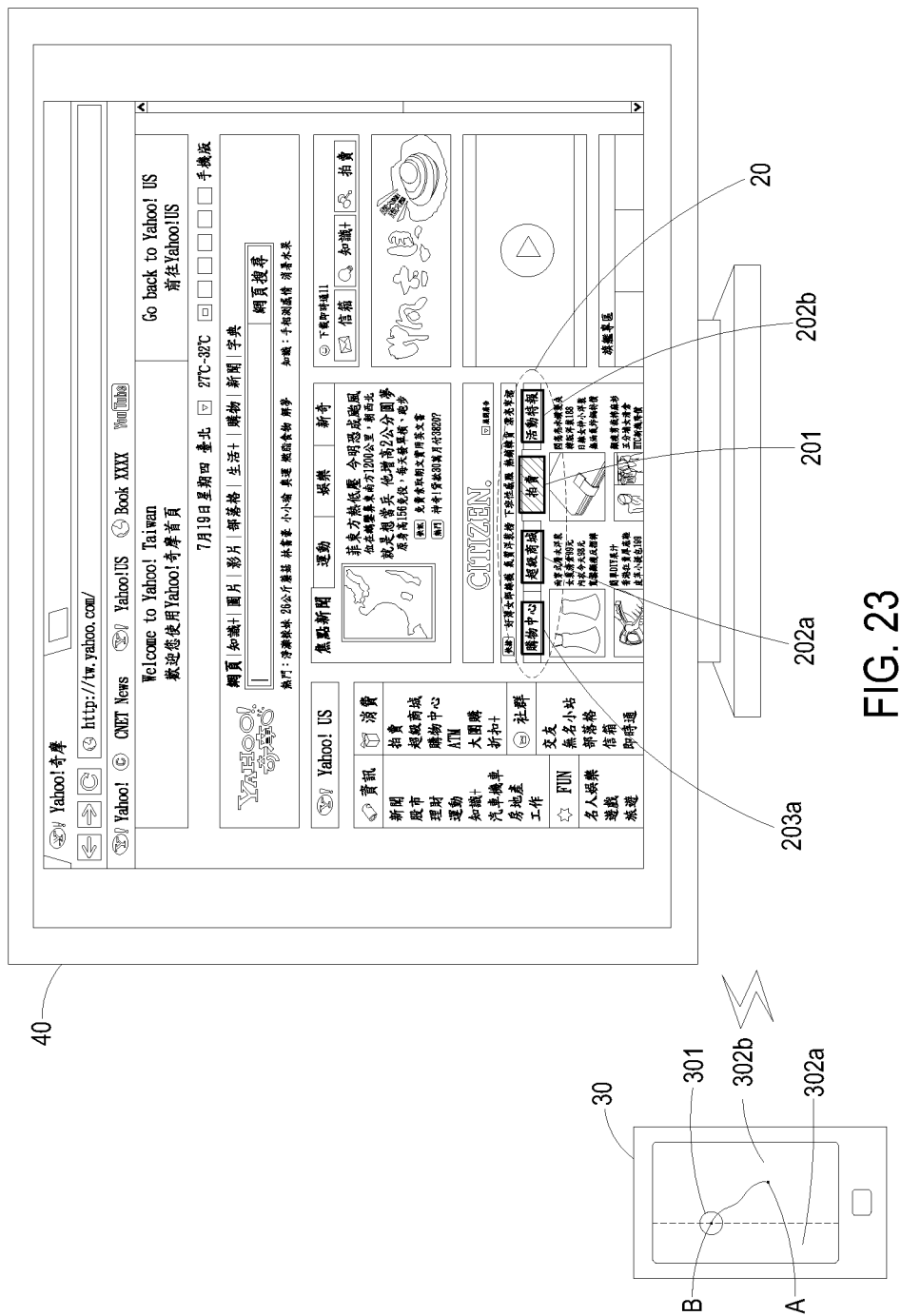
FIG. 23 schematically illustrates an implementation example of an intelligent input system and an intelligent input method according to another embodiment of the present invention.

FIG. 23 schematically illustrates an implementation example of an intelligent input system and an intelligent input method according to another embodiment of the present invention. The target zone of this embodiment is different from the target zone of FIG. 1. In comparison with FIG. 1, the links of the target zone 20 of FIG. 23 are well arranged along the horizontal direction. The link "Auction" is the center link 201. The links "Super Mall" and "Special event" are respectively the first-layer neighboring links 202a and 202b around the center link 201. The link "Shopping center" is the second-layer neighboring link 203a around the center link 201.

The end point B is used as a control point of the input device 30. A circle enclosing the end point B denotes a center control area 301 corresponding to the center link 201 of the target zone 20. The area around the center control area 301 is divided into two neighboring control areas 302a and 302b, which are respectively located at the left side and the right side of the center control area 301. The neighboring control areas 302a and 302b are correlated to the neighboring links at the left side and the right side of the center link 201, respectively. For example, in response to a single tap touch on the center control area 301, the link "Auction" is selected. In response to a single tap touch on the neighboring control area 302a at the left side of the center control area 301, the link "Super Mall" is selected. In response to a single tap touch on the neighboring control area 302b at the right side of the center control area 301, the link "Special event" is selected. In response to a double tap touch on the neighboring control area

302a at the left side of the center control area 301, the link "Shopping center" is selected.

Figure 24:
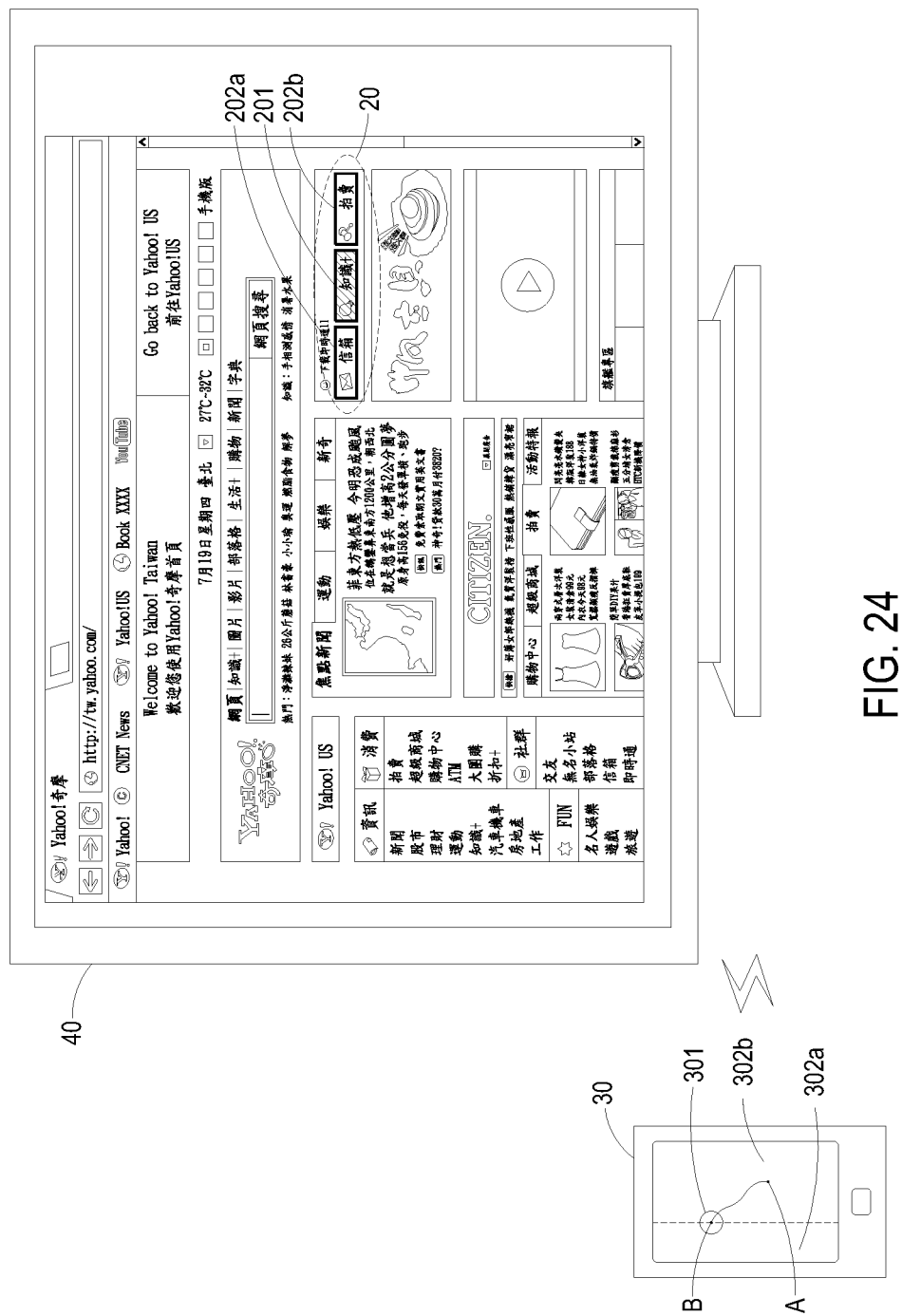
FIG. 24 schematically illustrates an implementation example of an intelligent input system and an intelligent input method according to another embodiment of the present invention.

FIG. 24 schematically illustrates an implementation example of an intelligent input system and an intelligent input method according to another embodiment of the present invention. The target zone of this embodiment is different from the target zone of FIG. 1. In comparison with FIG. 1, the links of the target zone 20 of FIG. 24 are well arranged along the horizontal direction. The link "Knowledge+" is the center link 201. The links "Mail box" and "Auction" are respectively the first-layer neighboring links 202a and 202b around the center link 201.

The end point B is used as a control point of the input device 30. A circle enclosing the end point B denotes a center control area 301 corresponding to the center link 201 of the target zone 20. The area around the center control area 301 is divided into two neighboring control areas 302a and 302b, which are respectively located at the left side and the right side of the center control area 301. The neighboring control areas 302a and 302b are correlated to the neighboring links at the left side and the right side of the center link 201, respectively. For example, in response to a single tap touch on the center control area 301, the link "Knowledge+" is selected. In response to a single tap touch on the neighboring control area 302a at the left side of the center control area 301, the link "Mail box" is selected. In response to a single tap touch on the neighboring control area 302b at the right side of the center control area 301, the link "Auction" is selected.

As known, the links of the web page have diversified types and diversified arrangements. For preventing from complexity and confusion of the links of the target zone, the highlighted zone is programmed to circumscribe the links with the same type or the same level as the center link. Consequently, the links of the target zone are simplified and clear. For example, in FIG. 20, the links of the target zone contain the category link selective items on the sidebar at the same level as the center link. In FIG. 21, the links of the target zone contain the commodity link selective items at the same "Auction" level as the center link. In FIG. 22, the links of the target zone contain the search classification link selective items at the same level as the center link. In FIG. 23, the links of the target zone contain the internet shopping link selective items at the same level as the center link. In FIG. 24, the links of the target zone contain the member exclusive link selective items at the same level as the center link.

In the above embodiments, the links of the target zone are text links. But a typical web page may contain text links, image links or video links. In accordance with the intelligent input method of the present invention, the highlighted zone may be switched to the "image only" mode, or the highlighted zone may be switched to the "video only" mode, or the highlighted zone may be switched to the "image and video only" mode.

Figure 25:
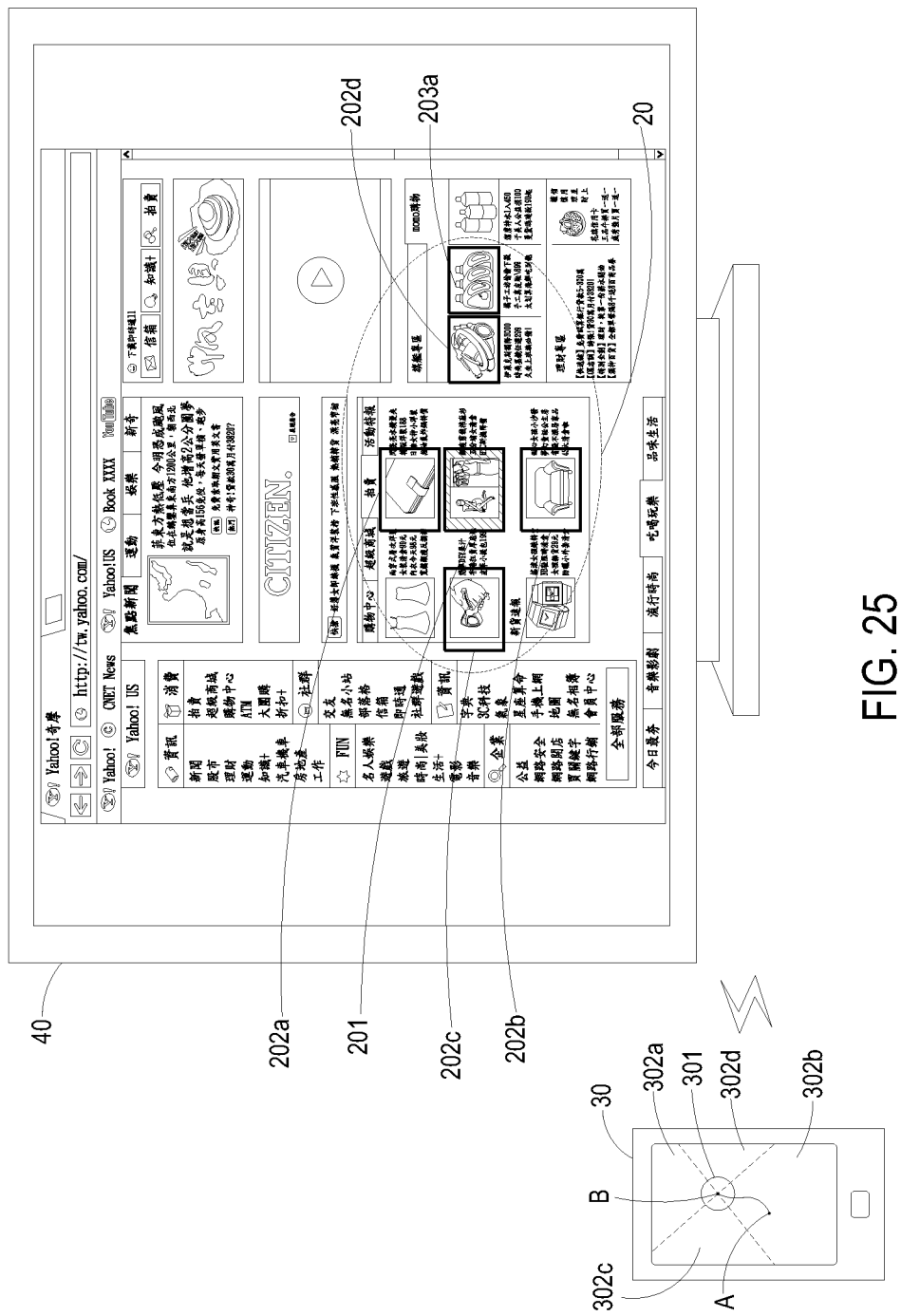
FIG. 25 schematically illustrates an implementation example of an intelligent input system and an intelligent input method according to another embodiment of the present invention.

FIG. 25 schematically illustrates an implementation example of an intelligent input system and an intelligent input method according to another embodiment of the present invention. In this embodiment, the intelligent input method is used to switch the highlighted zone to the "image only" mode. In a case that the user's finger slides on the touch-sensitive surface of the input device 30, the highlighted zone only circumscribes the image links, but the neighboring text links and other links are not circumscribed. As shown in FIG. 25, the layout of the image links of the target zone 20 is similar to the layout of the 5-direction control pad. That is, the image links of the target zone 20 comprise a center link 201, plural first-layer neighboring links 202a, 202b, 202c, 202d, and a second-layer neighboring link 203a. The first-layer neighboring links 202a, 202b, 202c and 202d are located at the upper side, the lower side, the left side and the right side of the center link 201, respectively. The second-layer neighboring link 203a is located at the right side of the center link 201.

The end point B is used as a control point of the input device 30. A circle enclosing the end point B denotes a center control area 301 corresponding to the center link 201 of the target zone 20. The area around the center control area 301 is divided into four neighboring control areas 302a, 302b, 302c and 302d, which are radially extended from the center control area 301. In this embodiment, the neighboring control areas 302a, 302b, 302c and 302d of the center control area 301 may be respectively considered as the up area, the down area, the left area and the right area relative to the center control area 301. The neighboring control areas 302a, 302b, 302c and 302d are correlated to the neighboring links at the upper side, the lower side, the left side and the right side of the center link 201, respectively. The way of selecting the target link is similar to that described in the above embodiments. That is, according to the position of the target link relative to the center link 201, an input action is performed on the neighboring control areas 302a, 302b, 302c and 302d of the center control area 301. For example, in response to a single tap touch on the neighboring control area, a corresponding first-layer neighboring link around the center link 201 is selected. In response to a double tap touch on the neighboring control area, a corresponding second-layer neighboring link around the center link 201 is selected.

Figure 26:
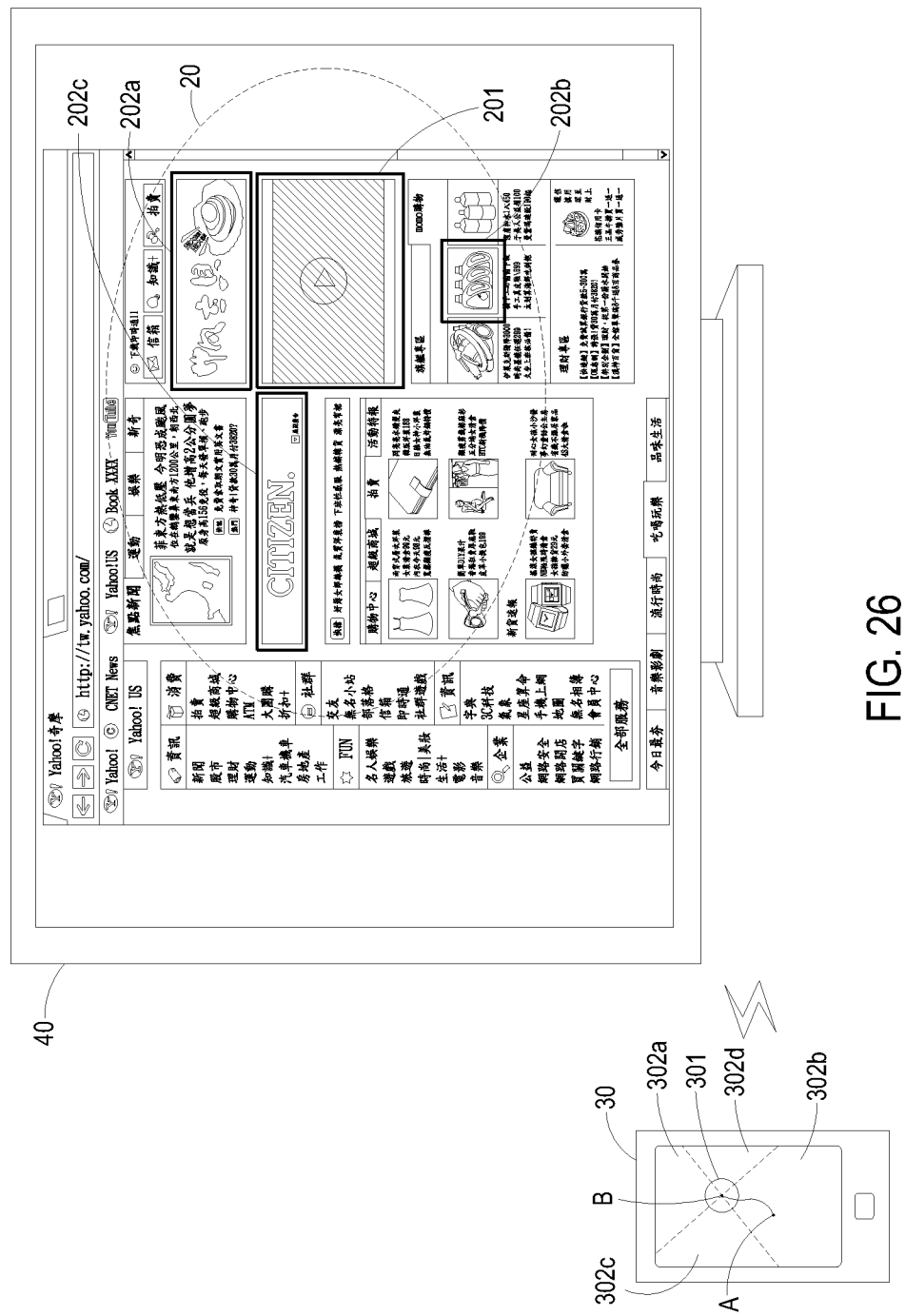
FIG. 26 schematically illustrates an implementation example of an intelligent input system and an intelligent input method according to another embodiment of the present invention.

FIG. 26 schematically illustrates an implementation example of an intelligent input system and an intelligent input method according to another embodiment of the present invention. In this embodiment, the intelligent input method is used to switch the highlighted zone to the "image and video only" mode. In a case that the user's finger slides on the touch-sensitive surface of the input device 30, the highlighted zone only circumscribes the image links and the video links, but the neighboring text links and other links are not circumscribed. As shown in FIG. 26, the layout of the image links and the video links of the target zone 20 is similar to the layout of the 5-direction control pad. That is, the image links of the target zone 20 comprise a center link 201 and plural first-layer neighboring links 202a, 202b, 202c. The first-layer neighboring links 202a, 202b and 202c are located at the upper side, the lower side and the left side of the center link 201, respectively.

The end point B is used as a control point of the input device 30. A circle enclosing the end point B denotes a center control area 301 corresponding to the center link 201 of the target zone 20. The area around the center control area 301 is divided into four neighboring control areas 302a, 302b, 302c and 302d, which are radially extended from the center control area 301. In this embodiment, the neighboring control areas 302a, 302b, 302c and 302d of the center control area 301 may be respectively considered as the up area, the down area, the left area and the right area relative to the center control area 301. The neighboring control areas 302a, 302b, 302c and 302d are correlated to the neighboring links at the upper side, the lower side, the left side and the right side of the center link 201, respectively. The way of selecting the target link is similar to that described in the above embodiments. That is, according to the position of the target link relative to the center link 201, an input action is performed on the neighboring control areas 302a, 302b, 302c and 302d of the center control area 301. For example, in response to a single tap touch on the neighboring control area, a corresponding first-layer neighboring link around the center link 201 is selected.

Figure 27:
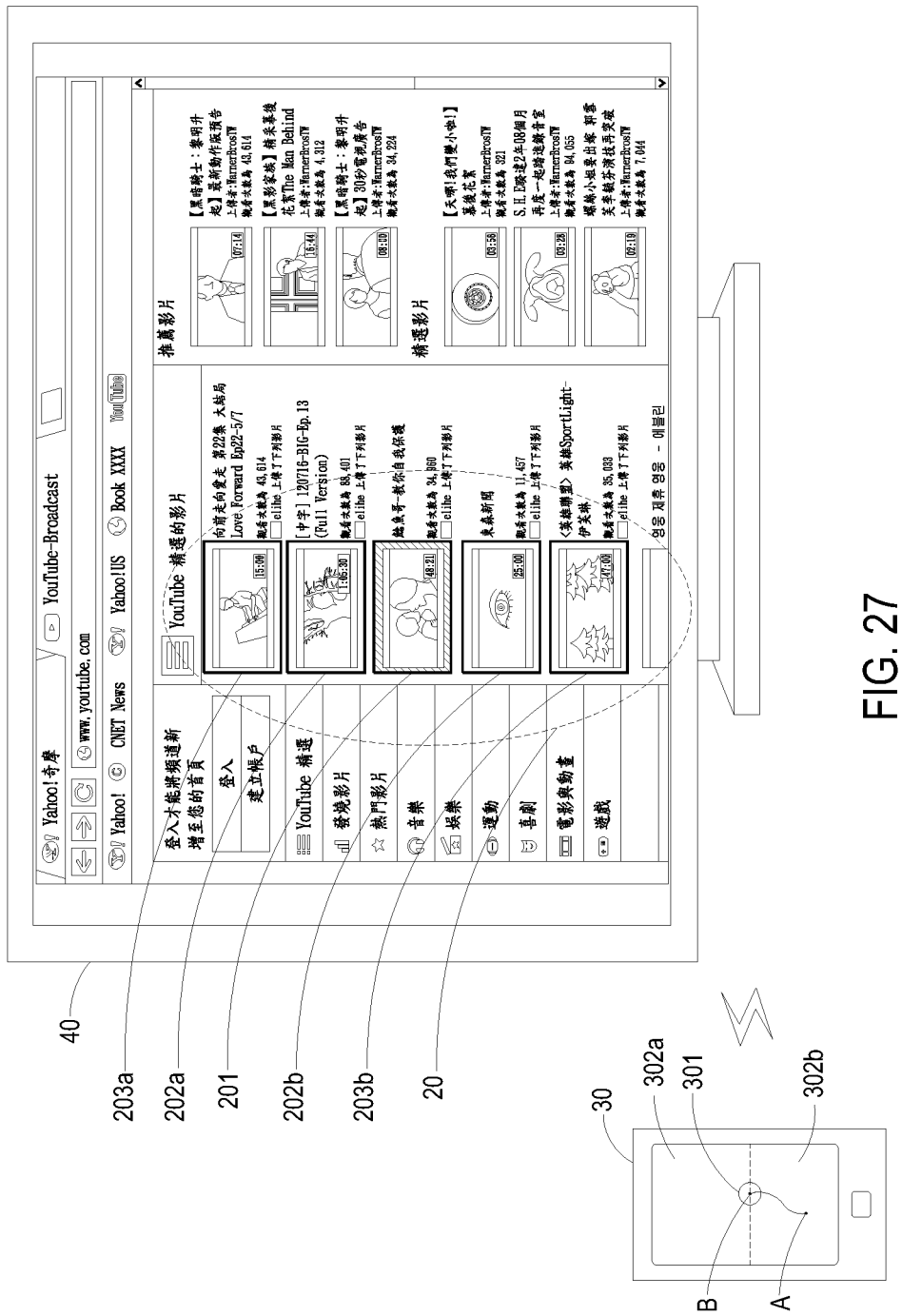
FIG. 27 schematically illustrates an implementation example of an intelligent input system and an intelligent input method according to another embodiment of the present invention.

FIG. 27 schematically illustrates an implementation example of an intelligent input system and an intelligent input method according to another embodiment of the present invention. A YouTube homepage is shown on the display screen of the electronic device 40. In this embodiment, the intelligent input method is used to switch the highlighted zone to the "video only" mode. In a case that the user's finger slides on the touch-sensitive surface of the input device 30, the highlighted zone only circumscribes the video links, but the neighboring text links and other links are not circumscribed. As shown in FIG. 27, the video links of the target zone 20 shown on the display screen of the electronic device 40 are orderly distributed along the vertical direction. The video links of the target zone 20 comprise a center link 201, plural first-layer neighboring links 202a, 202b, and plural second-layer neighboring links 203a, 203b. The first-layer neighboring links 202a and 202b are located at the upper side and the lower side of the center link 201, respectively. The second-layer neighboring links 203a, 203b are located at the upper side and the lower side of the center link 201, respectively.

The end point B is used as a control point of the input device 30. A circle enclosing the end point B denotes a center control area 301 corresponding to the center link 201 of the target zone 20. The area around the center control area 301 is divided into two neighboring control areas 302a and 302b, which are respectively located at the upper side and the lower side of the center control area 301. The neighboring control areas 302a and 302b are correlated to the neighboring links at the upper side and the lower side of the center link 201, respectively. The way of selecting the target link is similar to that described in the above embodiments. That is, according to the position of the target link relative to the center link 201, an input action is performed on the neighboring control areas 302a, and 302b. For example, in response to a single tap touch on the neighboring control area, a corresponding first-layer neighboring link around the center link 201 is selected. In response to a double tap touch on the neighboring control area, a corresponding second-layer neighboring link around the center link 201 is selected.

In the above embodiments, the links are arranged in a regular grid layout. Consequently, the neighboring links are orderly located at the upper side, the lower side, the left and the right side of the center link. Consequently, according to the position of the target link relative to the center link, an input action can be easily performed on the neighboring control area of the input device relative to the center control area. However, in some web pages, links could be irregularly and randomly distributed. Hereinafter, the way of using the intelligent input method of the present invention to select the randomly-distributed links will be illustrated with reference to the following embodiments.

Figure 28:
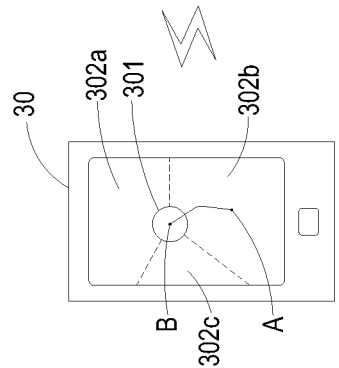
FIG. 28 schematically illustrates an implementation example of an intelligent input system and an intelligent input method according to another embodiment of the present invention.

FIG. 28 schematically illustrates an implementation example of an intelligent input system and an intelligent input method according to another embodiment of the present invention. In this embodiment, the description page of Wikipedia about Steve Jobs is shown on the display screen of the electronic device 40. The highlighted target zone 20 comprises a center link 201 and plural neighboring links 202a, 202b and 202c around the center link 201.

According to the distribution, layout, positions or directions of the links 201, 202a, 202b and 202c, the touch-sensitive surface of the input device 30 is divided into a center control area 301 and three neighboring control areas 302a, 302b and 302c. The center control area 301 is correlated with the center link 201. The neighboring control areas 302a, 302b and 302c are correlated with the neighboring links 202a, 202b and 202c, respectively.

For example, in response to a tap touch on the center control area 301, the link "Steve Wozniak" is selected. By intuitively tapping the neighboring control area 302a at the upper right side of the center control area 301, the link "The Walt Disney Company" is selected. By intuitively tapping the neighboring control area 302b at the lower right side of the center control area 301, the link "Xerox PARC's mouse" is selected. By intuitively tapping the neighboring control area 302c at the lower left side of the center control area 301, the link "graphical user interface graphical user interface" is selected.

Moreover, the number of neighboring links of the target zone 20 is customizable and configurable according to the practical requirements of the user. For example, in the multi-touch mode, the input device 30 is programmed to identify different touch commands on the touch-sensitive surface of the input device 30. For example, in response to the two-finger pinch touch on the touch-sensitive surface, the number of neighboring links of the target zone 20 is decreased. In response to the two-finger spread touch on the touch-sensitive surface, the number of neighboring links of the target zone 20 is increased. In response to the two-finger rotate touch on the touch-sensitive surface, a first set of the neighboring links of the highlighted zone is switched to a second set of the neighboring links relative to the center link.

For the non-technical-savvy (NTS) who is not familiar with or not good at the use of the computer product, about 3 to 5 neighboring links are recommended because too many neighboring links make the selection difficult, especially when the neighboring links are randomly distributed. For those familiar with or good at the use of the computer product, the number of the neighboring links is dependent on the precision of the user's finger.

FIG. 29 schematically illustrates an implementation example of an intelligent input system and an intelligent input method according to another embodiment of the present invention. In this embodiment, the web page shown on the display screen of the electronic device 40 is similar to that of FIG. 28. In comparison with FIG. 28, the links of the target zone 20 are different. In this embodiment, the target zone 20 comprises a center link 201 and four neighboring links 202a, 202b, 203a and 203b. The neighboring links 202a and 203a are located at the upper side of the center link 201. The neighboring links 202b and 203b are located at the lower side of the center link 201. The layout of the links is similar to the two-layer layout of FIG. 21. The neighboring links 202a and 202b are the first-layer neighboring links relative to the center link 201. The neighboring links 203a and 203b are the second-layer neighboring links relative to the center link 201.

According to the distribution, layout, positions or directions of the links 201, 202a, 202b, 203a and 203b, the touch-sensitive surface of the input device 30 is divided into a center control area 301 and four neighboring control areas 302a, 302b, 303a and 303b, which are defined by two concentric circles and a dividing line for dividing the touch-sensitive surface into an upper side and a lower side. The inner circle denotes a center control area 301 corresponding to the center object 201 of the target zone 20. The neighboring control area 302a between the inner circle and the outer circle and at the upper side of the touch-sensitive surface is correlated with the first-layer neighboring link 202a at the upper side of the center link 201. The neighboring control area 302b between the inner circle and the outer circle and at the lower side of the touch-sensitive surface is correlated with the first-layer neighboring link 202*b* at the lower side of the center link 201. The neighboring control area 303*a* at the outside of the outer circle is correlated with the second-layer neighboring link 203*a* at the upper side of the center link 201. The neighboring control area 303*b* at the outside of the outer circle is correlated with the second-layer neighboring link 203*b* at the lower side of the center link 201.

For example, in response to a tap touch on the center control area 301, the link "consumer electronics" is selected. By intuitively tapping the neighboring control area 303*a*, the link "Apple Inc." is selected. By intuitively tapping the neighboring control area 302*a*, the link "personal computer revolution" is selected. By intuitively tapping the neighboring control area 302*b*, the link "Pixar Animation Studios" is selected. By intuitively tapping the neighboring control area 303*b*, the link "The Walt Disney Company" is selected.

Moreover, the concentric-circle layout, the number of the concentric circles or the layer number of the neighboring links of the target zone 20 is customizable and configurable according to the practical requirements of the user. In the multi-touch mode, the input device 30 is programmed to identify different touch commands on the touch-sensitive surface of the input device 30. For example, in response to the two-finger pinch touch on the touch-sensitive surface, the layer number of neighboring links of the target zone 20 is decreased. In response to the two-finger spread touch on the touch-sensitive surface, the layer number of neighboring links of the target zone 20 is increased. In response to the two-finger rotate touch on the touch-sensitive surface, a first set of the first-layer neighboring links of the highlighted zone is switched to a second set of the first-layer neighboring links relative to the center link. In response to the three finger rotate touch on the touch-sensitive surface, a first set of the second-layer neighboring links of the highlighted zone is switched to a second set of the second-layer neighboring links relative to the center link.

For the non-technical-savvy (NTS) who is not familiar with or not good at the use of the computer product, two layers of neighboring links are recommended because the number neighboring links in each layer is manageable. For those familiar with or good at the use of the computer product, the layer number of the neighboring links is dependent on the precision of the user's finger.

FIG. 30 schematically illustrates an implementation example of an intelligent input system and an intelligent input method according to another embodiment of the present invention. In this embodiment, the web page shown on the display screen of the electronic device 40 is similar to that of FIG. 28. In comparison with FIG. 28, the links of the target zone 20 are different. In this embodiment, the target zone 20 comprises a center link 201 and five neighboring links 202*a*, 202*b*, 202*c*, 202*d* and 203*a*. The neighboring links 202*a* and 203*a* are located at the right side of the center link 201. In other words, the layout of the links is a two-layer layout.

According to the distribution, layout, positions or directions of the links 201, 202*a*, 202*b*, 202*c*, 202*d* and 203*a*, the touch-sensitive surface of the input device 30 is divided into a center control area 301 and four neighboring control areas 302*a*, 302*b*, 302*c* and 302*d*. The inner circle denotes a center control area 301 corresponding to the center link 201 of the target zone 20. By an arc-shaped dividing line, the neighboring control area 302*a* is divided into an inner neighboring control area 302*a*1 and an outer neighboring control area 302*a*2. The inner neighboring control area 302*a*1 between the inner circle and the arc-shaped dividing line of the touch-sensitive surface is correlated with the first-layer neighboring link 202*a* at the right side of the center link 201. The outer neighboring control area 302*a*2 at the outside of the arc-shaped dividing line of the touch-sensitive surface is correlated with the second-layer neighboring link 203*a* at the right side of the center link 201. The neighboring control area 302*b* at the lower right side of the center control area 301 is correlated with the first-layer neighboring link 202*b* at the lower right side of the center link 201. The neighboring control area 302*c* at the left side of the center control area 301 is correlated with the first-layer neighboring link 202*c* at the left side of the center link 201. The neighboring control area 302*d* at the upper left side of the center control area 301 is correlated with the first-layer neighboring link 202*d* at the upper left side of the center link 201.

For example, in response to a tap touch on the center control area 301, the link "Pixar" is selected. By intuitively tapping the neighboring control area 302*a*1, the link "11" is selected. By intuitively tapping the neighboring control area 302*a*2, the link "Toy Story" is selected. By intuitively tapping the neighboring control area 302*b*, the link "CEO" is selected. By intuitively tapping the neighboring control area 302*c*, the link "Lucusfilm" is selected. By intuitively tapping the neighboring control area 302*d*, the link "computer platform" is selected.

In this embodiment and all the above examples, the user does not need to know how the touch surface is divided into different control areas. Moreover, the dividing lines can be hidden and not displayed. Under this circumstance, the user only needs to view the neighboring links of the highlighted zone shown on the display screen without the need of viewing the input device. With the positions of the neighboring links relative to the center link on the display screen in sight, the target link can be selected by tapping on the corresponding position of the touch-sensitive surface of the input device.

On the other hand, the user needs to perform the following process. Firstly, slide the finger on the touch-sensitive surface of the input device, and the highlighted zone is moved to a target zone including the target link. Then, by simply looking at the highlighted zone, the position and the direction of the target link relative to the center link are known. Then, by tapping the touch-sensitive surface of the input device at the same position and in the same direction relative to the last touch point, the target link is selected. By the intelligent input method of the present invention, the user only needs to focus on the display screen without the need of looking at the input device.

Figure 31:
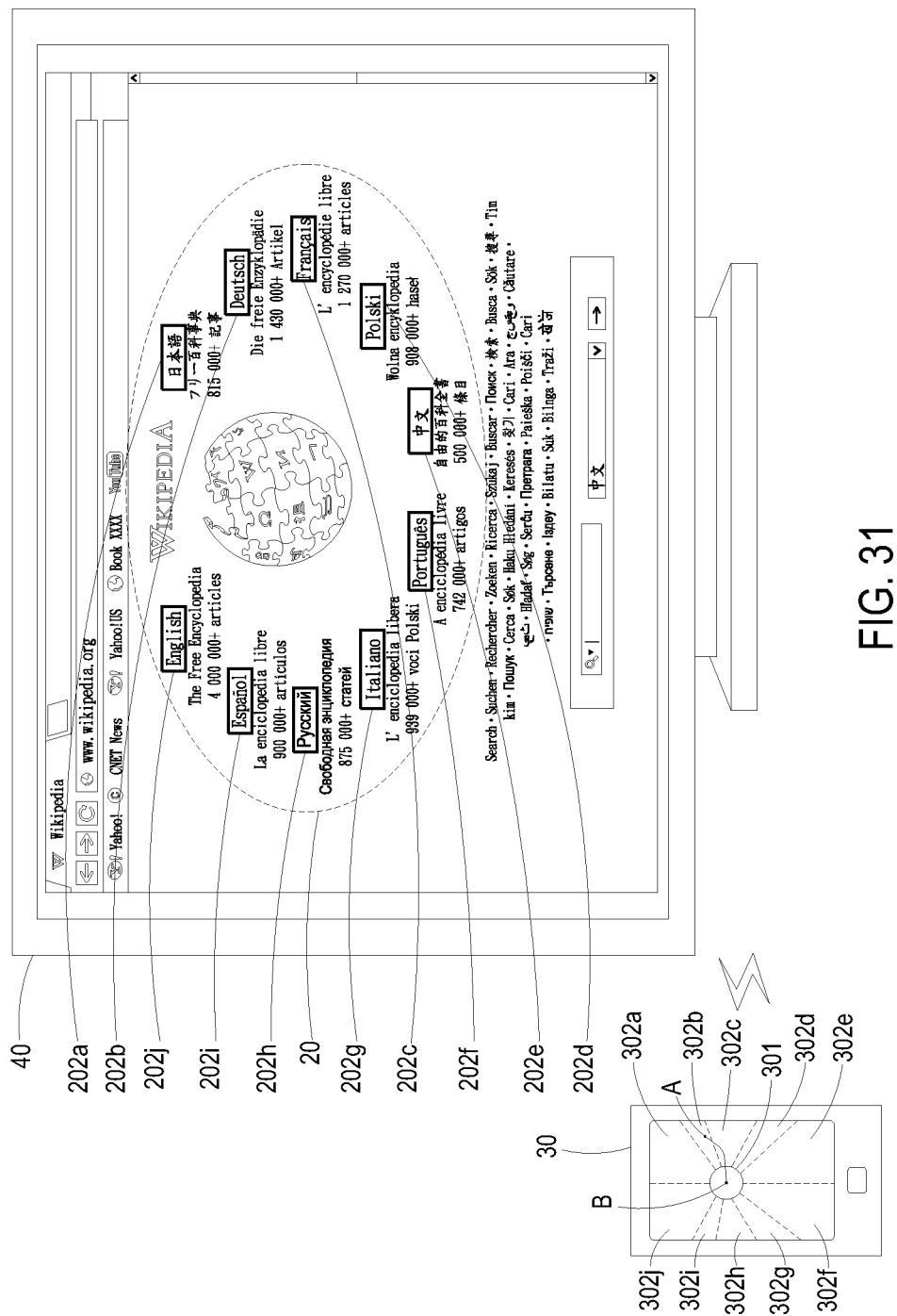
FIG. 31 schematically illustrates an implementation example of an intelligent input system and an intelligent input method according to another embodiment of the present invention.

FIG. 31 schematically illustrates an implementation example of an intelligent input system and an intelligent input method according to another embodiment of the present invention. In this embodiment, a Wikipedia homepage is shown on the display screen of the electronic device 40. As shown in FIG. 31, various language links are arranged around a central spherical image. Since these links are symmetrically arranged, it is not necessary to have or highlight a center link for the user can still recognize the target zone without confusion.

As shown in FIG. 31, the target zone 20 comprises ten neighboring links 202*a*~202*j*. According to the distribution, layout, positions or directions of the links 202*a*~202*j*, the touch-sensitive surface of the input device 30 is divided into a center control area 301 and ten neighboring control areas 302*a*~302*j*. A circle enclosing the end point B denotes a center control area 301. The ten neighboring control areas 302*a*~302*j* are correlated with the ten neighboring links 202*a*~202*j*, respectively. According to the position of the neighboring link relative to the center link on the display screen of the electronic device 40, the target link can be selected in response to the tap touch on the corresponding neighboring control area of the input device.

Alternatively, in some other embodiments, the objects contained in the target zone are symmetrical in a simply layout (e.g. a 3×3 layout). Since the relationship between the neighboring links and the center link is very obvious, it is only necessary to highlight the center link without the need of highlighting the neighboring links. By intuitively tapping a specified neighboring control area at a specified position (e.g. at the up, down, left, right, upper right, lower right, upper left or lower left position) relative to the center control area of the input device 30, a target link at the specified position relative to the center link 201 of the target zone 20 is inputted.

In an embodiment, if a text link contains too many words, it is possibly difficult to adequately define the link's position or direction. The intelligent input method of the present invention may be programmed to highlight only the first word of the text link or highlight only the first letter or first few letters. Moreover, the intelligent input method of the present invention may be programmed to place a dot, a bullet point, any symbol or any graphics before or around a text link in order to make the position and direction judgment easy and clear. It is noted that the way of highlighting the links may be varied according to the practical requirements. For example, the way of highlighting the links may be implemented by changing colors, adding pictures, icons or images, applying motion or animation effects or 3D effects, as long as the position and the direction of target can be viewed in a visually distinguishable manner.

In an embodiment, the intelligent input method of the present invention may be programmed to automatically determine a suitable number of links included in the highlight zone according to the crowdedness of links. That is, in a case that the highlighted zone is moved on different portions of a web page, the total number of circumscribed links can be automatically decreased or increased. Consequently, the user can easily define the position and the direction of the links in a visually distinguishable manner simply by looking at the highlighted zone.

In an embodiment, a bi-directional communication channel between the input device and the electronic device may be established. In a case that the number of highlighted links is changed, the electronic device issues a message to inform the input device. In response to the message, the input device automatically switches to a suitable touch surface division to fit the current highlighted links. Consequently, the layout of touch areas of the input device is correspondingly adjusted according to the layout of the links of the target zone.

Figure 32:
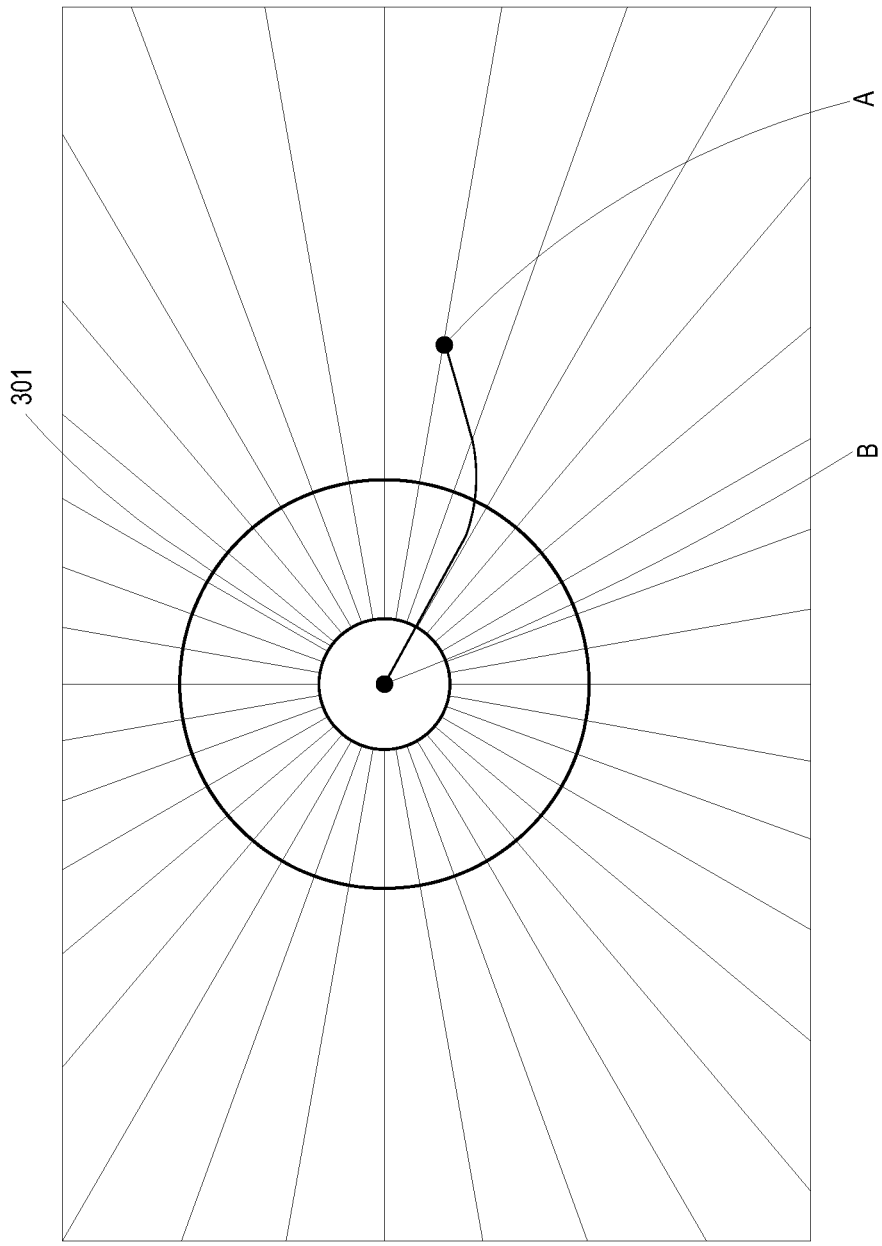
FIG. 32 schematically illustrates the layout of the control areas of the touch-sensitive surface of an intelligent input device according to an embodiment of the present invention.

FIG. 32 schematically illustrates the layout of the control areas of the touch-sensitive surface of an intelligent input device according to an embodiment of the present invention. As shown in FIG. 32, the end point B is used as a control point of the input device. A first circle enclosing the end point B denotes a center control area 301 corresponding to the center link of the target zone. A second circle enclosing the first circle is concentric to the first circle. The touch-sensitive surface is divided into 36 radial lines by the two concentric circles. Every two radial lines have 10 degree apart. That is, the touch-sensitive surface is a two-layer configuration, wherein each layer comprises 36 radial bands. Such a division will cover all of the above embodiments because it can be reduces to all disclosed division layout by grouping contiguous radial bands together to form a particular input area of suitable size for a particular random link.

Figure 33:
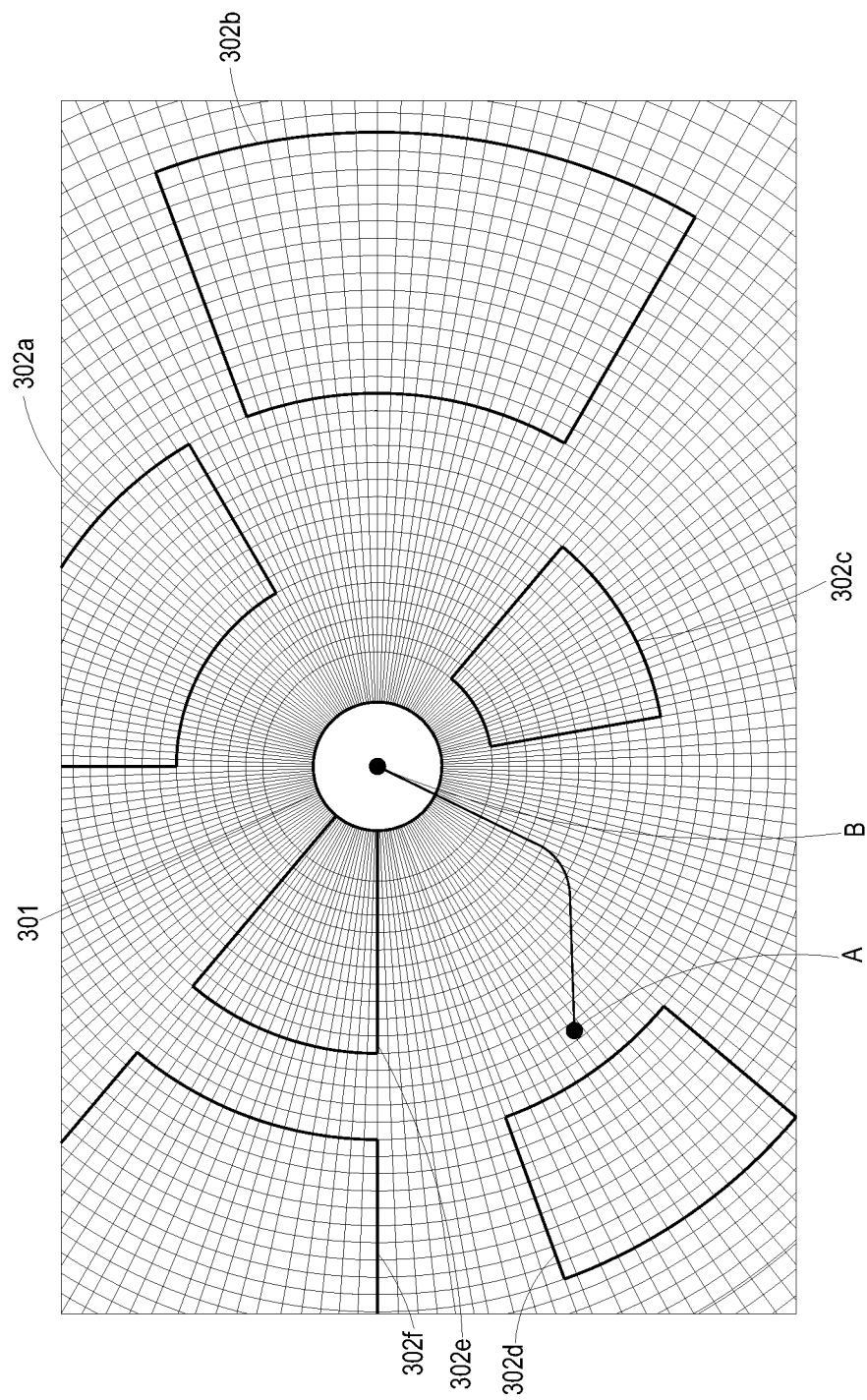
FIG. 33 schematically illustrates the layout of the control areas of the touch-sensitive surface of an intelligent input device according to another embodiment of the present invention.

FIG. 33 schematically illustrates the layout of the control areas of the touch-sensitive surface of an intelligent input device according to another embodiment of the present invention. As shown in FIG. 33, the radial bands may be grouped and combined separately to reflect the position and the direction of different links in different manners. If the dividing lines are not very crowded, the size of the radial band is larger, and the number of the control areas of the touch-sensitive surface is limited. On the other hand, if the dividing lines are very crowded, the size of the radial band is smaller, and the number of the control areas of the touch-sensitive surface is largely increased. In a case that the dividing lines are as crowded as shown, any random link can be defined by grouping contiguous radial bands.

Figure 34:
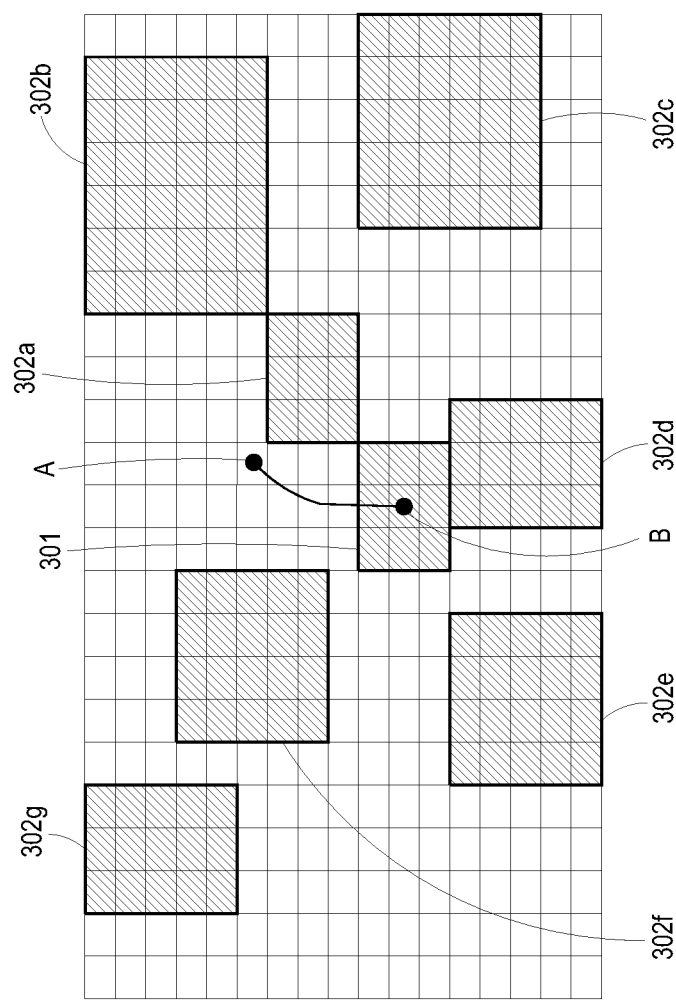
FIG. 34 schematically illustrates the layout of the control areas of the touch-sensitive surface of an intelligent input device according to another embodiment of the present invention.

FIG. 34 schematically illustrates the layout of the control areas of the touch-sensitive surface of an intelligent input device according to another embodiment of the present invention. In this embodiment, different links and control areas are represented by different groupings of small grids. The small grids function in similar fashion as the radial bands of previous embodiment.

In an embodiment, when the touch-sensitive surface of the input device is tapped by the user, the coordinates of the current center and a touch input, or the coordinate of a touch input relative to the current center, or the angle/distance of a touch input relative to the current center, or any other information relating the position/direction of a touch input and current center will be transmitted from the input device to the electronic device. Consequently, the electronic device can calculate and determine which the selected object is. In one embodiment, the dividing lines and the control areas defined by the dividing lines are not shown on the touch-sensitive surface of the input device but only exist as software codes for determining the positions of the touch inputs.

Moreover, the intelligent input method of the present invention may be implemented as an App running side by side with any existing browser, or as a browser plug-in, or as a stand-alone browser. Moreover, the intelligent input method of the present invention may be applied to any other application software or GUI of any form containing randomly distributed icons.

Of course, the above embodiments of the present invention may be applied to a notebook computer. That is, the track pad of the notebook computer may be used as the input device of the intelligent input system of the present invention. Moreover, the intelligent input method of the present invention may be used to select the target object contained in the menu shown on the display screen of the notebook computer. The implementations are similar to those of the above embodiments, and are not redundantly described herein.

Figure 35:
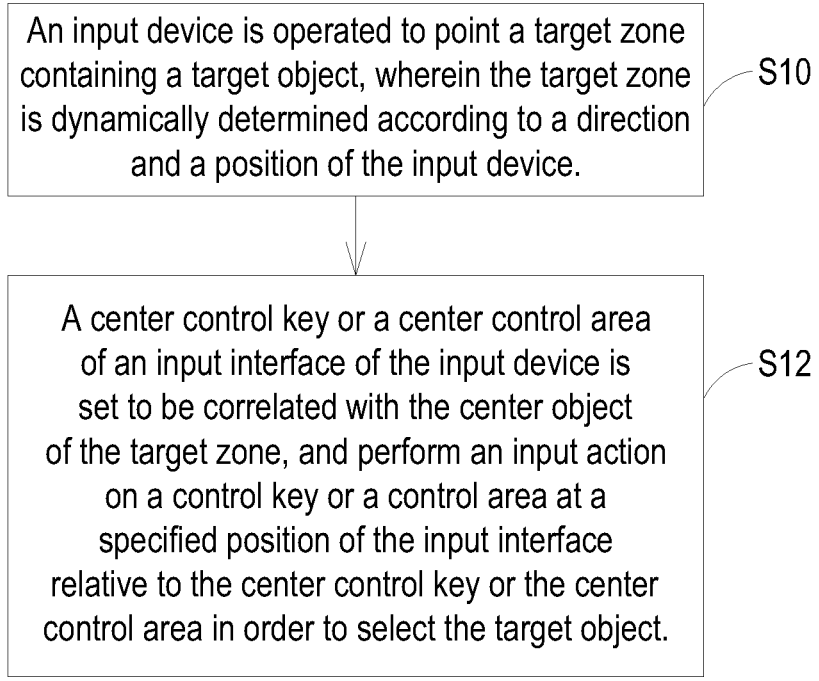
FIG. 35 is a flowchart illustrating an intelligent input method according to an embodiment of the present invention.

From the above descriptions, the present invention provides an intelligent input method for selecting a target object from a menu shown on a display screen of an electronic device. FIG. 35 is a flowchart illustrating an intelligent input method according to an embodiment of the present invention. Firstly, an input device is operated to point a target zone containing the target object (Step S10). The target zone is dynamically determined according to a direction and a position of the input device. The target zone comprises a center object and plural neighboring objects around the center object. The target object is one of the center object and the plural neighboring objects. Then, in an input interface of the input device (e.g. an input control keypad or a touch-sensitive surface), a center control key or a center control area is set to be correlated with the center object of the target zone. By performing an input action on a control key or a control area at a specified position of the input interface relative to the center control key or the center control area, the target object is selected (Step S12).

Figure 36:
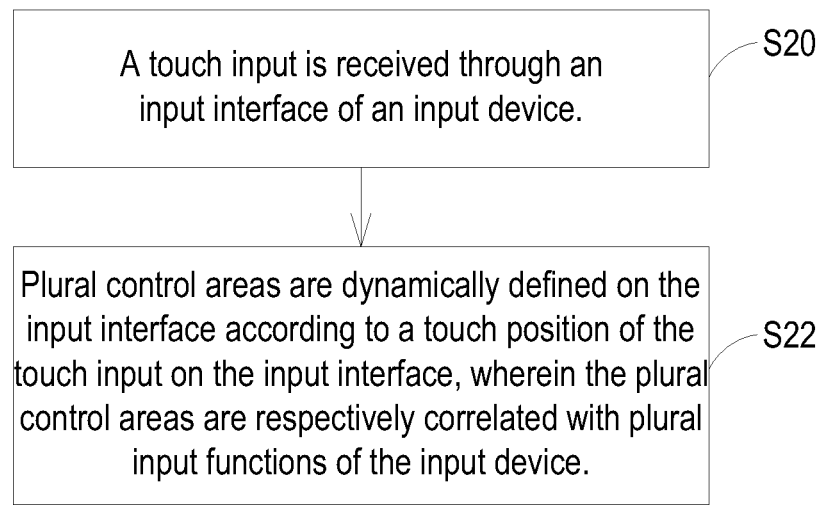
FIG. 36 is a flowchart illustrating an intelligent input method according to another embodiment of the present invention.

FIG. 36 is a flowchart illustrating an intelligent input method according to another embodiment of the present invention. Firstly, a touch input is received through an input interface of an input device (Step S22). Then, plural control areas on the input interface are dynamically defined according to a touch position of the touch input on the input interface, wherein the plural control areas are respectively correlated with plural input functions of the input device (Step S22).

Figure 37:
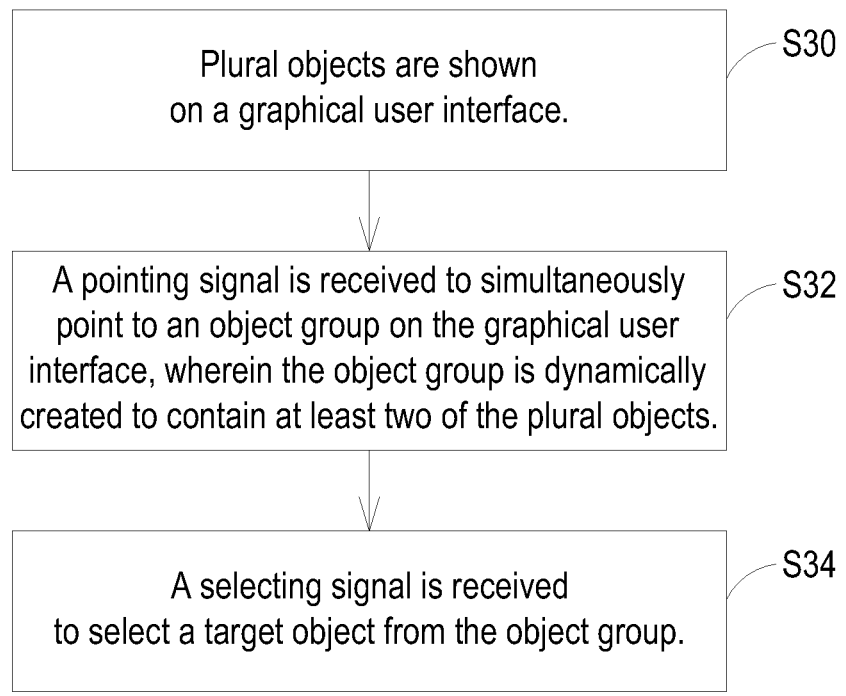
FIG. 37 is a flowchart illustrating an intelligent input method according to another embodiment of the present invention.

FIG. 37 is a flowchart illustrating an intelligent input method according to another embodiment of the present invention. Firstly, plural objects are shown on a graphical user interface (Step S30). Then, a pointing signal is received to simultaneously point to an object group on the graphical user interface, wherein the object group is dynamically created to contain at least two of the plural objects (Step S32). Then, a selecting signal is received to select a target object from the object group (Step S34).

Figure 38:
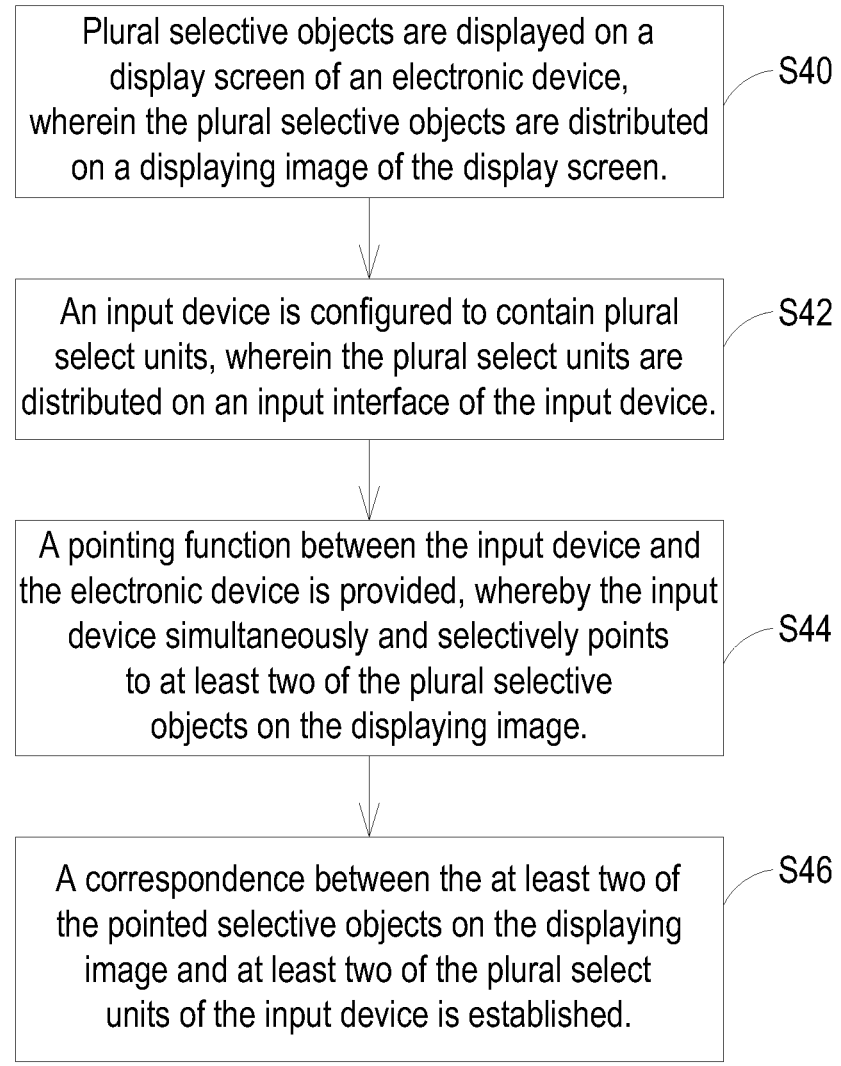
FIG. 38 is a flowchart illustrating an intelligent input method according to another embodiment of the present invention.

FIG. 38 is a flowchart illustrating an intelligent input method according to another embodiment of the present invention. Firstly, plural selective objects are displayed on a display screen of an electronic device, wherein the plural selective objects are distributed on a displaying image of the display screen (Step S40). Then, an input device is configured to contain plural select units, wherein the plural select units are distributed on an input interface of the input device (Step S42). Then, a pointing function between the input device and the electronic device is provided, whereby the input device simultaneously and selectively points to at least two of the plural selective objects on the displaying image (Step S44). Then, a correspondence between the at least two of the pointed selective objects on the displaying image and at least two of the plural select units of the input device is established (Step S46). Moreover, in an embodiment, there is a one-to-one relationship between the pointed selective objects and the corresponding select units. Consequently, an input action may be performed on a select unit to select a selective object. Alternatively, there is a many-to-one relationship between the pointed selective objects and the corresponding select units. Consequently, different input actions may be performed on a select unit to select different selective objects.

From the above descriptions, the present invention provides an intelligent input system and an intelligent input method. The intelligent input method is used for selecting a target object from a menu shown on a display screen of an electronic device. An input device is operated to point to a target zone containing the target object. The target zone is highlighted. The target zone is dynamically determined according to a direction and a position of the input device. The target zone comprises a center object and plural neighboring objects around the center object. The input device has a center control area corresponding to the center object. By looking at the relative positions between the target object and the center object shown on the display screen, the user can intuitively perform an input action on the position relative to the center control area of the input device, so that the target object is selected. The intelligent input system and the intelligent input method of the present invention may allow the user to input or select a target object or browse a web page or operate any graphical user interface containing randomly-distributed objects in an electronic device such as an intelligent TV or a digital multimedia player. Consequently, the target object can be selected and inputted in an intelligent, quick and intuitive manner.

While the invention has been described in terms of what is presently considered to be the most practical and preferred embodiments, it is to be understood that the invention needs not be limited to the disclosed embodiment. On the contrary, it is intended to cover various modifications and similar layouts included within the spirit and scope of the appended claims which are to be accorded with the broadest interpretation so as to encompass all such modifications and similar structures.

What is claimed is:

1. An intelligent input method, comprising steps of:
   receiving a slide touch input through an input interface of an input device;
   dynamically defining plural control areas on the input interface in a vicinity of an end touch position of the slide touch input on the input interface, the plural control areas changing positions while the end touch position is changing, wherein the plural control areas are respectively correlated with plural input functions of the input device, and the plural control areas are corresponding to a layout of plural objects on a target zone of a display screen of an electronic device and are adaptively and simultaneously adjusted to comply with the layout of the plural objects shown on the display screen;
   correlating the plural control areas with the plural objects that are controlled by the input device;
   displaying the plural objects on the display screen of the electronic device, which is in communication with and controlled by the input device; and
   establishing a correspondence between a layout of the plural control areas of the input interface and the layout of the plural objects shown on the display screen; and
   receiving a touch input in one of the plural control areas to select one of the plural input functions respectively correlated therewith.

2. The intelligent input method according to claim 1, further comprising steps of:
   defining a center control area on the input interface by using the end touch position as a center point; and
   defining plural neighboring control areas around the center control area.

3. The intelligent input method according to claim 1, further comprising a step of correlating the plural control areas with the plural objects that are controlled by the input device.

4. The intelligent input method according to claim 1, further comprising a step of visually communicating the plural input functions on the display screen of the electronic device, which is in communication with and controlled by the input device.

5. The intelligent input method according to claim 1, further comprising a step of changing a number or a layout of the plural control areas in response to a change of the end touch position.

6. The intelligent input method according to claim 1, further comprising steps of:
   visually communicating the plural input functions on the display screen of the electronic device, which is in communication with and controlled by the input device; and
   changing a number or a layout of the plural input functions in response to a change of the end touch position.

7. The intelligent input method according to claim 1, further comprising a step of changing the plural input functions corresponding to the plural control areas in response to a change of the end touch position.

8. The intelligent input method according to claim 1, further comprising steps of:
   receiving a pointing input command through the input device; and
   changing a number or a layout of the plural control areas in response to the pointing input command.

9. The intelligent input method according to claim 1, further comprising steps of:
   receiving a pointing input command through the input device; and
   changing a number or a layout of the plural input functions in response to the pointing input command.

10. The intelligent input method according to claim 1, further comprising steps of:
    receiving a pointing input command through the input device; and
    changing the plural input functions corresponding to the plural control areas in response to the pointing input command.

11. The intelligent input method according to claim 1, wherein the input device is activated to receive a pointing input command based on whether the touch input is received.

12. An intelligent input method, comprising steps of:
    displaying plural objects on a graphical user interface;
    receiving a pointing signal to simultaneously and selectively point to an object group on the graphical user interface, the object group being dynamically created according to a direction and a position of the pointing signal to contain at least two of the plural objects in a layout, wherein any one of the plural objects in the object group is capable of being located in any one position in the layout in response to the pointing signal, and the layout of the object group is corresponding to a layout of input units on an input device;
    receiving a selecting signal to select a target object from the object group, wherein during pointing stage of relocating the any one of the plural objects in the object group and during the selecting stage of selecting the object group, the pointing signal is activated in response to an input touch on a touch-sensitive surface.

13. The intelligent input method according to claim 12, further comprising a step of highlighting the object group.

14. The intelligent input method according to claim 12, further comprising a step of defining one object of the object group as a center object and highlighting the center object.

15. The intelligent input method according to claim 12, further comprising a step of defining one object of the object group as a neighboring object and highlighting the neighboring object.

16. The intelligent input method according to claim 12, further comprising steps of:
    defining one object of the object group as a center object;
    defining other objects of the object group as neighboring objects; and
    displaying the center object in a manner visually distinguishable from the neighboring objects.

17. The intelligent input method according to claim 12, further comprising steps of:
    analyzing the pointing signal; and
    in response to the pointing signal, transitioning the object group from containing a first set of objects to containing a second set of object different from the first set of objects.

18. The intelligent input method according to claim 12, wherein the object group contains objects of the same type or the same level.

19. The intelligent input method according to claim 12, wherein the selecting signal is received in response to motion input, sound input, key input, or touch input.

20. An intelligent input method, comprising steps of:
    displaying plural selective objects on a display screen of an electronic device, wherein the plural selective objects are distributed on a displaying image of the display screen;
    configuring an input device to contain plural select units, wherein the plural select units are distributed on an input interface of the input device;
    providing a pointing function between the input device and the electronic device, whereby the input device simultaneously and dynamically points to at least two of the plural selective objects on the displaying image in a layout on the displaying image, and any one of the plural selective objects is capable of being located in any one position in the layout in response to the pointing function; and
    establishing a correspondence between the at least two of the pointed selective objects on the displaying image and at least two of the plural select units of the input device, whereby each one of the pointed selective objects on the displaying image is capable of being selected by selecting each corresponding one of the plural select units of the input device, wherein the layout of the at least two of the pointed selective objects on the displaying image is corresponding to a layout of the at least two of the plural select units of the input device and the layout of the at least two of the plural select units of the input device is corresponding to the layout of the at least two of the pointed selective objects on the displaying image and is adaptively adjusted to comply with the layout of the at least two of the pointed selective objects on the displaying image.

21. The intelligent input method according to claim 20, further comprising a step of establishing a one-to-one correspondence between the pointed selective objects and the corresponding select units.

22. The intelligent input method according to claim 20, further comprising a step of establishing a many-to-one correspondence between the pointed selective objects and the corresponding select units.

23. The intelligent input method according to claim 20, further comprising a step of establishing a mapping between a layout of the pointed selective objects and a layout of the corresponding select units.

24. The intelligent input method according to claim 20, further comprising a step of partially or completely highlighting the pointed selective objects on the displaying image.

25. The intelligent input method according to claim 20, further comprising a step of highlighting different selective objects of the pointed selective objects on the displaying image in different ways.

26. The intelligent input method according to claim 20, further comprising a step of dynamically adjusting a number or a distribution of the pointed selective objects in different positions of the plural selective objects in accordance with a predetermined rule.

27. The intelligent input method according to claim 20, further comprising a step of maintaining a number or a distribution of the pointed selective objects in different positions of the plural selective objects in accordance with a predetermined rule.

28. The intelligent input method according to claim 20, further comprising a step of maintaining a number and a layout of the pointed selective objects to be a 3×3 configuration or its subset.

29. The intelligent input method according to claim 20, further comprising a step of setting the pointed selective objects to be composed of the selective objects having the same type or the same level.

30. The intelligent input method according to claim 20, wherein the input interface is a touch-sensitive surface, and the select units are touch select units of the touch-sensitive surface.

31. The intelligent input method according to claim 20, wherein the input interface is a touch-sensitive surface, and the pointing function is enabled in response to a pointing input touch on the touch-sensitive surface.

32. The intelligent input method according to claim 20, wherein the input interface is a touch-sensitive surface, the select units are touch select units of the touch-sensitive surface, the pointing function is enabled in response to a pointing input touch on the touch-sensitive surface, and a touch position of the pointing input touch on the touch-sensitive surface is the position of one of the touch select units.

33. The intelligent input method according to claim 20, wherein the input interface is a touch-sensitive surface, the select units are touch select units of the touch-sensitive surface, the pointing function is enabled in response to a pointing input touch on the touch-sensitive surface, and the select units are dynamically created on the touch-sensitive surface based on a touch position of the pointing input touch.

34. The intelligent input method according to claim 20, wherein the select units are physical keys distributed on the input interface of the input device.

35. The intelligent input method according to claim 20, wherein the pointing function functions in response to movement of the input device.

36. The intelligent input method according to claim 20, wherein the pointing function functions in response to movement of the input device, the input interface is a touch-sensitive surface, the select units are touch select units of the touch-sensitive surface, the pointing function is activated in response to an input touch on the touch-sensitive surface, and the select units are dynamically created on the touch-sensitive surface based on a touch position of the input touch activating the pointing function.

37. The intelligent input method according to claim 20, wherein a number or a distribution of the pointed selective objects is adjusted in response to an operation of the input device, and a number or a distribution of the select units is adjusted corresponding to the pointed selective objects accordingly.

38. The intelligent input method according to claim 20, further comprising a step of aligning the plural selective objects to grid.

39. The intelligent input method according to claim 20, wherein the input interface is a touch-sensitive surface, the select units are touch select units of the touch-sensitive surface, and the select units are dynamically created on the touch-sensitive surface based on a touch position of an user input touch on the touch-sensitive surface.

40. The intelligent input method according to claim 20, further comprising steps of:
establishing a mapping between a layout of the pointed selective objects and a layout of the corresponding select units; and
appropriately changing a distribution of the select units on the input interface, thereby facilitating a left hand operation or a right hand operation.

41. The intelligent input method according to claim 20, further comprising steps of:
dynamically defining the selective objects to include a center selective object and at least one layer of neighboring selective objects around the center selective object; and
correspondingly defining the corresponding select units to include a center select unit and at least one layer of neighboring select units around the center select unit.

42. The intelligent input method according to claim 20, further comprising a step of dynamically adjusting a number or a distribution of the pointed selective objects in different panels or function blocks of the plural selective objects in accordance with a predetermined rule.

43. The intelligent input method according to claim 20, further comprising a step of limiting a highlighted area of the pointed selective objects on the displaying image, thereby facilitating judgement on a distribution of the pointed selective objects.

44. The intelligent input method according to claim 20, wherein the input interface is a touch display, the select units are touch select units of the touch display, and the touch select units are displayed on the touch display.

* * * * *